US008422509B2

(12) United States Patent
Suh et al.

(10) Patent No.: US 8,422,509 B2
(45) Date of Patent: **\*Apr. 16, 2013**

(54) METHOD FOR PROCESSING A WEB SERVICE IN AN NRT SERVICE AND A BROADCAST RECEIVER

(75) Inventors: Jong Yeul Suh, Seoul (KR); Hui Sang Yoo, Seoul (KR); Jae Hyung Song, Seoul (KR); Min Sung Kwak, Seoul (KR); Joon Hui Lee, Seoul (KR); In Hwan Choi, Gwacheon-si (KR); Chul Soo Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 908 days.

This patent is subject to a terminal disclaimer.

(21) Appl. No.: 12/461,735

(22) Filed: Aug. 21, 2009

(65) Prior Publication Data

US 2010/0050070 A1 Feb. 25, 2010

Related U.S. Application Data

(60) Provisional application No. 61/121,178, filed on Dec. 9, 2008, provisional application No. 61/138,494, filed on Dec. 17, 2008, provisional application No. 61/153,973, filed on Feb. 20, 2009, provisional application No. 61/153,985, filed on Feb. 20, 2009.

(30) Foreign Application Priority Data

Aug. 22, 2008 (KR) ........................ 10-2008-0082585

(51) Int. Cl.
*H04N 7/20* (2006.01)
(52) U.S. Cl.
USPC .......................... 370/432; 375/240.01; 725/71

(58) Field of Classification Search ................... 370/312, 370/264, 432; 375/240.01; 709/211; 725/71, 725/87, 116, 146
See application file for complete search history.

(56) References Cited

U.S. PATENT DOCUMENTS 5,023,889 A 6/1991 Divsalar et al.
5,052,000 A 9/1991 Wang et al.
(Continued)

FOREIGN PATENT DOCUMENTS

WO WO 2005/043403 A1 5/2005
WO WO 2007/030590 A1 3/2007

*Primary Examiner* — Kibrom T Hailu
*Assistant Examiner* — Benjamin Lamont
(74) *Attorney, Agent, or Firm* — McKenna Long & Aldridge LLP

(57) ABSTRACT

A method of processing a web service in a Non-Real Time (NRT) service and the broadcast receiver are disclosed herein. A method of providing an NRT service in a broadcasting receiver may include receiving first signaling information, identifying whether a service type of an NRT service is a web service based upon the first signaling information, identifying a web page type and a web page version of the NRT service and browsing the NRT service. The method may further include connecting a service signaling channel, parsing the received first signaling information, determining whether the NRT service is supported in the broadcasting receiver and consuming the web contents of the NRT service. The NRT service may include at least one of a fixed NRT service and a mobile NRT service. The first signaling information may be a data casting description table (DDT) if the NRT service is the fixed NRT service. The first signaling information may be a service map table (SMT) if the NRT service is the mobile NRT service. The DDT may include a first field identifying the NRT service and a second field identifying a type of the NRT service. The type of the web service may include at least one of a web document of text HTML and a web document of CE-HTML. The third field and the fourth field may be valid if the type of the received service is the web service based upon the second field.

16 Claims, 35 Drawing Sheets

U.S. PATENT DOCUMENTS

| | | |
|---|---|---|
| 5,117,427 A | 5/1992 | Miyake et al. |
| 6,516,349 B1 * | 2/2003 | Lieberman .................... 709/225 |
| 2004/0064325 A1 * | 4/2004 | Syed et al. .................... 704/500 |
| 2007/0002870 A1 * | 1/2007 | Pekonen et al. ......... 370/395.42 |
| 2007/0002871 A1 * | 1/2007 | Pekonen et al. ......... 370/395.42 |
| 2007/0162835 A1 | 7/2007 | Choi et al. |
| 2007/0261074 A1 * | 11/2007 | Yun ................................. 725/20 |
| 2007/0265966 A1 * | 11/2007 | Kahn et al. ....................... 705/51 |
| 2008/0285579 A1 * | 11/2008 | Vare et al. ..................... 370/412 |
| 2009/0051811 A1 | 2/2009 | Yoo et al. |
| 2010/0095328 A1 * | 4/2010 | Hartung et al. ................. 725/46 |
| 2010/0134701 A1 * | 6/2010 | Eyer ............................. 348/731 |
| 2010/0211855 A1 | 8/2010 | Kang et al. |
| 2010/0226392 A1 | 9/2010 | Lee et al. |
| 2011/0214036 A1 | 9/2011 | Kang et al. |

* cited by examiner

FIG. 5

| Syntax | No. of Bits | Format |
|---|---|---|
| virtual_channel_table_section(){ | | |
|     table_id | 8 | 0xC8 |
|     section_syntax_indicator | 1 | '1' |
|     Private_indicator | 1 | '1' |
|     reserved | 2 | '11' |
|     section_length | 12 | uimsbf |
|     transport_stream_id | 16 | uimsbf |
|     reserved | 2 | '11' |
|     version_number | 5 | uimsbf |
|     current_next_indicator | 1 | bslbf |
|     section_number | 8 | uimsbf |
|     last_section_number | 8 | uimsbf |
|     protocol_version | 8 | uimsbf |
|     num_channels_in_section | 8 | uimsbf |
|     for(i=0;i<num_channels_in_section;i++){ | | |
|         short_name | 7*16 | uimsbf |
|         reserved | 4 | '1111' |
|         major_channel_number | 10 | uimsbf |
|         minor_channel_number | 10 | uimsbf |
|         modulation_mode | 8 | uimsbf |
|         carrier_frequency | 32 | uimsbf |
|         channel_TSID | 16 | uimsbf |
|         program_number | 16 | uimsbf |
|         ETM_location | 2 | uimsbf |
|         access_controlled | 1 | bslbf |
|         hidden | 1 | bslbf |
|         reserved | 2 | '11' |
|         hide_guide | 1 | bslbf |
|         reserved | 3 | '111' |
|         service_type | 6 | uimsbf |
|         source_id | 16 | uimsbf |
|         reserved | 6 | '111111' |
|         descriptors_length | 10 | uimsbf |
|         for(i=0;i<N;i++){ | | |
|             descriptor() | | |
|         } | | |
|     } | | |
|     reserved | 6 | '111111' |
|     additional_descriptors_length | 10 | uimsbf |
|     for(j=0;j<N;j++){ | | |
|         additional_descriptor() | | |
|     } | | |
|     CRC_32 | 32 | rpchof |
| } | | |

FIG. 6

| service_type | Meaning |
|---|---|
| 0x00 | [Reserved] |
| 0x01 | Analog_television - The virtual channel carries analog television programming |
| 0x02 | ATSC_digital_television - The virtual channel carries television programming (audio, video and optional associated data) conforming to ATSC standards |
| 0x03 | ATSC_audio - The virtual channel carries audio programming (audio service and optional associated data) conforming to ATSC standards |
| 0x04 | ATSC_data_only_service - The virtual channel carries a data service conforming to ATSC standards, but no video of stream_type 0x02 or audio of stream_type 0x81 |
| 0x05-0x3F | [Reserved for future ATSC use] |

FIG. 7

| Value | Meaning |
|---|---|
| 0x00 | [Reserved] |
| 0x01 | analog_television - The virtual channel carries analog television programming |
| 0x02 | ATSC_digital_television - The virtual channel carries television programming (audio, video and optional data) conforming to ATSC standards |
| 0x03 | ATSC_audio - The virtual channel carries audio programming (audio service and optional data) conforming to ATSC standards |
| 0x04 | ATSC_data_only_service - The virtual channel carries a data service conforming to ATSC standards, but no video of stream_type 0x02 or audio of stream_type 0x81 |
| 0x05 | Software Download Data Service – see A/97 |
| 0x06 | Unassociated/small screen service – see A/65C Amendment 1 |
| 0x07 | Parameterized Service – New A/V CODEC |
| 0x08 | ATSC_nrt_service — The virtual channel carries a NRT service conforming to ATSC standards |
| 0x09-0x7F | [ Reserved for future ] |
| 0x80-0xFF | [ User Private ] |

FIG. 8

| Syntax | No. of Bits | Format |
|---|---|---|
| data_service_table_bytes() { | | |
|     sdf_protocol_version | 8 | uimsbf |
|     application_count_in_section | 8 | uimsbf |
|     if(application_count_in_section > 0) { | | |
|         for(j = 0; j <application_count_in_section; j++) { | | |
|           compatibility_descriptor() | | |
|           app_id_byte_length | 16 | uimsbf |
|           if(app_id_byte_length > 1) { | | |
|             app_id_description | 16 | uimsbf |
|             for(i=0;i<app_id_byte_length-2;i++) { | | |
|               app_id_byte | 8 | bslbf |
|             } | | |
|           } | | |
|           tap_count | 8 | uimsbf |
|           for(i=0;i<tap_count; i++) { | | |
|             protocol_encapsulation | 8 | uimsbf |
|             action_type | 7 | uimsbf |
|             resource_location | 1 | bslbf |
|             Tap() | | |
|             tap_info_length | 16 | uimsbf |
|             for(k=0; k<N; k++) { | | |
|               descriptor() | | |
|             } | | |
|           } | | |
|           app_info_length | 16 | uimsbf |
|           for(i=0; i<M; i++) { | | |
|             descriptor() | | |
|           } | | |
|           app_data_length | 16 | uimsbf |
|           for(i=0; i<app_data_length; i++) { | | |
|             app_data_byte | 8 | bslbf |
|           } | | |
|         } | | |
|     } | | |
|     service_info_length | 16 | uimsbf |
|     for(j=0; j<K; j++) { | | |
|         descriptor() | | |
|     } | | |
|     service_private_data_length | 16 | uimsbf |
|     for(j=0; j<service_private_data_length; j++){ | | |
|         service_private_data_byte | 8 | bslbf |
|     } | | |
| } | | |

FIG. 11

| Syntax | No. of Bits | Format |
|---|---|---|
| NRT_service_table_section() { | | |
|   table_id | 8 | 0xDB |
|   section_syntax_indicator | 1 | '0' |
|   private_indicator | 1 | '1' |
|   reserved | 2 | '11' |
|   section_length | 12 | uimsbf |
|   table_id_extension { | | |
|     NRT_protocol_version | 8 | uimsbf |
|     ensemble_id | 8 | uimsbf |
|   } | | |
|   reserved | 2 | '11' |
|   version_number | 5 | uimsbf |
|   current_next_indicator | 1 | bslbf |
|   section_number | 8 | uimsbf |
|   last_section_number | 8 | uimsbf |
|   num_NRT_services | 8 | uimsbf |
|   for (j=0;j< num_NRT_services; j++) | | |
|   { | | |
|     NRT_service_id | 16 | uimsbf |
|     multi_ensemble_service | 2 | uimsbf |
|     NRT_service_status | 2 | uimsbf |
|     SP_indicator | 1 | bslbf |
|     short_NRT_service_name_length /* m */ | 3 | uimsbf |
|     short_NRT_service_name | 16*m | |
|     reserved | 2 | '11' |
|     NRT_service_category | 6 | uimsbf |
|     num_components | 5 | uimsbf |
|     IP_version_flag | 1 | bslbf |
|     source_IP_address_flag | 1 | bslbf |
|     NRT_service_destination_IP_address_flag | 1 | bslbf |
|     if (source_IP_address_flag) | | |
|       source_IP_address | 32 or 128 | uimsbf |
|     if (NRT_service_destination_IP_address_flag) | | |
|       NRT_service_destination_IP_address | 32 or 128 | uimsbf |
|     for (j=0;j< num_components; j++) | | |
|     { | | |
|       reserved | 1 | '1' |
|       essential_component_indicator | 1 | bslbf |
|       component_destination_IP_address_flag | 1 | bslbf |
|       port_num_count | 5 | uimsbf |
|       component_destination_UDP_port_num | 16 | uimsbf |
|       if (component_destination_IP_address_flag) | | |
|         component_destination_IP_address | 32 or 128 | uimsbf |
|       reserved | 4 | '1111' |

FIG. 12

|  | | |
|---|---|---|
| num_component_level_descriptors | 4 | uimsbf |
| for (k=0;k< num_components_level_descriptors; k++) | | |
| { | | |
|     component_level_descriptor() | var | |
| } | | |
| } | | |
| reserved | 4 | '1111' |
| num_NRT_service_level_descriptors | 4 | uimsbf |
| for (m=0; m<num_NRT_service_level_descriptors; m++) | | |
| { | | |
|     NRT_service_level_descriptor() | var | |
| } | | |
| } | | |
| reserved | 4 | '1111' |
| num_virtual_channel_level_descriptors | 4 | uimsbf |
| for (n=0; n<num_virtual_channel_level_descriptors; n++) { | | |
| { | | |
|     virtual_channel_level_descriptor() | var | |
| } | | |
| } | | |

FIG. 13

| Syntax | No.of Bits | Format |
|---|---|---|
| NRT_component_descriptor() { | | |
|     descriptor_tag | 8 | 0 x CB |
|     descriptor_length | 8 | uimsbf |
|     component_type | 7 | uimsbf |
|     component_encryption_flag | 1 | |
|     if (component_encryption_flag == '1') { | | |
|         num_STKM_streams | 8 | uimsbf |
|         for (i=0; i<num_STKM_streams; i++) { | | |
|             STKM_stream_id | 8 | uimsbf |
|         } | | |
|     NRT_component_data(component_type) | var | |
| } | | |

FIG. 14

| Syntax | No.of Bits | Format |
|---|---|---|
| NRT_component_data() { | | |
|     TSI | 16 | uimsbf |
|     session_start_time | 32 | uimsbf |
|     session_end_time | 32 | uimsbf |
|     reserved | 5 | '11111' |
|     tias_bandwidth_indicator | 1 | bslbf |
|     as_bandwidth_indicator | 1 | bslbf |
|     FEC_OTI_indicator | 1 | bslbf |
|     if (tias_bandwidth_indicator == '1') { | | |
|         tias_bandwidth | 16 | uimsbf |
|     } | | |
|     if (as_bandwidth_indicator == '1') { | | |
|         as_bandwidth | 16 | uimsbf |
|     } | | |
|     if (FEC_OTI_indicator == '1') { | | |
|       FEC_encoding_id | 8 | uimsbf |
|       FEC_instance_id | 16 | uimsbf |
|     } | | |
| } | | |

FIG. 15

| Syntax | No. of Bits | Format |
|---|---|---|
| NRT_content_table_section ( ) { | | |
|     table_id | 8 | uimsbf |
|     section_syntax_indicator | 1 | '1' |
|     private_indicator | 1 | '1' |
|     reserved | 2 | bslbf |
|     section_length | 12 | uimsbf |
|     NRT_Service_ID | 16 | uimsbf |
|     reserved | 2 | bslbf |
|     version_number | 5 | uimsbf |
|     current_next_indicator | 1 | '1' |
|     section_number | 8 | uimsbf |
|     last_section_number | 8 | uimsbf |
|     protocol_version | 8 | uimsbf |
|     num_contents_in_section | 8 | uimsbf |
|     for (j=0; j < num_contents_in_section; j++) { | | |
|         content_version | 32 | uimsbf |
|         content_id | 16 | uimsbf |
|         content_available_start_time | 32 | uimsbf |
|         content_available_end_time | 32 | uimsbf |
|         ETM_location | 2 | uimsbf |
|         content_length_in_seconds | 30 | uimsbf |
|         content_size | 48 | uimsbf |
|         content_delivery_bit_rate | 32 | uimsbf |
|         content_title_length | 8 | uimsbf |
|         content_title_text ( ) | var | |
|         descriptors_length | 16 | uimsbf |
|         for (i=0; i < N; i++) { | | |
|             descriptor ( ) | | |
|         } | | uimsbf |
|     } | | |
| } | | |

FIG. 17

| Syntax | No. of Bits | Format |
|---|---|---|
| NRT_Content_delivery_ channel_details_descriptor() { | | |
|     descriptor_tag | 8 | 0xTBD |
|     descriptor_length | 8 | uimsbf |
|     storage_reservation | 32 | uimsbf |
|     updated | 32 | uimsbf |
|     content_types_length | 8 | uimsbf |
|     content_types_text() | var | |
|     mime_types_length | 8 | uimsbf |
|     mime_types_text() | var | |
|     charging_rules_length | 8 | uimsbf |
|     charging_rules_text() | var | |
|     num_purchase_options | 8 | uimsbf |
|     for (i=0; i<num_purchase_options; i++) | | |
|     { | | |
|         purchase_option_id_length | 8 | uimsbf |
|         purchase_option_id_text() | var | |
|         reserved | 6 | '111111' |
|             cost_information_flag | 1 | bslbf |
|             price_information_flag | 1 | bslbf |
|         if (cost_information_flag == '1') | | |
|         { | | |
|             cost_inforamtion_length | 8 | uimsbf |
|             cost_inforamtion_text() | var | |
|         } | | |
|         if (price_information_flag == '1') | | |
|         { | | |
|             amount | 32 | uimsbf |
|             currency | 16 | uimsbf |
|         } | | |
|     } | | |
| } | | |

FIG. 21
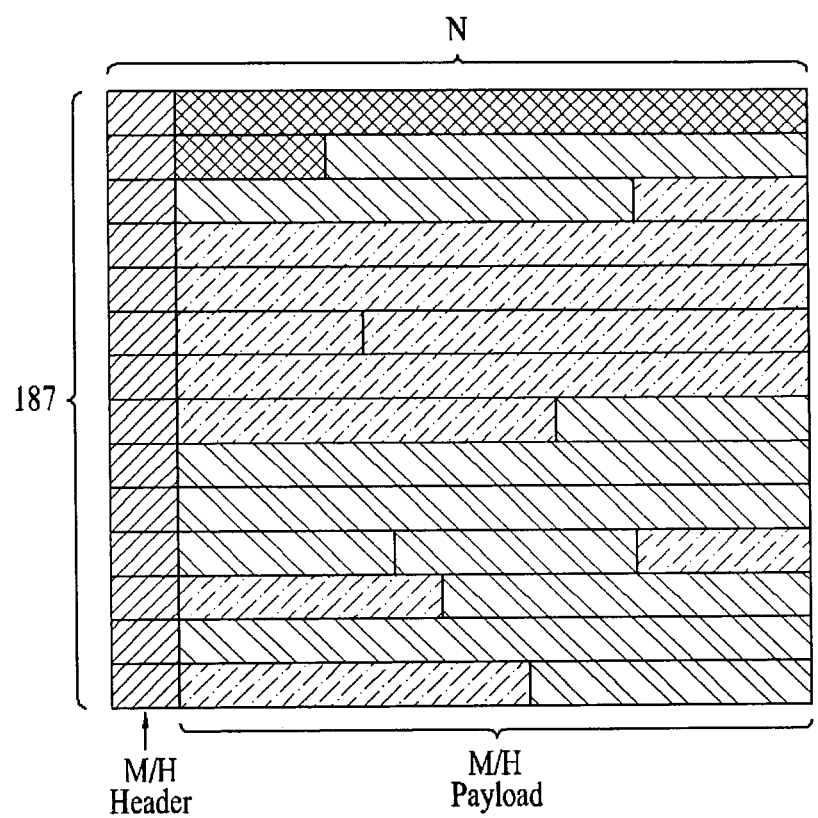
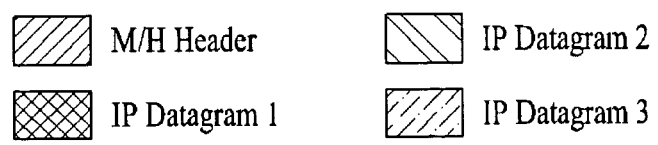

FIG. 24

| Syntax | No.of Bits | Format |
|---|---|---|
| service_map_table_MH_section() { | | |
|     table_id | 8 | 0xDB |
|     section_syntax_indicator | 1 | '0' |
|     private_indicator | 1 | '1' |
|     reserved | 2 | '11' |
|     section_length | 12 | uimsbf |
|     table_id_extension { | | |
|         SMT_MH_protocol_version | 8 | uimsbf |
|         ensemble_id | 8 | uimsbf |
|     } | | |
|     reserved | 2 | '11' |
|     version_number | 5 | uimsbf |
|     current_next_indicator | 1 | bslbf |
|     section_number | 8 | uimsbf |
|     last_section_number | 8 | uimsbf |
|     num_MH_services | 8 | uimsbf |
|     for (j=0;j< num_MH_services; j++) | | |
|     { | | |
|         MH_service_id | 16 | uimsbf |
|         multi_ensemble_service | 2 | uimsbf |
|         MH_service_status | 2 | uimsbf |
|         SP_indicator | 1 | bslbf |
|         short_MH_service_name_length /' m '/ | 3 | uimsbf |
|         short_MH_service_name | 16*m | |
|         reserved | 2 | '11' |
|         MH_service_category | 6 | uimsbf |
|         num_components | 5 | uimsbf |
|         IP_version_flag | 1 | bslbf |
|         source_IP_address_flag | 1 | bslbf |
|         MH_service_destination_IP_address_flag | 1 | bslbf |
|         if (source_IP_address_flag) | | |
|             source_IP_address | 32 or 128 | uimsbf |
|         if (MH_service_destination_IP_address_flag) | | |
|             MH_service_destination_IP_address | 32 or 128 | uimsbf |
|         for (j=0;j< num_components; j++) | | |
|         { | | |
|             reserved | 1 | '1' |
|             essential_component_indicator | 1 | bslbf |
|             component_destination_IP_address_flag | 1 | bslbf |
|             port_num_count | 5 | uimsbf |
|             component_destination_UDP_port_num | 16 | uimsbf |
|             if (component_destination_IP_address_flag) | | |
|                 component_destination_IP_address | 32 or 128 | uimsbf |
|             reserved | 4 | '1111' |

FIG. 25

| | | |
|---|---|---|
| num_component_level_descriptors<br>for (k=0;k< num_components_level_descriptors; k++)<br>{<br>    component_level_descriptor()<br>} | 4<br><br><br>var | uimsbf |
| }<br>reserved<br>num_MH_service_level_descriptors<br>for (m=0; m<num_MH_service_level_descriptors; m++)<br>{<br>    MH_service_level_descriptor()<br>} | 4<br>4<br><br><br>var | '1111'<br>uimsbf |
| }<br>reserved<br>num_ensemble_level_descriptors<br>for (n=0; n<num_ensemble_level_descriptors; n++) {<br>{<br>    ensemble_level_descriptor()<br>}<br>} | 4<br>4<br><br><br>var | '1111'<br>uimsbf |

FIG. 27

| Syntax | No. of Bits | Format |
|---|---|---|
| data_casting_description_table_selection() {} | | |
| table_id | 8 | TBD |
| section_syntax_indicator | 1 | '0' |
| Private_indicator | 1 | '1' |
| reserved | 2 | '11' |
| section_length | 12 | uimsbf |
| transport_stream_id | 16 | uimsbf |
| reserved | 2 | '111' |
| version_number | 5 | uimsbf |
| current_next_indicator | 1 | bslbf |
| section_number | 8 | uimsbf |
| last_section_number | 8 | uimsbf |
| DDT_protocol_version | 8 | uimsbf |
| ensemble_id | 8 | uimsbf |
| num_services | 8 | uimsbf |
| for (i=0; i<num_services; i++) | | |
| { | | |
|    Service_id | 16 | uimsbf |
|    data_casting_service_type | 8 | uimsbf |
|    web_page_type | 8 | uimsbf |
|    web_page_version | 8 | uimsbf |
|    data_chunk_length | 8 | uimsbf |
|    for (m=0; m<data_chunk_length; m++) | | |
|    { | | |
|      data_chunk | | |
|    } | | |
|    } | | |
| } | | |

| value | data_casting_service_type |
|---|---|
| 0x00 | Dynamic Sequential Picture |
| 0x01 | Recorded Web Service |
| 0x02-0xXX | [Reserved for future use] |

| Syntax | No. of Bits | Format |
|---|---|---|
| header_of_data_chunk() { | | |
|   content_type | 8 | uimsbf |
|   content_name | 8*8 | uimsbf |
|   content_id | 16 | uimsbf |
|   payload_length | 10 | uimsbf |
|   NRT_data_info() | var | uimsbf |
| } | | |

FIG. 31

| value | data_casting_content_type |
|---|---|
| 0x00 | image [JPEG] |
| 0x01 | image [PNG] |
| 0x02 | image [MNG] |
| 0x03-0x0F | [Reserved for future Image format use] |
| 0x10 | Text [HTML] |
| 0x11-0x1F | [Reserved for future text format use] |
| 0x20 | MP3 |
| 0x21-0xXX | [Reserved for future text format use] |

FIG. 32

| Syntax | No. of Bits | Format |
|---|---|---|
| payload_of_data_chunk() { | | |
|   raw_data_length | 8 | uimsbf |
|   raw_data() | var | |
| } | | |

FIG. 33

| Syntax | No. of Bits | Format |
|---|---|---|
| header_of_data_chunk_dynamic_sequential_picture() { | | |
| content_type | 8 | uimsbf |
| content_name | 8*8 | uimsbf |
| content_id | 16 | uimsbf |
| payload_length | 10 | uimsbf |
| trigger_time | 4*8 UTC (if=0, NOW) | uimsbf |
| animation_type | 8 | uimsbf |
| } | | |

FIG. 34

| value | animation_type |
|---|---|
| 0x00 | sliding left |
| 0x01 | sliding right |
| 0x02 | sliding up |
| 0x03 | sliding down |
| 0x04 | fade-in |
| 0x05 | fade-out |
| 0x06-0xXX | [Reserved for future text format use] |

Song by BOA, 1st place for 4 weeks in a row.

FIG. 37

| Syntax | No. of Bits | Format |
|---|---|---|
| data_casting_descriptor(){ | | |
|   descriptor_tag | 8 | TBD |
|   descriptor_length | 8 | uimsbf |
|   DCD_protocol_version | 8 | uimsbf |
|   data_casting_service_type | 8 | uimsbf |
|   web_page_type | 8 | uimsbf |
|   web_page_version | 8 | uimsbf |
|   data_chunk_length | 8 | uimsbf |
|   for (m=0; m<data_chunk_length; m++) | | |
|   { | | |
|     data_chunk() | | |
|   } | | |
| } | | |

FIG. 39

| Syntax | No. of Bits | Format |
|---|---|---|
| Advanced_announcement_descriptor(){ | | |
|    descriptor_tag | 8 | TBD |
|    descriptor_length | 8 | uimsbf |
|    ADD_protocol_version | 8 | uimsbf |
|    data_casting_content_type | 8 | uimsbf |
|    web_page_type | 8 | uimsbf |
|    web_page_version | 8 | uimsbf |
|    data_chunk_length | 8 | uimsbf |
|    for (m=0; m<data_chunk_length; m++) | | |
|    { | | |
|       data_chunk() | | |
|    } | | |
| } | | |

US 8,422,509 B2

METHOD FOR PROCESSING A WEB SERVICE IN AN NRT SERVICE AND A BROADCAST RECEIVER

This application claims the benefit of U.S. Provisional Application No. 61/121,178, filed on Dec. 9, 2008, which is hereby incorporated by reference. Also, this application claims the benefit of U.S. Provisional Application No. 61/138,494, filed on Dec. 17, 2008, which is hereby incorporated by reference. This application also claims the benefit of U.S. Provisional Application No. 61/153,973, filed on Feb. 20, 2009, which is hereby incorporated by reference. This application also claims the benefit of U.S. Provisional Application No. 61/153,985, filed on Feb. 20, 2009, which is hereby incorporated by reference. And this application claims the priority benefit of Korean Application No. 10-2008-0082585, filed on Aug. 22, 2008, which is hereby incorporated by reference.

BACKGROUND OF THE INVENTION

1. Field of the Invention

The present invention relates to a method for processing a web service in a Non-Real Time (NRT) service and a broadcast receiver.

2. Discussion of the Related Art

Generally, a Non-Real Time (NRT) service is one of powerful applications that will be utilized for future Digital Television (DTV) services. The NRT is accompanied by non-real time transmission (not real-time streaming), storage and viewing operations and transmits a content of a file type on a surplus bandwidth via a broadcast medium such as terrestrial and the like. And, it is expected that the NRT will be implemented various kinds of service functions including push Video on Demand (VOD), targeted advertising and the like.

SUMMARY OF THE INVENTION

Accordingly, the present invention is directed to a broadcast receiver and a method of processing a web service in a Non-Real Time (NRT) service that substantially obviate one or more problems due to limitations and disadvantages of the related art.

An object of the present invention is to provide a broadcast receiver and a method of mapping signaling information to announcement information, wherein the signaling data for an NRT service can be defined.

Another object of the present invention is to provide a broadcast receiver and a method of mapping signaling information to announcement information, wherein a scheme for transmitting the above-defined signaling data can be defined.

Another object of the present invention is to provide a broadcast receiver and a method of mapping signaling information to announcement information, wherein an NRT service is accessible in a manner that the receiver receives and process signaling data for the transmitted NRT service.

Another object of the present invention is to provide a method of mapping a content identifier of the signaling data to an identifier of a selected and transmitted content in a receiver.

Another object of the present invention is to provide a method of receiving and processing a content selected from a service guide configured by using the signaling data in the receiver, which can provide the processed content to a user.

A further object of the present invention is to provide a method of processing a web service in the NRT service, which can provide the processed web service to a user.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of providing a Non-Real Time (NRT) service in a broadcasting receiver includes receiving first signaling information, identifying whether a service type of an NRT service is a web service based upon the first signaling information, identifying a web page type and a web page version of the NRT service and browsing the NRT service.

The method may further include connecting a service signaling channel, parsing the received first signaling information, determining whether the NRT service is supported in the broadcasting receiver and consuming the web contents of the NRT service.

The NRT service may include at least one of a fixed NRT service and a mobile NRT service.

The first signaling information may be a data casting description table (DDT) if the NRT service is the fixed NRT service.

The first signaling information may be a service map table (SMT) if the NRT service is the mobile NRT service.

The DDT may include a first field identifying the NRT service and a second field identifying a type of the NRT service.

The type of the web service may include at least one of a web document of text HTML and a web document of CE-HTML.

The third field and the fourth field may be valid if the type of the received service is the web service based upon the second field.

In another aspect of the present invention, a method of providing a Non-Real Time (NRT) service in a broadcasting receiver includes receiving first signaling information through a service signaling channel, processing the first signaling information, determining whether a service is an NRT service, determining whether the NRT service is a web service based upon the first signaling information, identifying a web page type and a web page version of the NRT web service and browsing the NRT web service.

The method may further include connecting a service signaling channel, determining whether the NRT service is supported in the broadcasting receiver and consuming the web contents of the NRT service.

The first signaling information may be a service map table (SMT).

The SMT includes a field identifying whether the received service may be a NRT service.

The NRT service may include a mobile NRT service.

The SMT may include a descriptor which is contained a service level descriptor loop of the SMT.

The web page type may be included at least one of a web document of text HTML and a web document of CE-HTML.

The web page type and the web page version may be valid if the type of the received service is the web service based upon the second field.

In another aspect of the present invention, a method of providing a Non-Real Time (NRT) service in a broadcasting receiver includes receiving first and second signaling information, determining whether a service is an NRT service based upon the first signaling information, identifying that content information of the NRT service is a web type information based upon the second signaling information and displaying the content information in a format of the web.

The method may further include downloading corresponding content based upon the displayed content information.

The content information may further include announcement information of a content.

The first signaling information may be an NRT service table (NST) and the second signaling information is an NRT content table (NCT).

The method further comprises identifying whether the content information is supported in the broadcasting receiver, downloading the content information in the format of the web based upon an external input and storing the downloaded content information.

In another aspect of the present invention, a broadcasting receiver includes a receiving unit for receiving first signaling information, a controller for controlling to determine whether a service type of an NRT service is a web service based upon the received first signaling information and identify a web page type and a web page version of the NRT service and a display unit for browsing the NRT service.

The controller may further control to download a web content in the NRT service based upon the received first signaling information.

The controller may further control to determine whether the NRT service is supported in the broadcasting receiver.

In another aspect of the present invention, a broadcasting receiver includes a receiving unit for receiving a first signaling information through a service signaling channel, a controller for controlling to determine whether a service is a Non-Real Time (NRT) service, determine whether the NRT service is a web service based upon the received first signaling information and identify a web page type and a web page version of the NRT web service and a display unit for browsing the NRT web service.

The broadcasting receiver may further include a storage unit for storing the NRT web service.

The controller may further control to download a web content in the NRT service based upon the received first signaling information.

The controller may further control to determine whether the NRT service is supported in the broadcasting receiver.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings;

FIG. 5 is a diagram for a bit-stream section of a TVCT section configured according to an embodiment of the present invention;

FIG. 6 is an exemplary diagram of an ATSC service type according to the present invention;

FIG. 7 is another exemplary diagram of an ATSC service type according to the present invention;

FIG. 8 is a diagram for a bit-stream syntax of a DST section to identity an NRT application configured according to an embodiment of the present invention;

FIGS. 11 and 12 are diagrams for a bit-stream syntax of NST extracted by a receiver from a received MPEG-2 TS configured according to one embodiment of the present invention;

FIG. 13 is a diagram for a bit-stream syntax of NRT_component_descriptor( ) configured according to one embodiment of the present invention;

FIG. 14 is a diagram for a bit-stream syntax of NRT_component_data_descriptor for FLUTE file delivery configured according to one embodiment of the present invention;

FIG. 15 is a diagram for a bit-stream syntax of an NCT section configured according to one embodiment of the present invention;

FIG. 17 is a diagram for a bit-stream syntax of an NRT content delivery channel details descriptor configured according to one embodiment of the present invention;

FIG. 21 is a view showing the structure of an RS frame containing a mobile NRT service configured according to an embodiment of the present invention;

FIGS. 24 and 25 are views showing the bitstream syntax of an SMT configured according to an embodiment of the present invention;

FIG. 27 is an exemplary diagram for a bit-stream syntax of a separate program information table for data of a data casting provided from an NRT service according to the present invention;

FIG. 31 is an exemplary format for a type of a content defined in the content_type field;

FIG. 32 is an exemplary format for the payload of the data_chunk according to the present invention;

FIG. 33 is another exemplary format of the header of the data_chunk;

FIG. 34 is an exemplary diagram for a value of the animation_type field;

FIG. 37 is an exemplary diagram for a bit-stream syntax of a descriptor included the SMT according to the present invention;

FIG. 39 is an exemplary diagram for a bit-stream syntax of a descriptor included the NCT according to the present invention.

DETAILED DESCRIPTION OF THE INVENTION

Figure 1:
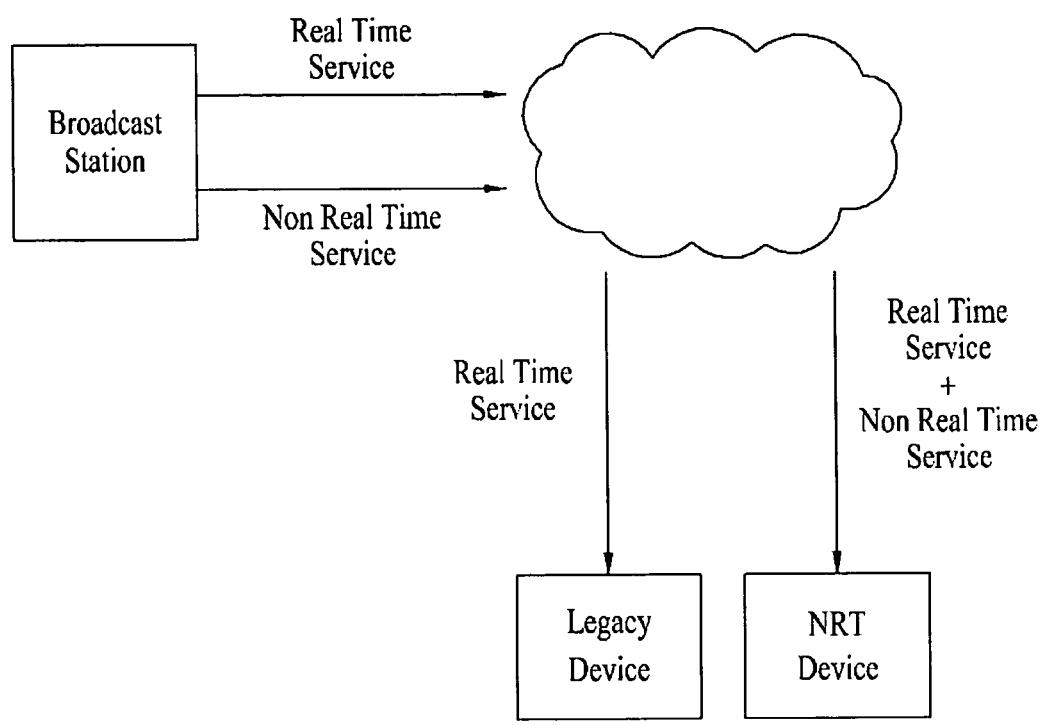
FIG. 1 is an exemplary conceptional diagram of an NRT service.

Reference will now be made in detail to the preferred embodiments of the present invention, examples of which are illustrated in the accompanying drawings. Wherever possible, the same reference numbers will be used throughout the drawings to refer to the same or like parts.

DEFINITIONS OF TERMINOLOGIES USED FOR THE INVENTION

Terminologies used for the present invention are selected from general terminologies, which are currently and widely used, in consideration of functions in the present invention but may vary according to intentions of a person having an ordinary knowledge in the technical field, practices or the advent of new technology, etc. In specific case, a terminology may be arbitrarily chosen by the applicant(s). In this case, its detailed meaning shall be described in Detailed Description of Invention. Therefore, the terminology used for the present invention needs to be defined based on the intrinsic meaning of the terminology and the contents across the present invention instead of a simple name of the terminology.

A real time (RT) service among terminologies used for the present invention means a real-time service as it is. On the contrary, a non-real time (NRT) service means a non-real time service that is not bind on time except the RT service.

Among the terms used in the description of the present invention, main service data correspond to data that can be received by a fixed receiving system and may include audio/video (A/V) data. More specifically, the main service data may include A/V data of high definition (HD) or standard definition (SD) levels and may also include diverse data types required for data broadcasting. Also, the known data correspond to data pre-known in accordance with a pre-arranged agreement between the receiving system and the transmitting system.

Additionally, among the terms used in the present invention, "M/H" (or MH) corresponds to the initials of "mobile" and "handheld" and represents the opposite concept of a fixed-type system. Furthermore, the M/H service data may include at least one of mobile service data, and handheld service data, and will also be referred to as "mobile service data" for simplicity. Thereafter, the M/H, MH, and mobile are used as the same meaning. Herein, the mobile service data not only correspond to M/H service data but may also include any type of service data with mobile or portable characteristics. Therefore, the mobile service data according to the present invention are not limited only to the M/H service data.

The above-described mobile service data may correspond to data having information, such as program execution files, stock information, and so on, and may also correspond to A/V data. Most particularly, the mobile service data may correspond to A/V data having lower resolution and lower data rate as compared to the main service data. For example, if an A/V codec that is used for a conventional main service corresponds to a MPEG-2 codec, a MPEG-4 advanced video coding (AVC) or scalable video coding (SVC) having better image compression efficiency may be used as the A/V codec for the mobile service. Furthermore, any type of data may be transmitted as the mobile service data. For example, transport protocol expert group (TPEG) data for broadcasting real-time transportation information or non-real time (NRT) service data may be transmitted as the main service data.

Also, a data service using the mobile service data may include weather forecast services, traffic information services, stock information services, viewer participation quiz programs, real-time polls and surveys, interactive education broadcast programs, gaming services, services providing information on synopsis, character, background music, and filming sites of soap operas or series, services providing information on past match scores and player profiles and achievements, and services providing information on product information and programs classified by service, medium, time, and theme enabling purchase orders to be processed. Herein, the present invention is not limited only to the services mentioned above.

A transmission system of the present invention can multiplex and transmit mobile service data containing an NRT service and main service data in the same or different physical channels, without influencing the reception of main service data by an existing reception system (backward compatibility).

Furthermore, the transmitting system according to the present invention performs additional encoding on the mobile service data and inserts the data already known by the receiving system and transmitting system (e.g., known data), thereby transmitting the processed data.

Therefore, when using the transmitting system according to the present invention, the receiving system may receive the mobile service data during a mobile state and may also receive the mobile service data including an NRT service with stability despite various distortion and noise occurring within the channel.

A Conceptional Diagram of an NRT Service

FIG. 1 is an exemplary conceptional diagram for an NRT service.

First of all, a broadcasting station transmits an RT (real time) service according to a conventional method. In doing so, the broadcasting station transmits the RT service or an NRT (non-real time) service using a bandwidth left in the due course. In this case, the NRT service can contain a news clip, weather information, advertisements, content for Push VOD (video on demand) and the like.

Yet, a related art DTV receiver, i.e., a legacy device has the principle that the operation is not affected by an NRT stream included within a channel. However, the related art DTV receiver has a problem in receiving and processing an NRT service provided by a broadcasting station properly because of not having a means for processing unit for the NRT service.

On the contrary, a broadcast receiver according to the present invention, i.e., an NRT device is able to properly receive and process an NRT service combined with an RT service, thereby providing a viewer with more various functions than those of the related art DTV.

In this case, the RT service and the NRT service are transmitted on the same DTV channel or different DTV channels and are transmitted through an MPEG-2 transport packet (TP) or an internet protocol (IP) datagram. Hence, a receiver needs to identify the two kinds of services transmitted on the same or different channel. For this, this specification discloses a method of defining and providing signaling information to enable a receiver to receive and process an NRT service properly. In this case, a broadcasting station provides signaling information. Specifically, at least one unique packet identifier (PID) for identifying an NRT service can be allocated.

A Description for Relations Among NRT Service, Content Item and File

Figure 2:
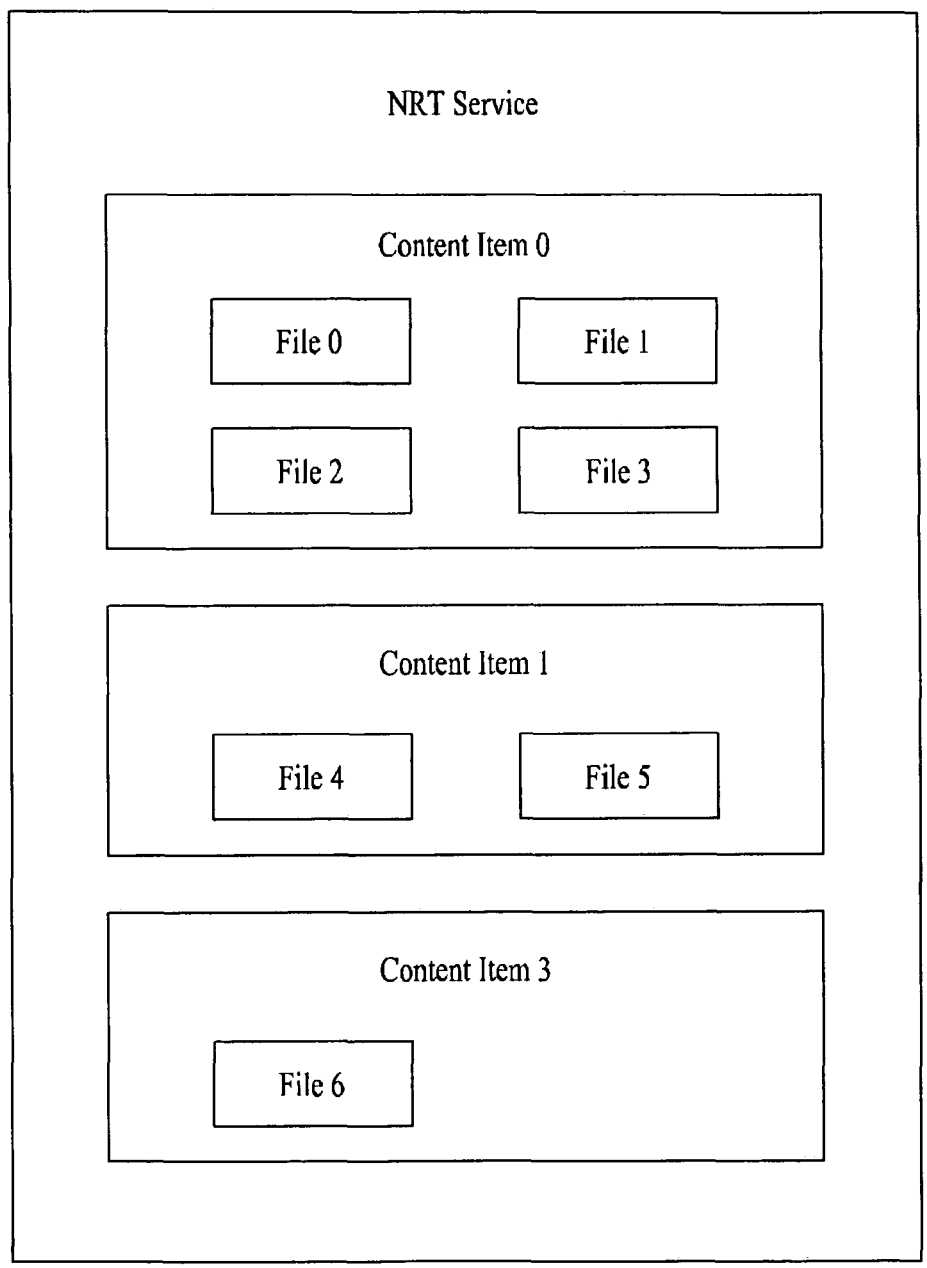
FIG. 2 is an exemplary diagram explaining relations between an NRT service, content items and files.

FIG. 2 is an exemplary diagram to explain relations among an NRT service, content items and files.

Referring to FIG. 2, an NRT service can include one or more content items. And, each of the content items can include one or more files. And, each of the content items is an independently playable entity and may correspond to a program or an event in a real time broadcast. Therefore, the NRT service means a group that is serviceable with a combination of the above content items. And, the NRT service corresponds to a channel concept in real time.

In order for a receiver to properly process the above NRT service, signaling for the corresponding NRT service is required. The present invention intends to properly process an NRT service received by a receiver by defining and providing the signaling information. Besides, details of the signaling information shall be described in the description of the corresponding part.

First of all, NRT services can be mainly categorized into a fixed NRT service and a mobile NRT service according to a type of acquiring an IP datagram. In the following description, the fixed NRT service and the mobile NRT service are sequentially specified for clarity and convenience of explanation.

A Protocol for a Fixed NRT Service

Figure 3:
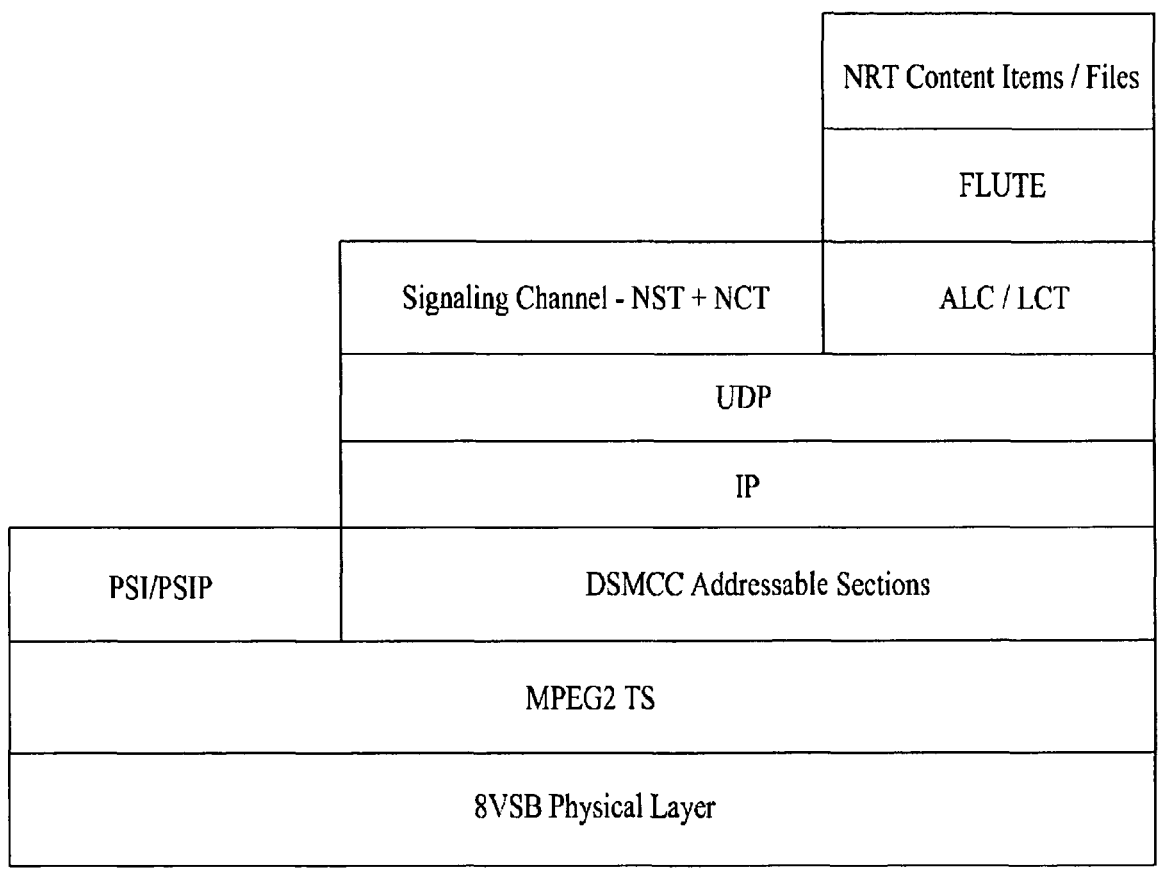
FIG. 3 is a diagram for a protocol stack of a fixed NRT service configured according to an embodiment of the present invention.

FIG. 3 is a diagram for a protocol stack of a fixed NRT service configured according to one embodiment of the present invention.

Referring to FIG. 3, a protocol stack for providing a fixed NRT service transmits NRT content items/files, IP datagram including a signaling channel for providing NST and NCT and PSI/PSIP data using an MPEG-2 TS format.

In FIG. 3, the fixed NRT service is packetized according to UDP in an IP layer. The UDP packet becomes UDP/IP packet data by being packetized again according to an IP scheme. In this disclosure, the packetized UDP/IP packet data is named an IP datagram for clarity and convenience.

The NRT content items/files are packetized according to FLUTE scheme or ALC/LCT scheme. The ALC/LCT packet is transported by being encapsulated in a UDP datagram. The ALC/LCT/UDP packet is packetized into ALC/LCT/UDP/IP packet according to IP datagram scheme to become an IP datagram. This IP datagram is contained in MPEG-2 TS through DSM-CC addressable sections for transport. In this case, the ALC/LCT/UDP/IP packet is the information on FLUTE session and includes a FDT as well.

A signaling information channel including an NST and an NCT is packetized according to a UDP scheme. This UDP packet is packetized according to an IP scheme again to become UDP/IP packet data, i.e., IP datagram. This IP datagram is also contained in the MPEG-2 TS through the DSM-CC addressable sections for transport.

And, a PSI/PSIP table is separately defined and contained in the MPEG-2 TS.

The MPEG-2 TS containing the above described NRT content items/files, signaling information channel and PSI/PSIP data therein are transferred by being modulated by a predetermined transmission scheme such as VSB transmission scheme.

A Receiving System

Figure 4:
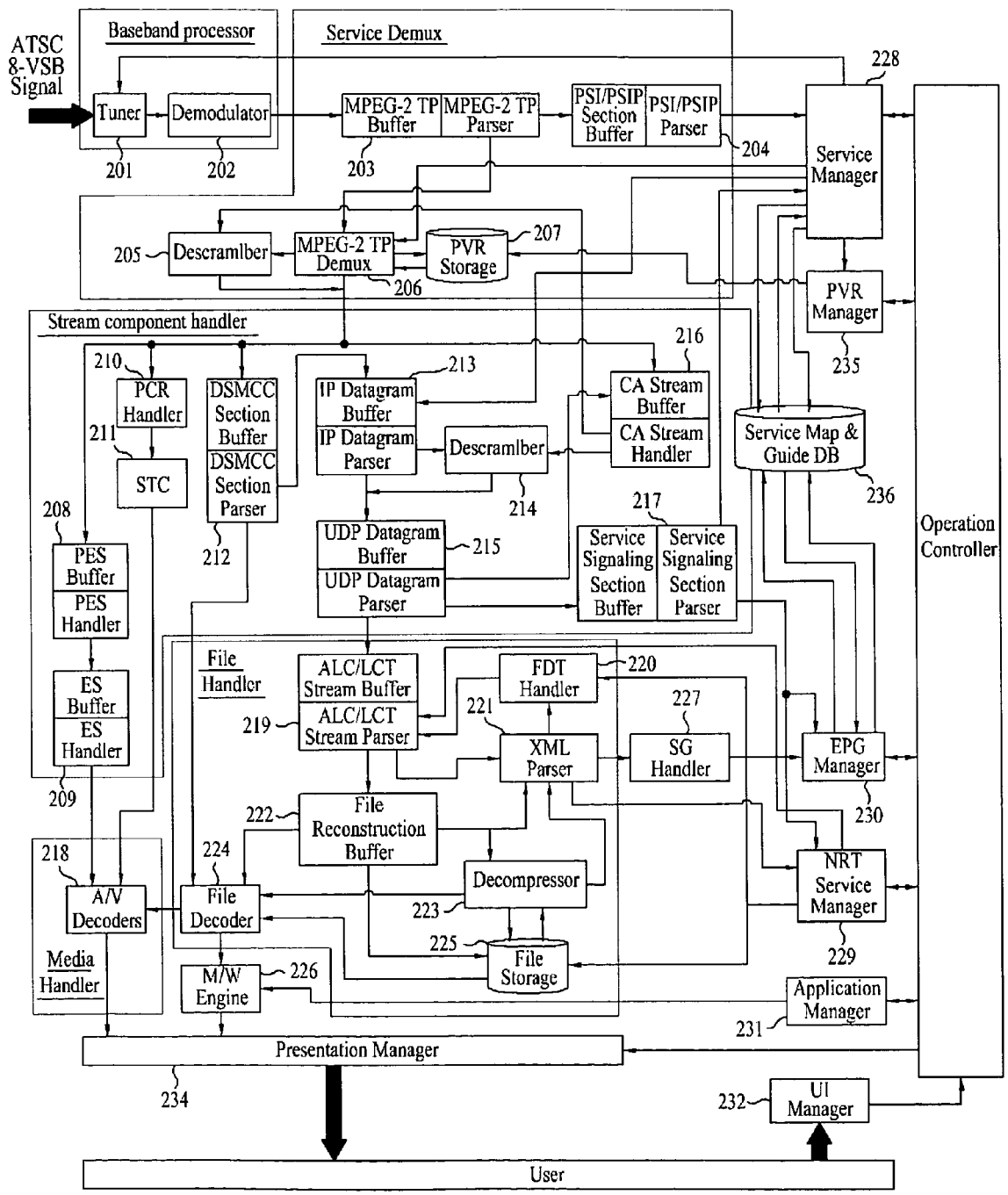
FIG. 4 is a block diagram of a receiving system according to an embodiment of the present invention.

FIG. 4 is a block diagram of a receiving system according to one embodiment of the present invention.

Referring to FIG. 4, the receiving system mainly includes a part of a baseband processor, a part of an MPEG-2 service demultiplexer (demux), a part of a stream component handler, a part of a media handler, a part of a file handler and other parts. The units of the receiving system shown in FIG. 4 are explained as follows.

First of all, the part of the baseband processor includes a tuner 201 and a vestigial side band (VSB) demodulator 202. The tuner 201 detects VSB radio frequency (RF) signal transmitted over the air and then extracts a symbol from the detected VSB RF signal. In this case, the tuner 201 is controlled by a service manager 228. The VSB demodulator 202 reconstructs meaningful data by demodulating the VSB symbol extracted by the tuner 201.

The part of the MPEG-2 service demultiplexer includes an MPEG-2 TP buffer/parser 203, a program specific information/program and system information protocol (PSI/PSIP) section/buffer 204, a descrambler 205, an MPEG-2 TP demultiplexer (demux) 206 and a personal video recorder (PVR) storage 207.

The MPEG-2 TP buffer/parser 203 buffers and reconstructs an MPEG-2 TP carried on a VSB signal and then detects and processes a TP header.

The PSI/PSIP section/buffer 204 buffers and parses PSI/PSIP section data carried on an MPEG-2 TS. In this case, the parsed PSI/PSIP data is collected by the service manager 228 and is then stored as a service map and guide data in a database.

The descrambler 205 reconstructs data of a payload for a scrambled packet payload in the MPEG-2 TP using an encryption key or the like delivered from a conditional access (CA) stream handler 216.

The MPEG-2 TP demultiplexer 206 filters off an MPEG-2 TP varied on a VSB signal or a TP, which is attempted to be processed by the receiver, among the MPEG-2 TP stored in the PVR storage 207 and then relays the filtered TP to a proper processing module. In this case, the MPEG-2 TP demultiplexer 206 can be controlled by the service manager 228 and the PVR manager 235.

The PVR storage 207 stores the received MPEG-2 TP using the VSB signal according to a request made by a user and then outputs the MPEG-2 TP according to a request made by a user. In this case, the PVR storage 207 can be controlled by the PVR manager 235.

The part of the stream component handler includes a packetized elementary stream (PES) buffer/handler 208, an elementary stream (ES) buffer/handler 209, a program clock reference (PCR) handler 210, a system time clock (STC) unit 211, a digital storage media command and control (DSM-CC) section buffer/handler 212, an IP datagram buffer/header parser 213, a user datagram protocol (UDP) datagram buffer/handler 213, a CA stream buffer/handler 214 and a service signaling section buffer/handler 215.

The PES buffer/handler 208 buffers and reconstructs a PES carried on an MPEG-2 TS.

The ES buffer/handler 208 buffers and reconstructs an ES such as audio data, video data or the like, which is transmitted as a PES, and then delivers the reconstructed ES to a proper A/V decoder 218.

The PCR handler 210 handles PCR data used for time synchronization of audio and video streams or the like.

The STC unit 211 corrects a clock value of the A/V decoder 218 using a reference clock value delivered via the PCR handler 210 to enable time synchronization.

The DSM-CC section buffer/handler 212 buffers and handles DSM-CC section data for a file transmission via the MPEG-2 TP, an IP datagram encapsulation or the like.

The IP datagram buffer/header parser 213 buffers and reconstructs an IP datagram, which is encapsulated via DSM-CC addressable section and is then carried on an MPEG-2 TP. The IP datagram buffer/header parser 213 parses a header of each IP datagram through the reconstruction. In this case, the IP datagram buffer/header parser 213 is controlled by the service manager 228.

If scrambling is applied to a payload in the received IP datagram, the descrambler 214 reconstructs data of the payload using an encryption key for the payload or the like delivered from the CA stream handler 216.

The UDP datagram buffer/handler 215 buffers and reconstructs a UDP datagram carried on an IP datagram and also parses and processes a UDP header.

The CA stream buffer/handler 216 buffers and handles such data as a key value for descrambling, e.g., an entitlement management message (EMM) transmitted for a conditional access function carried on an MPEG-2 TS or an IP stream, an entitlement control message (ECM) and the like. In this case, an output of the CA stream buffer/handler 216 is delivered to the descrambler 214 to perform a decryption operation of an MPEG-2 TP or an IP datagram that carries AV data, file data and the like.

The service signaling section buffer/parser 217 processes an NRT Service Table (NST), an NRT Content Table (NCT) and descriptors related to the NST or the NCT for signaling an NRT service of the present invention, which will be explained later. The processed signaling information is transferred to the NRT service manager 229.

The part of the media handler is explained as follows. First of all, the part of the media handler includes A/V decoders 218.

The AV decoders 218 decode compressions of audio and vide data delivered via the ES handler 209 and then processes the decoded data, which are to be presented to a user.

The part of the file handler is explained as follows. First of all, the part of the filer handler mainly includes an Asynchronous Layered Coding/Layered Coding Transport (ALC/CLT) buffer/parser 219, a file description table (FDT) handler 220, an extensible markup language (XML) parser 221, a file reconstruction buffer 222 and a decompressor 223.

The ALC/LCT buffer/parser 219 buffers and reconstructs ALC/LCT data carried on UDP/IP stream and then parses a header of ALC/LCT and a header extension thereof. In this case, the ALC/LCT buffer/parser 219 can be controlled by the NRT service manager 229.

The FDT handler 220 parses and processes a FDT of a File Delivery over Unidirectional Transport (FLUTE) protocol transmitted via an ALC/LCT session. It is able to transfer the processed FDT to the NRT service manager 229. In this case, the FDT handler 220 can be controlled by the NRT service manager 229.

The XML parser 221 parses an XML document transmitted via the ALC/LCT session and then delivers the parsed data to such a proper module as the FDT handler 220, the SG handler 227 and the like.

The file reconstruction buffer 222 reconstructs a file transferred to the ALC/LCT and FLUTE session.

If the file transferred to the ALC/LCT and FLUTE session is compressed, the decompressor 223 performs a process for decompressing the compression.

The file decoder 224 decodes a file reconstructed by the file reconstruction buffer, a file decompressed by the decompressor 223 or a file extracted from the file storage 225.

The file storage 225 stores and extracts the received file. In this case, the received file may contain NRT content.

Finally, the remaining parts except for the above-described units are explained as follows.

First of all, a middleware (M/W) engine 226 processes data of a file that is not an AV stream transferred via a DSM-CC section, an IP diagram and the like and then delivers the processed data to the presentation manager 234.

The SG handler 227 collects and parses service guide data transferred in an XML document format and then delivers the parsed data to the EPG manager 230.

The service manager 228 produces a service map by collecting and parsing PSI/PSIP data carried on MPEG-2 TS and service signaling section data carried on an IP stream and then controls an access to a service specified by a user by storing the service map in a service map & guide database. In this case, the service manager 228 is controlled by an operation controller 230 and then controls the tuner 201, the MPEG-2 TP demultiplexer 206, the IP datagram buffer/handler 213, the NRT service manager 229 and the like.

The NRT service manager 229 performs overall managements on the NRT service transferred in an object/file format via FLUTE session on an IP layer. The NRT service manager 229 parses the signaling information transferred from the service signaling section buffer/parser 217. And, the parsed signaling information is transferred to the service map & guide database 236 to be stored therein. Moreover, the NRT service manager 229 controls NCT information, which correspond to contents related to a service guide in the signaling information, to be transferred to the EPG manager 230, thereby forming EPG data. In this case, the NRT service manager 229 controls the FDT handler 220, the file storage 225 and the like. Therefore, the NRT service manager 229 receives the FDT from the FDT handler 220, parses the received FDT and then controls received NRT contents to be stored as a hierarchical structure in the file storage 225. And, the NRT service manager 229 controls the corresponding NRT contents to be extracted from the file storage 225 in case that a user makes a selection for the NRT service.

The EPG manager 230 receives the service guide data from the SG handler 227, configures EPG data, and then controls the EPG data to be displayed.

The application manager 231 performs overall managements on processing of application data transferred in such a format as an object, a file and the like.

The user interface (UI) manager 232 delivers an input of a user via a UI to the operation controller 233 and enables an operation of a process for a user-requested service to be initiated.

The operation controller 233 processes a user's command delivered via the UI manager 232 and then enables a manager of a necessary module to perform a corresponding action.

And, the presentation manager 234 provides at least one of A/V data outputted from the A/V decoder 218, file data outputted the middleware (M/W) engine 226 and EPG data outputted from the EPG manager 230 to user via speaker and/or screen.

A Terrestrial Virtual Channel Table (TVCT) Section

FIG. 5 is a diagram for a bit-stream section of a TVCT section configured according to one embodiment of the present invention.

Referring to FIG. 5, a TVCT section is described as having a table format similar to that of an MPEG-2 private section. However, this is merely exemplary, and the present invention will not be limited to the example given herein.

The TVCT can be divided into a header, a body and a trailer. The header part ranges from table_id field to protocol_version field. And, transport_stream_id field is a 16-bit field and indicates an MPEG-2 TSID within a program association table (PAT) defined by a PID value of '0' for multiplexing. In the body part, num_channels_in_section field is an 8-bit field and indicates the number of virtual channels within a VCT section. Finally, the trailer part includes a CRC_32 field.

First of all, the header part is explained as follows.

A table_id field is an 8-bit unsigned integer number that indicates the type of table section being defined herein. For the terrestrial_virtual_channel_table_section( ), the table_id shall be '0xC8'.

A section_syntax_indicator is a one-bit field which shall be set to '1' for the terrestrial_virtual_channel_table_section( ).

A private_indicator field (1-bit) shall be set to '1'.

A section_length is a twelve bit field, the first two bits of which shall be '00'. This field specifies the number of bytes of the section, starting immediately following the section_length field, and including the CRC. The value in this field shall not exceed 1021.

A table_id_extension field is set to '0x000'.

A version_number field (5-bit) represents the version number of the VCT. For the current VCT (current_next_indicator='1'), the version number shall be incremented by '1' whenever the definition of the current VCT changes. Upon reaching the value '31', it wraps around to '0'. For the next VCT (current_next_indicator='0'), the version number shall be one unit more than that of the current VCT (also in modulo 32 arithmetic). In any case, the value of the version_number shall be identical to that of the corresponding entries in the MGT.

A current_next_indicator is a one-bit indicator, which when set to '1' indicates that the VCT sent is currently applicable. When the bit is set to '0', it indicates that the table sent is not yet applicable and shall be the next table to become valid. This standard imposes no requirement that "next" tables (those with current_next_indicator set to '0') must be sent. An update to the currently applicable table shall be signaled by incrementing the version_number field.

A section_number field (8 bit) gives the number of this section. The section_number of the first section in the TVCT shall be '0x00'. It shall be incremented by one with each additional section in the TVCT.

A last_section_number field (8 bit) specifies the number of the last section (that is, the section with the highest section_number) of the complete TVCT.

A protocol_version is an 8-bit unsigned integer field whose function is to allow, in the future, this table type to carry parameters that may be structured differently than those defined in the current protocol. At present, the only valid value for protocol_version is zero. Non-zero values of protocol_version may be used by a future version of this standard to indicate structurally different tables.

The body part will now be explained as follows.

A num_channels_in_section field (8-bit) specifies the number of virtual channels in this VCT section. The number is limited by the section length.

A short_name field represents the name of the virtual channel, represented as a sequence of one to seven 16-bit code values.

A major_channel_number field is a 10-bit number that represents the "major" channel number associated with the virtual channel being defined in this iteration of the "for" loop. Each virtual channel shall be associated with a major and a minor channel number. The major channel number, along with the minor channel number, act as the user's reference number for the virtual channel. The major_channel_number shall be between '1' and '99'. The value of major_channel_number shall be set such that in no case is a major_channel_number/minor_channel_number pair duplicated within the TVCT.

A minor_channel_number field is a 10-bit number in the range '0' to '999' that represents the "minor" or "sub"-channel number. This field, together with major_channel_number, performs as a two-part channel number, where minor_channel_number represents the second or right-hand part of the number. When the service_type is analog television, minor_channel_number shall be set to '0'. Services whose service_type is either ATSC_digital_television or ATSC_audio_only shall use minor numbers between '1' and '99'. The value of minor_channel_number shall be set such that, in no case, major_channel_number/minor_channel_number pair is duplicated within the TVCT. For other types of services, such as data broadcasting, valid minor virtual channel numbers are between '1' and '999'.

A modulation_mode field is an 8-bit unsigned integer number that indicates the modulation mode for the transmitted carrier associated with this virtual channel.

A carrier_frequency field includes the recommended value for these 32 bits is zero. Use of this field to identify carrier frequency is allowed, but is deprecated.

A channel_TSID is a 16-bit unsigned integer field in the range '0x0000' to '0xFFFF' that represents the MPEG-2 TSID associated with the TS carrying the MPEG-2 program referenced by this virtual channel.

A program_number field is a 16-bit unsigned integer number that associates the virtual channel being defined here with the MPEG-2 PROGRAM ASSOCIATION and TS PROGRAM MAP tables. For virtual channels representing analog services, a value of '0xFFFF' shall be specified for program_number.

An ETM_location is 2-bit field specifies the existence and the location of an Extended Text Message (ETM).

An access_controlled is a 1-bit Boolean flag that indicates, when set, that the events associated with this virtual channel may be access controlled. When the flag is set to '0', event access is not restricted.

A hidden is a 1-bit Boolean flag that indicates, when set, that the virtual channel is not accessed by the user by direct entry of the virtual channel number. Hidden virtual channels are skipped when the user is channel surfing, and appear as if undefined, if accessed by direct channel entry. Typical applications for hidden channels are test signals and NVOD services. Whether a hidden channel and its events may appear in EPG displays depends on the state of the hide_guide bit.

A hide_guide is a Boolean flag that indicates, when set to '0' for a hidden channel that the virtual channel and its events may appear in EPG displays. This bit shall be ignored for channels which do not have the hidden bit set, so that non-hidden channels and their events may always be included in EPG displays regardless of the state of the hide_guide bit. Typical applications for hidden channels with the hide_guide bit set to '1' are test signals and services accessible through application-level pointers.

A service_type is a 6-bit enumerated type field that shall identify the type of service carried in this virtual channel. Herein, FIG. 6 is an exemplary diagram of an ATSC service type according to the present invention and FIG. 7 is another exemplary diagram of an ATSC service type according to the present invention.

According to the present invention, a fixed NRT service uses a conventional ATSC terrestrial broadcasting environment. In particular, a fixed NRT service, which is based on a scheme of transporting an IP datagram via DSM-CC addressable section, can be provided by the following method for example.

1. Case of transmission on virtual channel including audio and/or video: In this case, a service type of a corresponding virtual channel can follow FIG. 6 as stipulated in the conventional ATSC specification. In particular, the service type follows '0x04' indicating ATSC data only service shown in FIG. 6. Alternatively, the service type can identify an NRT service by being included in another service type of the related art.

2. Case of transmission on virtual channel including NRT service only: Referring to FIG. 7, signaling can be performed to indicate an NRT application ('0x08') by allocating a new service type value.

A source_id field (16-bit) represents a programming source associated with a virtual channel.

A descriptors_length field is total length (in bytes) of the descriptors for this virtual channel that follows.

A descriptor( ) field includes zero or more descriptors, as appropriate, may be included.

An additional_descriptors_length field is total length (in bytes) of the VCT descriptor list that follows.

The trailor part is explained as follows.

CRC_32 is a 32-bit field that contains the cyclic redundancy check (CRC) value that ensures a zero output from the registers in the decoder.

NRT content is transferred through IP mechanism. In order to transfer IP datagram through a digital broadcast stream, ATSC has regulated ATSC A/90 and A/92 specifications.

In the above description, the data service table (DST) may be received through a PID included in service_location_descriptor. And, it is able to know a type of application and detailed information of a data broadcast stream carried on this channel through the DST.

According to FIG. 6 or FIG. 7, it is able to use a DST to identify an NRT service. The DST is explained as follows.

FIG. 8 is a diagram for a bit-stream syntax of a DST section to identity an NRT application configured according to one embodiment of the present invention.

The semantics of the fields comprising the data_service_table_bytes structure are defined below.

An sdf_protocol_version field (8-bit) shall be used to specify the version of the Service Description Framework (SDF) protocol. The value of this field shall be set to '0x01'. The value '0x00' and the values in the range '0x02' to '0xFF' shall be ATSC reserved.

An application_count_in_section field (8-bit) shall specify the number of applications listed in the DST section.

A compatibility_descriptor( ) field shall contain a DSM-CC compatibility descriptor. Its purpose shall be to signal compatibility requirements of the application so that the receiving platform can determine its ability to use this data service.

An app_id_byte_length field (16-bit) shall specify the number of bytes used to identify the application. The value of this field shall account for the length of both the app_id_description field and the app_id_byte fields that follow. The value '0x0000' shall indicate that no app_id_description field or app_id_byte fields follow. The value '0x0001' is forbidden.

An app_id_description field (16-bit) shall specify the format and semantics of the following application identification bytes.

Table 1 specifies the values and associated formats for application identifier. In this case, if a value of the app_id_description field is set to '0x0003', the receiver is aware that the application is an NRT application.

TABLE 1

| Value | Application Identifier Format |
|---|---|
| 0x0000 | DASE application |
| 0x0001 | ATSC reserved |
| 0x0002 | ATSC A/92 Application |
| 0x0003 | NRT Application |
| 0x0004-0x7FFF | ATSC reserved |
| 0x8000-0xFFFF | User private |

An app_id_byte field (8-bit) shall represent a byte of the application identifier.

A tap_count field (8-bit) shall specify the number of Tap( ) structures used by this application.

A protocol_encapsulation field (8-bit) shall specify the type of protocol encapsulation used to transmit the particular data element referred to by the Tap( ). The following Table 2 is an exemplary diagram for a type of the protocol encapsulation.

TABLE 2

| Value | Encapsulated Protocol |
|---|---|
| 0x00 | Not in a MPEG-2 Transport Stream |
| 0x01 | Asynchronous non-flow controlled scenario of the DSM-CC Download protocol encapsulated in DSM-CC sections |
| 0x02 | Non-streaming Synchronized Download protocol encapsulated in DSM-CC sections |
| 0x03 | Asynchronous multiprotocol datagrams in Addressable Sections using LLC/SNAP header |
| 0x04 | Asynchronous IP datagrams in Addressable Sections |
| 0x05 | Synchronized streaming data encapsulated in PES |
| 0x06 | Synchronous streaming data encapsulated in PES |
| 0x07 | Synchronized streaming multiprotocol datagrams in PES using LLC/SNAP header |
| 0x08 | Synchronous streaming multiprotocol datagrams in PES using LLC/SNAP header |
| 0x09 | Synchronized streaming IP datagrams in PES |
| 0x0A | Synchronous streaming IP datagrams in PES |
| 0x0B | Proprietary Data Piping |
| 0x0C | SCTE DVS 051 asynchronous protocol [19] |
| 0x0D | Asynchronous carousel scenario of the DSM-CC Download protocol encapsulated in DSM-CC sections |
| 0x0E | Reserved for harmonization with another standard body |
| 0x0F-0x7F | ATSC reserved |
| 0x80-0Xff | User defined |

An action_type field (7-bit) shall be used to indicate the nature of the data referred to by the Tap( ).

A resource_location field (1-bit) shall specify the location of the Association Tag field matched with the association_tag value listed in the following Tap structure. This bit shall be set to '0' when the matching association_tag resides in the PMT of the current MPEG-2 program. This bit shall be set to '1' when the matching association_tag resides in a DSM-CC Resource Descriptor within the Network Resources Table of this Data Service.

A tap_id field (16-bit) shall be used by the application to identify the data elements. The value of tap_id is scoped by the value of the app_id_byte fields associated with the Tap( ) in the DST. The tap_id field is unique within an application. The tap_id value is selected by the data service provider at authoring time. It is used in the application as a handle to the data element.

A use field (16-bit) is used to characterize the communication channel referenced by the association_tag. Use of use values other than '0x0000' is beyond the scope of this standard. The use value '0x0000' indicates that this field is unknown.

An association_tag field (16-bit) shall uniquely identify either a data elementary stream listed in the PMT or a DSM-CC Resource Descriptor listed in the Network Resource Table. In the former case, the value of this field shall be matched with the association_tag value of an association_tag_descriptor in the PMT of the data service. In the latter case, the value of this field shall match the association_tag value in the commonDescriptorHeader structure of a DSM-CC Resource Descriptor in the Network Resource Table of the data service.

A selector( ) field shall specify a particular data element available in a data elementary stream or a communication channel referenced by the association_tag field. In addition, the selector structure may indicate the protocol required for acquiring this data element.

A tap_info_length field (16-bit) shall specify the number of bytes of the descriptors following the tap_info_length field.

A descriptor( ) field shall follow the descriptor format.

An app_info_length field (8-bit) shall specify the number of bytes of the descriptors following the app_info_length field.

Another descriptor( ) field shall follow the descriptor format.

An app_data_length field (16-bit) shall specify the length in bytes of the following app_data_byte fields.

An app_data_byte field (8-bit) shall represent one byte of the input parameters and other private data fields associated with the application.

A service_info_length (8-bit) shall specify the number of bytes of the descriptors following the service_info_length field.

Another descriptor( ) field shall follow the descriptor format.

A service_private_data_length field (16-bit) shall specify the length in bytes of the private fields to follow.

A service_private_data_byte field (8-bit) shall represent one byte of the private field.

After the NRT application has been identified, an IP stream, on which a well-known IP address for delivering NRT service signaling data delivered via an IP layer is searched for using tap information.

If a value of protocol_encapsulation is set to '0x04', an asynchronous IP datagram is transferred. If selector_type is set to '0x0102', a value of device_id, which indicates a destination address, is delivered through selector_bytes. In order to accurately interpret a value of the selector_bytes, multi-protocol_encapsulation_descriptor is used. And, the number of valid bytes in the device_id value is signaled.

Therefore, it is able to know a multicast address (or, an address range) of an IP datagram carried on the corresponding PID via the tap information.

It is checked whether a well-known IP address, to which NRT service signaling data will be delivered, is loaded on the tap. This is received in the first place. An IP packet is then received.

The NRT service signaling data is extracted from the IP packet. The extracted NRT service signaling data is delivered to and processed by an NRT application manager. An NRT service can be then initiated.

As mentioned in the above description, an NRT service signaling channel is multicasted by being encapsulated in an IP datagram via a well-known IP address.

Figure 9:
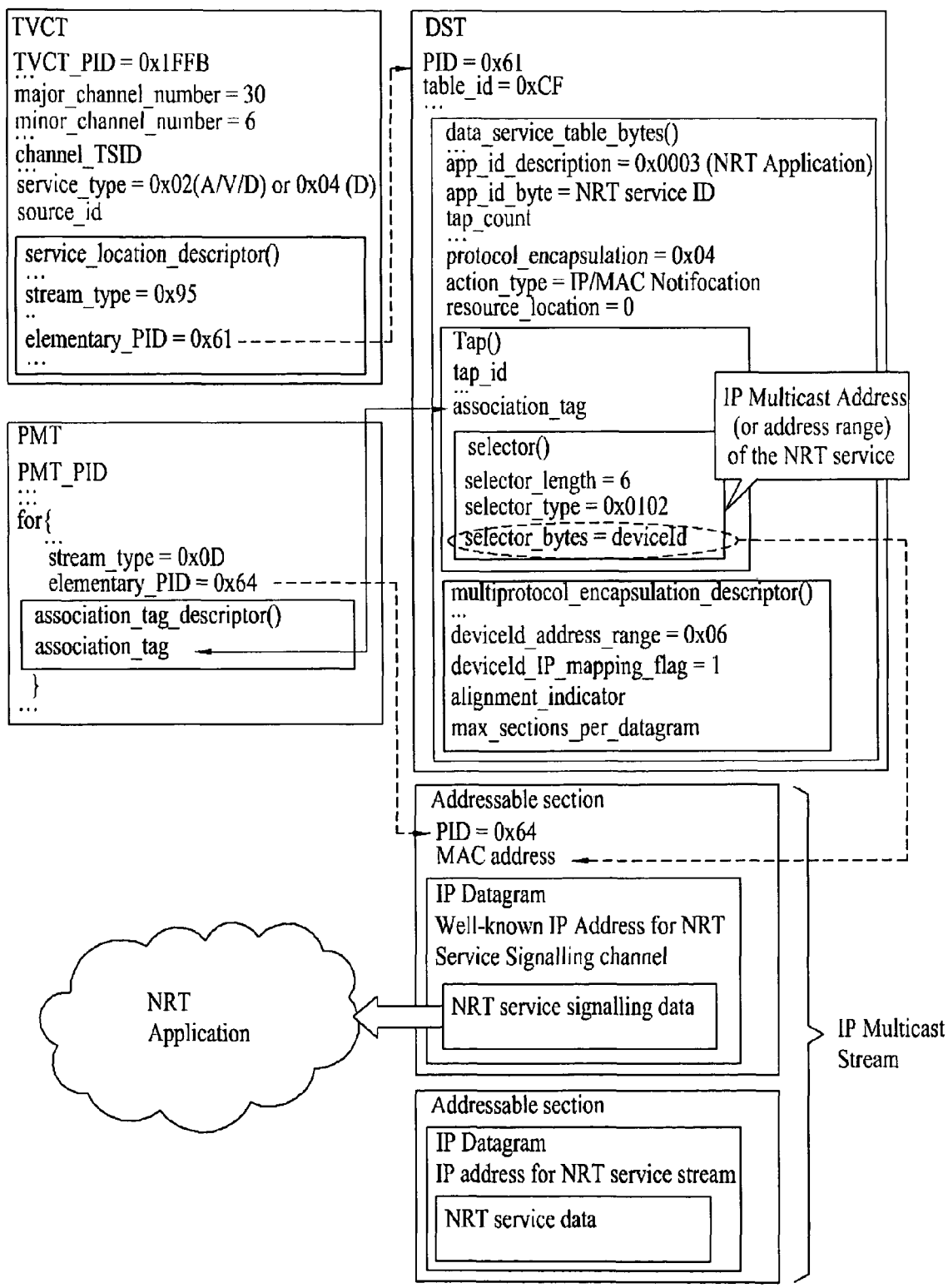
FIG. 9 is a diagram for a signaling method in case of transmitting an NRT service through an ATSC broadcasting system according to another embodiment of the present invention.
Figure 10:
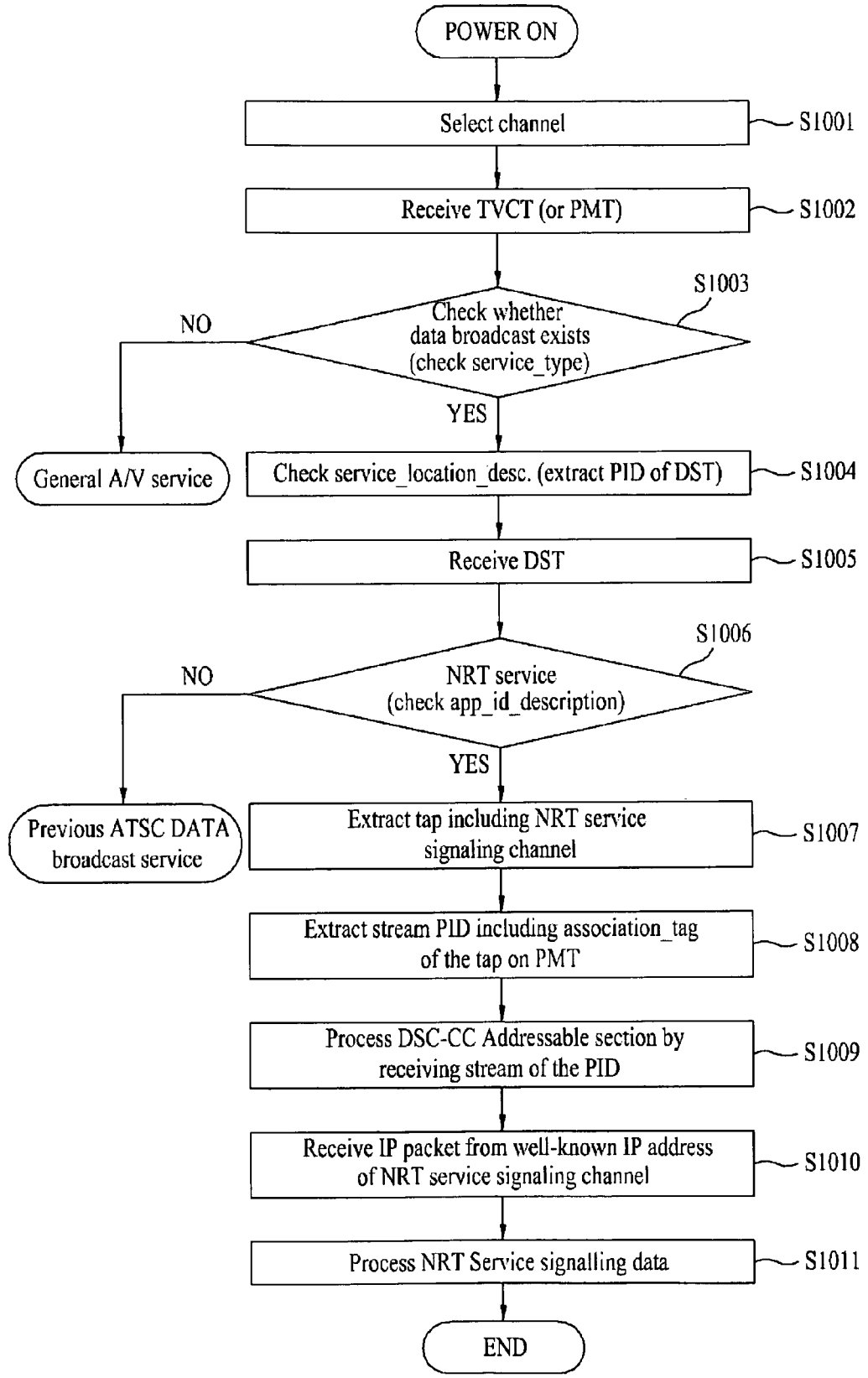
FIG. 10 is a flowchart for FIG. 9.

FIG. 9 is an exemplary diagram for a signaling method in case of transmitting an NRT service through an ATSC broadcasting system according to another embodiment of the present invention, and FIG. 10 is an exemplary flowchart for FIG. 9.

FIG. 9 shows a method of configuring a separate NRT service signaling channel via an IP side. In this case, the NRT service signaling channel is multicasted by being encapsulated in an IP datagram via a well-known IP address. A signaling structure for this case is shown in FIG. 9. In particular, it can be observed that a separate NRT service signaling channel exists as an IP multicast stream, whereas every signaling is performed by a PSIP side.

Referring to FIG. 10, after a power of a receiver has been turned on, if a default channel or a channel by a user is selected [S1001], the receiver receives a TVCT or a PMT [S1002].

Regarding this, information on a stream configuring each virtual channel is signaled to service_location_descriptor or the TVCT or ES_loop of the PMT.

Therefore, the receiver determines a type of a service provided on a selected channel by parsing service_type within the received TVCT [S1003]. For instance, if a value of the service_type is set to '0x02', a type of a corresponding service provided on the selected channel may mean a digital A/V/Data service type. If a value of the service_type is set to '0x04', a type of a corresponding service provided on the selected channel may mean a data only service type. If a value of the service_type is set to '0x08', a type of a corresponding service provided on the selected channel may mean an NRT only service type.

As a result of the determining step S1003, if the corresponding service type is not a general A/V service, PID ('0x61') of a data service table (DST) is extracted by parsing service_location_descriptor in the channel loop of the TVCT [S1004].

Subsequently, the DST is received using the extracted PID [S1005].

It is then determined whether the corresponding service provided on the selected channel is an NRT service from the received DST [S1006]. In doing so, the determination of a presence or absence of the NRT service can be performed by checking app_id_description within the DST. For instance, if a value of the app_id_description is set to '0x0003', it means that the corresponding service is the NRT application.

As a result of the determining step S1006, if the corresponding service is the NRT service, a tap including an NRT service signaling channel is extracted [S1007]. And, stream_PID including association_tag of the tap on the PMT is extracted [S1008].

After a stream of the PID has been received, a DSM-CC addressable section is processed [S1009].

Subsequently, after an IP packet has been received from a well-known IP address of the NRT service signaling channel [S1010], an NRT service is provided by processing the NRT service signaling data within the received IP packet [S1011].

Regarding this, after whether the NRT application exists on the virtual channel has been checked by the above method, an IP stream carrying the well-known IP address, to which the NRT service signaling data carried via an IP layer is delivered, is searched for using tap information.

If a value of the protocol_encapsulation is set to '0x04', an asynchronous IP datagram is transferred. If selector_type is set to '0x0102', a value of the device_id indicating a destination address is delivered via selector_bytes.

Therefore, it is able to know a PID of a transport stream, on which the corresponding data is carried, through the tap information on a multicast address (or, an address range) of an IP diagram. It is checked whether a well-known IP address, to which NRT service signaling data will be delivered, is loaded on the tap. This is received in the first place. An IP packet is then received.

Subsequently, NRT service signaling data is extracted from the IP packet. The extracted NRT service signaling data is delivered to an NRT application manager. A corresponding service is then initiated.

Signaling Information for the Fixed NRT Service

In the following description, NST and NCT carried on a signaling information channel and accompanied descriptors thereof for providing information for signaling an NRT service are explained in order.

As mentioned in the foregoing description of FIG. 3, an NST/NCT table section can be transferred by being included as an IP stream within a virtual channel.

Examples for fields carried on NST are described as follows. FIGS. 11 and 12 is a diagram for a bit-stream syntax of the NST configured according to one embodiment of the present invention.

In this case, although a corresponding syntax is written as an MPEG-2 private section to help the understanding, a format of corresponding data can have any type. For instance, session description protocol (SDP) is used to perform signaling via session announcement protocol (SAP).

The NST/NCT describes service information and IP access information within a virtual channel carrying the NST/NCT. The NST/NCT also provides broadcast stream information of a corresponding service using TSID that is an identifier of a broadcast stream to which each service belongs. And, NST according to the present embodiment includes description information of each fixed NRT service within one virtual channel. And, other side information can be included in a descriptor region.

A table_id field is an 8-bit unsigned integer number that indicates the type of table section being defined in NST.

A section_syntax_indicator field (1-bit) shall be set to '0' to always indicate that this table is derived from the short form of the MPEG-2 private section table.

A private_indicator field (1-bit) shall be set to '1'.

A section_length field (12-bit) specifies the number of remaining bytes of this table section immediately following this field. The value in this field shall not exceed 4093 ('0xFFD').

A table_id_extension field (16-bit) is table-dependent. It shall be considered to be logically part of the table_id field providing the scope for the remaining fields. Herein, the table_id_extension field includes an NST_protocol_version field. The NST_protocol_version is an 8-bit unsigned integer field whose function is to allow, in the future, this NRT Service Table to carry parameters that may be structured differently than those defined in the current protocol. Presently, the value for the NST_protocol_version shall be zero. Non-zero values of NST_protocol_version may be used by a future version of this standard to indicate structurally different tables.

A version_number field (5-bit) represents a version number of the NST.

A current_next_indicator is a one-bit indicator, which when set to '1' shall indicate that the NRT Service Table sent is currently applicable. When the bit is set to '0', it shall indicate that the table sent is not yet applicable and will be the next table to become valid. This standard imposes no requirement that next tables (those with current_next_indicator set to '0') must be sent. An update to the currently applicable table shall be signaled by incrementing the version_number field.

A section_number field (8-bit) shall give the section number of this NRT Service table section. The section_number of the first section in an NRT Service table shall be '0x00'. The section_number shall be incremented by 1 with each additional section in the NRT Service table. A last_section_number field (8-bit) shall give the number of the last section (i.e., the section with the highest section_number) of the NRT Service table of which this section is a part.

A carrier_frequency field (32-bit) indicates transport frequency corresponding to a channel.

A channel_TSID field (16-bit) represents a transport stream including an MPEG-2 program referenced to a virtual channel and an MPEG-2 TSID associated with the transport stream.

A source_id field (16-bit) represents a programming source associated with a virtual channel.

A num_NRT_services field (8-bit) specifies the number of NRT services in this NST section.

According to one embodiment of the present invention, the NST provides information for a plurality of fixed NRT services using a 'for' loop. Field information which is included in each fixed NRT service is explained as follows.

An NRT_service_status is a 2-bit enumerated field that shall identify the status of this NRT Service. The most significant bit shall indicate whether this NRT Service is active (when set to '1') or inactive (when set to '0') and the least significant bit shall indicate whether this NRT Service is hidden (when set to '1') or not (when set to '0'). Hidden services are normally used for proprietary applications, and ordinary receiving devices should ignore them.

A SP_indicator is a 1-bit field that shall indicate, when set, that service protection is applied to at least one of the components needed to provide a meaningful presentation of this NRT Service.

A CP_indicator is a 1-bit field that shall indicate, when set, that content protection is applied to at least one of the components needed to provide a meaningful presentation of this NRT Service.

An NRT_service_id is a 16-bit unsigned integer number that shall uniquely identify this NRT Service within the scope of this NRT Broadcast. The NRT_service_id of a service shall not change throughout the life of the service. To avoid confusion, it is recommended that if a service is terminated, then the NRT_service_id for the service should not be used for another service until after a suitable interval of time has elapsed.

A short_NRT_service_name_length is a three-bit unsigned integer that shall indicate the number of byte pairs in the short_NRT_service_name field. This value is shown as m in the No. of Bits column for the short_NRT_service_name field. When there is no short name of this NRT service, the value of this field shall be '0'.

A short_NRT_service_name field is a short name of the NRT Service. When there is no short name of this NRT Service, this field shall be filled with NULLs ('0x00').

An NRT_service_category is a 6-bit enumerated type field that shall identify the type of service carried in this IP Service.

A num_components field (5-bit) specifies the number of IP stream components in this NRT Service.

An IP_version_flag is a 1-bit indicator, which when set to '0' shall indicate that source_IP_address, NRT_service_destination_IP_address, and component_destination_IP_address fields are IPv4 addresses. The value of 1 for this field is reserved for possible future indication that source_IP_address, NRT_service_destination_IP_address, and component_destination_IP_address fields are for IPv6.

A source_IP_address_flag is a 1-bit Boolean flag that shall indicate, when set, that a source IP address value for this NRT Service is present to indicate a source specific multicast.

An NRT_service_destination_IP_address_flag is a 1-bit Boolean flag that indicates, when set to '1', that an NRT_service_destination_IP_address value is present, to serve as the default IP address for the components of this NRT Service).

A source_IP_address field shall be present if the source_IP_address_flag is set to '1' and shall not be present if the source_IP_address_flag is set to '0'. If present, this field shall contain the source IP address of all the IP datagrams carrying the components of this NRT Service. The conditional use of the 128 bit-long address version of this field is to facilitate possible use of IPv6 in the future, although use of IPv6 is not currently defined.

An NRT_service_destination_IP_address field shall be present if the NRT_service_destination_IP_address_flag is set to '1' and shall not be present if the NRT_service_destination_IP_address_flag is set to '0'. If this NRT_service_destination_IP_address is not present, then the component_destination_IP_address field shall be present for each component in the num_components loop. The conditional use of the 128 bit-long address version of this field is to facilitate possible use of IPv6 in the future, although use of IPv6 is not currently defined.

According to one embodiment of the present invention, the NST provides information for a plurality of components using 'for' loop.

An essential_component_indicator is a one-bit indicator which, when set to '1', shall indicate that this component is an essential component for the NRT Service. Otherwise, this field indicates that this component is an optional component.

A port_num_count field shall indicate the number of destination UDP ports associated with this UDP/IP stream component. The values of the destination UDP port numbers shall start from the component_destination_UDP_port_num field and shall be incremented by one.

A component_destination_IP_address_flag is a 1-bit Boolean flag that shall indicate, when set to '1', that the component_destination_IP_address is present for this component.

A component_destination_IP_address field shall be present if the component_destination_IP_address_flag is set to '1' and shall not be present if the component_destination_IP_address_flag is set to '0'. When this field is present, the destination address of the IP datagrams carrying this component of the NRT Service shall match the address in this field. When this field is not present, the destination address of the IP datagrams carrying this component shall match the address in the NRT_service_destination_IP_address field. The conditional use of the 128 bit-long address version of this field is to facilitate possible use of IPv6 in the future, although use of IPv6 is not currently defined.

A component_destination_UDP_port_num is a 16-bit unsigned integer field that represents the destination UDP port number for this UDP/IP stream component.

A num_component_level_descriptors is a 16-bit unsigned integer field, that represents the number of descriptors providing additional information for IP stream component, may be included.

A component_level_descriptors field includes one or more descriptors providing additional information for this IP stream component, may be included.

A num_NRT_service_level_descriptors field (4 bit) specifies the number of NRT service level descriptors for this service.

An NRT_service_level_descriptor( ) field includes zero or more descriptors providing additional information for this NRT Service, may be included. This detailed service type can include a portal service for providing web contents, Push VOD, A/V download or the like.

A num_virtual_channel_level_descriptors field (4-bit) specifies the number of virtual channel level descriptors for this virtual channel.

A virtual_channel_level_descriptor( ) includes zero or more descriptors providing additional information for the virtual channel which this NST describes, may be included.

An NRT service is transferred via FLUTE and access information in an NST table is connected to FLUTE session information as follows. A Source_IP_address becomes a source IP address of a same server that transmits all channels of FLUTE session. NRT_service_destination_IP_Address is signaled if there exists a destination IP address at a session level of this FLUTE session.

A component can be mapped to a channel within a FLUTE session and can signal a separate destination IP address per channel (this is different from an IP address signaled by a session unit) through component_destination_IP_address. Moreover, a destination port number is signaled through component_destination_UDP_port_num. And, it is able to additionally designate the number of destination ports starting from component_destination_UDP_port_num through port_num_count.

By designating ports to a plural number, it is able to construct a plurality of channels for one destination IP address. In this case, one component is able to designate a plurality of channels. Yet, it is preferable that a channel is identified via a destination IP address in general. In this case, one channel can be regarded as mapped to one component.

An NRT Component Descriptor( )

Content items/files for an NRT service are transferred through FLUTE and corresponding FLUTE session information is signaled using access information in an NST table.

FIG. 13 is an exemplary diagram for a bit-stream syntax of NRT_component_descriptor( ) configured according to one embodiment of the present invention.

An NRT_component_descriptor( ) shall appear in the component descriptor loop of each component of each NRT Service in the NST and all parameters in the descriptor shall correspond to the parameters in use for that component of the NRT Service.

In the following description, each field carried on NRT_component_descriptor shown in FIG. 13 is described.

A descriptor_tag is 8-bit unsigned integer. It shall have the value, identifying this descriptor as the NRT_component_descriptor.

A descriptor_length is 8-bit unsigned integer shall specify the length (in bytes) immediately following this field up to the end of this descriptor.

A component_type field (7-bit) shall identify the encoding format of the component. The value may be any of the values assigned by IANA for the payload_type of an RTP/AVP stream [10], or it may be any of the values in Table 3 assigned by this document, or it may be a "dynamic value" within the range of 96 to 127. For components consisting of media carried via RTP, the value of this field shall match the value in the payload_type field in the RTP header of the IP stream carrying this component.

Note that additional values of the component_type field within the range of 43 to 71 can be defined in future versions of this standard. The NRT service stream transmitted through FLUTE protocol further requires parameters to signal a FLUTE session as a Table 3. In the Table 3, '38' of component_type being defined for FLUTE component in the ATSC or '43' of component_type newly being defined for transmission NRT may be used.

TABLE 3

| component_type | Meaning |
| --- | --- |
| 0-34 | Assigned or reserved by IANA, except that 20-24, 27, and 29-30 are unassigned |
| 35 | H.264/AVC video stream component (assigned by ATSC use) |
| 36 | SVC enhancement layer stream component (assigned by ATSC use) |
| 37 | HE AAC v2 audio stream component (assigned by ATSC use) |
| 38 | FLUTE file delivery session (assigned by ATSC use) |
| 39 | STKM stream component (assigned by ATSC use) |
| 40 | LTKM stream component (assigned by ATSC use) |
| 41 | OMA-RME DIMS stream component (assigned by ATSC use) |
| 42 | NTP timebase stream component (assigned by ATSC use) |
| 43-71 | [Unassigned by IANA and reserved by ATSC use] |
| 72-76 | Reserved by IANA |
| 77-95 | Unassigned by IANA |
| 96-127 | Designated by IANA for dynamic use |

A num_STKM_streams is an 8-bit unsigned integer field that shall identify the number of STKM streams associated with this component.

A STKM_stream_id is an 8-bit unsigned integer field that shall identify an STKM stream where keys to decrypt this protected component can be obtained, by reference to the STKM_stream_id in the component descriptor for the STKM stream.

An NRT_component_data (component_type) is explained as follow. The NRT_component_data( ) element provides the encoding parameters and/or other parameters necessary for rendering this component. The structure of the NRT_component_data is determined by the value of component_type field.

An NRT content or file is transmitted using a FLUTE session descriptor transferred through the NRT_component_descriptor( ).

The FDT of the FLUTE sessions which is used to deliver the items lists all the content items and gives their sizes, data types, and other information relevant to the acquisition of the items.

Therefore, the present invention obtains information for accessing a FLUTE session carrying a corresponding content using NST to receive a content selected from a service guide constructed using NCT. And, the present invention intends to map information on a content item of NCT to information on a file transferred via a corresponding FLUTE session. In this case, identification of a service including the selected content item can be done via the NRT_service_id of the aforesaid NST. Yet, as mentioned in the foregoing description of FIG. 3, in order to know one or more content items included in each NRT service and files belonging to the content items in further detail, mapping to a content identifier within FDT information on a FLUTE session is necessary rather than information on the FLUTE session carrying the corresponding content item(s).

The NRT service is transferred via FLUTE and access information in an NST is connected to FLUTE session information as follows.

A Source_IP_address becomes a source IP address of a same server that transmits all channels of FLUTE session. NRT_service_destination_IP_Address is signaled if there exists a destination IP address at a session level of this FLUTE session.

A component can be mapped to a channel within a FLUTE session and can signal a separate destination IP address per channel (this is different from an IP address signaled by a session unit) through component_destination_IP_address. Moreover, a destination port number is signaled through component_destination_UDP_port_num. And, it is able to additionally designate the number of destination ports starting from component_destination_UDP_port_num through port_num_count.

By designating ports to plural number, it is able to construct a plurality of channels for one destination IP address. In this case, one component is able to designate a plurality of channels. Yet, it is recommended that a channel is identified via a destination IP address in general. In this case, one channel can be regarded as mapped to one component.

In order to signal an additional attribute of a component constructing a session, it is able to use component_attribute_byte. Additional parameters required for signaling a FLUTE session can be signaled through this field.

In order to signal the FLUTE session, parameters are necessary. Such parameters include necessary parameters and parameters which are selectively necessary in association with the FLUTE session. First, the necessary parameters include a "source IP address" parameter, a "number of channels in the session" parameter, a "destination IP address and port number for each channel in the session" parameter, a "Transport Session Identifier (TSI) of the session" parameter and a "start time and end time of the session" parameter, and the parameters which are selectively necessary in association with the FLUTE session include an "FEC object transmission information" parameter, a "some information that tells a receiver in the first place, that the session contains files that are of interest", and a "bandwidth specification" parameter.

The "number of channels in the session" parameter may be explicitly provided or may be obtained by summing the number of streams configuring the session. Among the parameters, the "start time and end time of the session" parameter may be signaled through the SMT suggested by the present invention, and the "source IP address" parameter, the "destination IP address and port number for each channel in the session" parameter, the "Transport Session Identifier (TSI) of the session" parameter and the "number of channels in the session" parameter may be signaled through session_description_descriptor.

An NRT Component Data Descriptor

FIG. 14 is an exemplary diagram for a bit-stream syntax of an NCT section configured according to one embodiment of the present invention.

A single NRT service may contain multiple FLUTE sessions. Each session may be signaled using one or more FLUTE component descriptors, depending on the IP addresses and ports used for the sessions.

In the following description, each field of NRT_component_data_descriptor is explained in detail.

A TSI is a 16-bit unsigned integer field, which shall be the Transport Session Identifier (TSI) of the FLUTE session.

A session_start_time indicates the time at which the FLUTE session starts. If the value of this field is set to all zero, then it shall be interpreted to indicate that the session has already started.

A session_end_time indicates the time at which the FLUTE session ends. If the value of this field is set to all zero, then it shall be interpreted to mean that the session continues indefinitely.

A tias_bandwidth_indicator is a 1-bit field that flags the inclusion of Transport Independent Application Specific (TIAS) bandwidth information. This bit shall be set to '1' to indicate the TIAS bandwidth field is present, and it shall be set to '0' to indicate the TIAS bandwidth field is absent.

An as_bandwidth_indicator is a 1-bit field that flags the inclusion of Application Specific (AS) bandwidth information. This bit shall be set to '1' to indicate the AS bandwidth field is present, and it shall be set to '0' to indicate the AS bandwidth field is absent.

A FEC_OTI_indicator is a 1-bit indicator that indicates whether FEC Object Transmission Information is provided.

A tias_bandwidth field has a value. This value shall be one one-thousandth of the TIAS maximum bandwidth, rounded up to the next highest integer if necessary.

An as_bandwidth has a value. This value shall be the AS maximum bandwidth.

A FEC_encoding_id field identifies a FEC encoding ID used in this FLUTE session.

A FEC_instance_id field identifies a FEC instance ID used in this FLUTE session.

By signaling the above described parameters via FLUTE component data bytes, it is able to provide all information mandatory to receive a FLUTE session. And, it is ale to use a method of receiving FDT via this session, obtaining information all files carried on a FLUTE session via the received FDT and receiving these files.

This FLUTE component descriptor can be delivered via component_level_descriptor loop of NST. In case that there is a plurality of FLUTE channels, such parameters at a session level as TSI, session_start_time, session_end_time and the like should be signaled only once. Hence, one of the components of several channels can transmit a FLUTE component descriptor via Component_level_descriptor loop.

In the following description, NCT is explained. FIG. 15 is a diagram for a bit-stream syntax of an NCT section configured according to one embodiment of the present invention.

In the following description, explained is NCT associated with signaling/announcement of an NRT content transmitted per NRT content delivery channel signaled via the above described NST.

In FIG. 15, an NCT is newly defined to signal NRT content. This is just one of various embodiments and other methods are considerable as well. Via NCT, it is able to signal an NRT content carried on a specific NRT content delivery channel. Information of each field constructing an NCT section is explained in detail as follows.

First of all, a table_id field (8 bits) identifies whether a corresponding table section is a table section constructing an NCT.

An NRT_service_id field describes a service_id of an NRT content delivery channel that delivers a content described in NCT.

A version_number field indicates a version number of NCT. Hence, a receiver is able to know whether an NCT content is changed, using the version_number.

A num_contents_in_section field indicates the number of contents described in NCT or the number of contents (or, files) carried on a virtual channel described as source_id.

A content_version field indicates a version number for content (or a file) having a specific content_id value. In particular, if a content_id, which was received and stored in advance by a receiver, is set to '0x0101', a same content, i.e., a file having a content_id value set to '0x0010' is transferred. If the content_version is different to that of the previously received and stored content, a content newly announced via NCT is received to update or replace the previously stored content. According to the present embodiment, the content_version field means a serial number indicating a version of release but may be able to represent a real published (released) time in direct. In this case, if it is difficult to represent a published time using the content_version field, it is able to use a new field capable of representing the published (released) time.

A content_id field indicates an ID value capable of identifying content (or, a file), which will be received and stored, uniquely.

A content_available_start_time field indicates a start time of a FLUTE session capable of receiving content. And, a content_available_end_time field indicates an end time of the FLUTE session capable of receiving the content.

A content_length_in_seconds field indicates a real playback time of a corresponding content by a unit of second if the content (or file) is an A/V file.

A content_size field indicates a size of content (or, a file) by a byte unit.

A content_delivery_bit_rate field indicates a bit rate for transmitting content (or, a file) and means a target bit rate. In particular, this field indicates a bandwidth that will be allocated when a service provider or a broadcasting station transmits a corresponding content. Using this information, a receiver is aware of a minimum time consumed for receiving a corresponding file using the content_size and the content_delivery_bit_rate. Namely, it is able to provide a user with corresponding information by estimating a time taken to receive content. In this case, minimum time for receiving is obtained from calculating (content_size*8)/(content_delivery_bit_rate) by a unit of seconds.

A content_title_length field indicates a length of content_title_text( ) by a byte unit. Using this, it is able to know how many bytes need to be read to enable a receiver to exactly obtain content_title_text( ) information.

A content_title_text( ) field is a content title in the format of a multiple string structure (MSS).

As a method of constructing the above described NST, one or more NRT channels can include one channel.

In this disclosure, an NRT channel is constructed by an NRT service unit. And, it is capable to have at least one FLUTE session for transferring a file via FLUTE.

In general, a FLUTE session can be uniquely identified/referenced using such a parameter as a TSI, an IP, a port address and the like and is temporally bound to a session_start_time and a session_end_time.

In constructing a table, using session_start_time and session_end_time, a FLUTE session during this time period is announced.

It is able to configure information on all NRT channels, which are currently transmitted or shall be transmitted in the future, with one table. This can be divided into a present time (a predetermined period from a present time) and a future time (after the period defined as the present time). Alternatively, the information can be sent by being divided into three sections including a predetermined time within a present time (e.g., 24 hours), a predetermined time after the former predetermined time (e.g., 24 hours) and a time after the latter predetermined time and then constructing tables for the three sections, respectively.

Moreover, using a table_id, it is able to discriminate whether it indicates guide information on a currently receivable content or guide information on a content receivable in the future. This relates to a method of separating an NRT service receivable within a short time range from a current time and services receivable after the time into different tables and then transmitting the tables.

In case of receiving the guide information on a content receivable in the future, a receiver performs temporal alignment using available_start_time and available_end_time information of each content and enables the guide information on the NRT service to be outputted to a user.

Yet, despite changing a table constructing method different from the above described example, each field constructing a table element shall be identical.

An NRT Service Signaling Architecture

Figure 16:
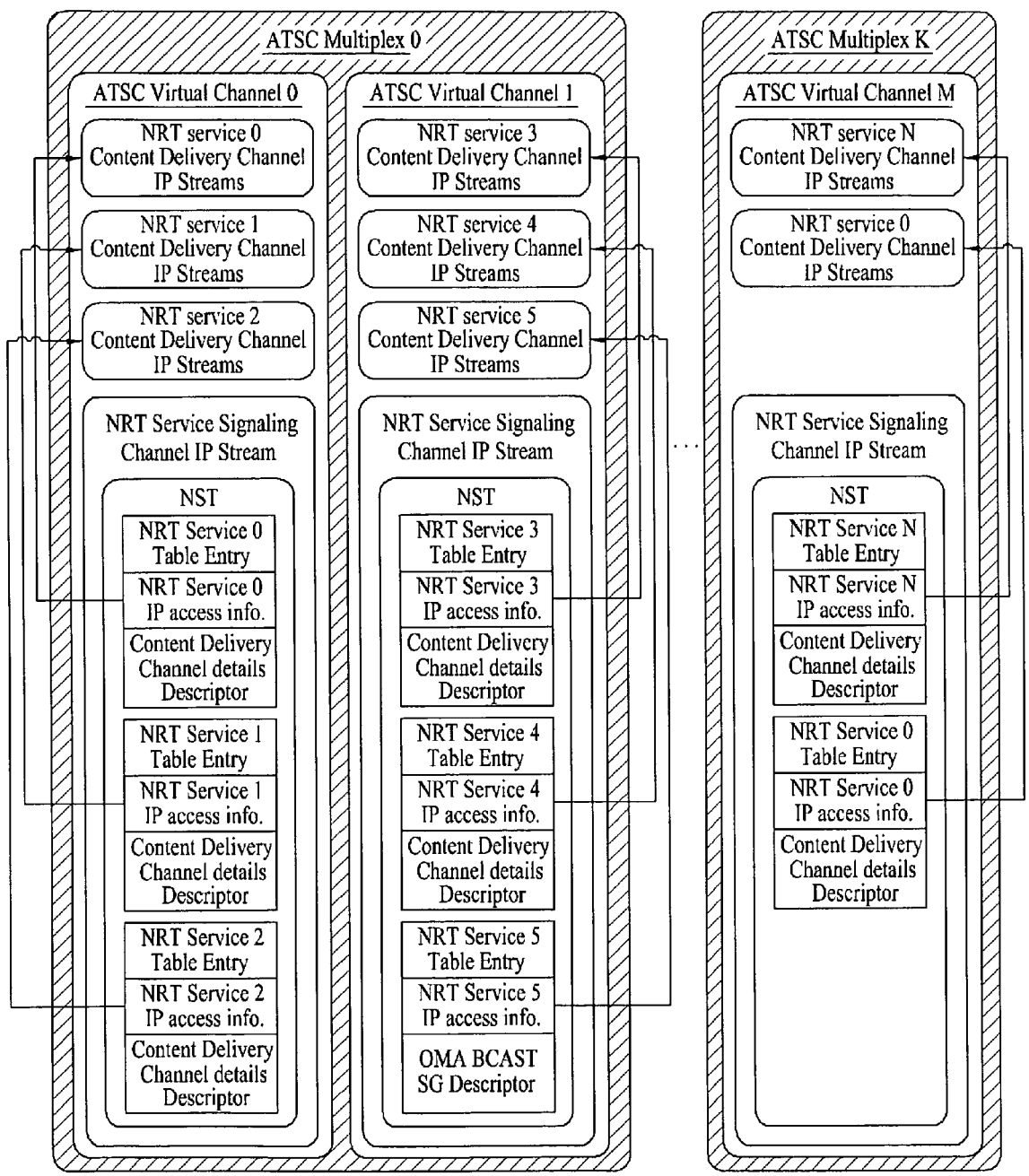
FIG. 16 is a diagram for an NRT service signaling structure configured according to another embodiment of the present invention.

FIG. 16 is a diagram for an NRT service signaling structure configured according to another embodiment of the present invention.

Referring to FIG. 16, each ATSC virtual channel includes at least one of content delivery channel to be transferred as IP stream including each NRT service and NRT service signaling channel to be transferred as IP stream transferring signaling information of each content delivery channel. At this time, the NST is transferred via the NRT service signaling channel. The NST includes a table entry and signals the content delivery channel transferring corresponding NRT service. For instance, three NRT channels are provided on ATSC Virtual Channel 0 and NRT channels 0, 1 and 2 are NRT content delivery channels. In case of ATSC Virtual Channel 1, three NRT channels are provided on NRT channel 5. And, NRT channels 3, 4 and 5 are NRT content delivery channels. In particular, one virtual channel includes one or more NRT channels and the NRT channel can be an NRT content delivery channel. And, an NST is able to identify each of the NRT channels or each of the NRT content delivery channels. Each of the NRT channels carries an IP stream. On this NRT service signaling, a signaling flow according to a method of accessing an NRT content delivery channel is available.

A Fixed NRT Content Delivery Channel

As a method of accessing an NRT content delivery channel for carrying NRT content, the following method is available.

A method of directly signaling NRT content delivery channel information via an NST table is for directly delivering basic information on an NRT channel and access information via an NST. If an NST side performs this NRT channel metadata transmission, the following advantages exist.

First of all, in this case, by directly signaling in NST without an additional process for receiving and processing separate service guide information, it is able to receive channel metadata in the early timing point. Therefore, it is able to raise a service access speed. Moreover, it is able to perform update signaling for a changed item of a channel in a broadcasting environment more quickly and by real time.

Thus, if NRT service information carrying an NRT content delivery channel on an NST is directly signaled, a content delivery channel access is possible with an NST only without a separate signaling process.

An NRT content delivery channel for carrying real NRT content can have an NRT channel type value set to '0x0F'.

An NRT Content Delivery Channel Details Descriptor

In order to perform signaling on an NRT content delivery channel via an NST in the course of the above process, the following method is available. It is able to identify an NRT service carrying an NRT content delivery channel if a service category value is set to '0x0F'. Additional information of an NRT content delivery channel can be delivered being transmitted in a manner that an NRT content delivery channel details descriptor exemplarily shown in FIG. 17 is inserted in a descriptor loop of NST.

FIG. 17 is a diagram for a bit-stream syntax of an NRT Content delivery channel details descriptor configured according to one embodiment of the present invention.

Fields of an NRT Content delivery channel details descriptor are explained in detail as follows.

A descriptor_tag is 8-bit unsigned integer that has the value '0xTBD', identifying this descriptor as NRT_content_delivery_channel_details_descriptor.

A descriptor_length is 8-bit unsigned integer that specifies the length (in bytes) immediately following this field up to the end of this descriptor.

A storage_reservation is 32-bit unsigned integer that specifies minimum device storage (in bytes) required for subscription to this channel.

An Updated is 32-bit unsigned integer, which shall represent time when the channel metadata was last updated as the number of GPS seconds since 00:00:00 UTC, Jan. 6, 1980.

A content_types_length field shall specify the length (in bytes) of the content_types_text( ).

A content_types_text( ) field shall give a comma-separated list of strings that describe the type of channel content e.g. by "category", "tag" or "relation".

A mime_types_length field shall specify the length (in bytes) of the mime_types_text( ).

A mime_types_text( ) field shall give a comma-separated list of MIME types for content items in the offered channel.

A charging_rules_length field shall specify the length (in bytes) of the charging_rules_text( ).

A charging_rules_text( ) field shall give Information that at least defines who is responsible for the channel charging, charging method (based upon a subscription or a consumption).

A num_purchase_options field (8-bit) shall specify the number of purchase options in this NRT Content delivery channel descriptor.

A purchase_option_id_length field shall specify the length (in bytes) of the purchase_option_id_text( ).

A purchase_option_id_text( ) field shall give an identifier of the purchase option, that will be used to identify the selected option.

A cost_information_flag is a 1-bit Boolean flag that shall indicate, when set to '1', that the cost_information is present for this component.

A price_information_flag is a 1-bit Boolean flag that shall indicate, when set to '1', that the amount and currency is present for this component.

A cost_information_length field shall specify the length (in bytes) of the cost_information_text( ).

A cost_information_text( ) field shall give an identifier of the purchase option, that will be used to identify the selected option.

An amount is a 32-bit float, which shall specify the monetary value of the price for this purchase option.

A currency is a 16-bit unsigned integer, which shall specify the monetary currency codes.

The above described descriptor is included in a position of service_level_descriptor within NST or can be included in a position of content_level_descriptor within NCT.

A Protocol for a Mobil NRT Service

Hereinafter, the mobile NRT service is specified as follows.

Figure 18:
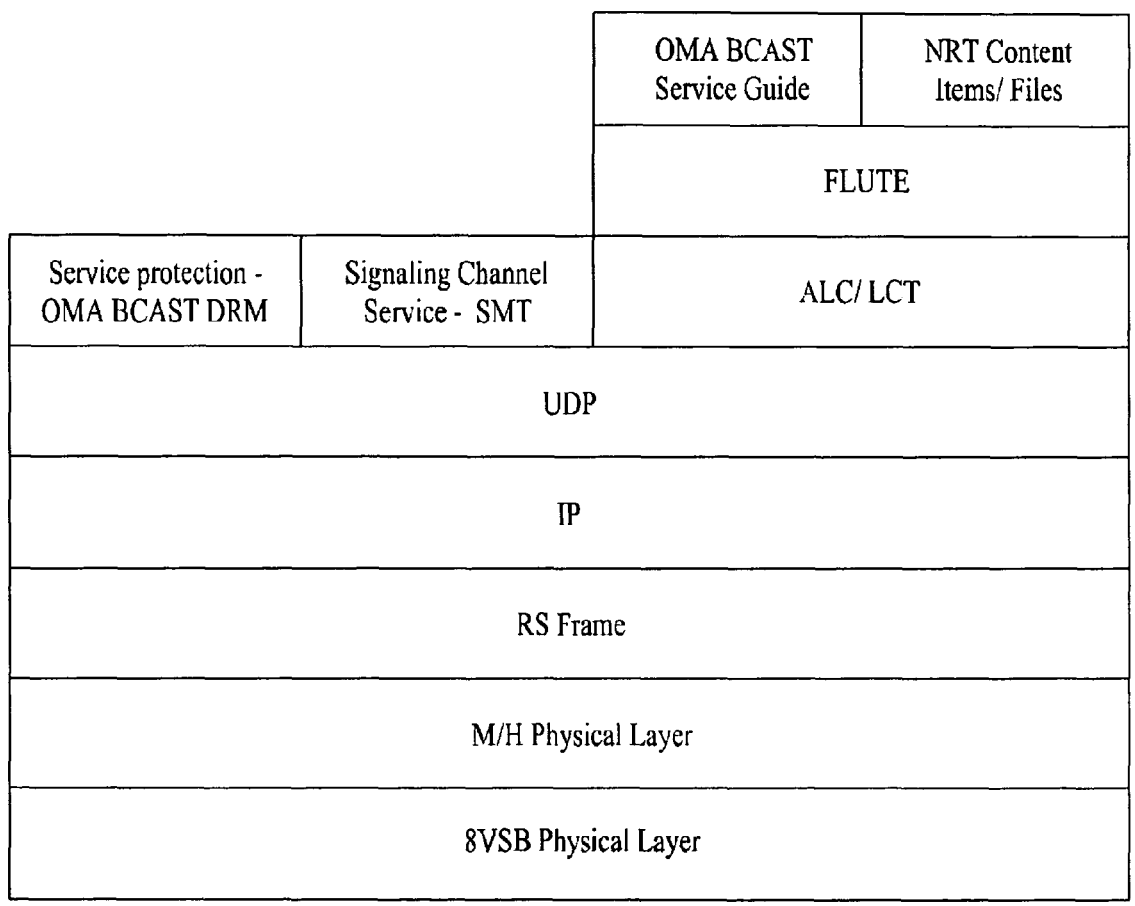
FIG. 18 is a diagram for a protocol stack of a mobile NRT service configured according to one embodiment of the present invention.

FIG. 18 is a diagram for a protocol stack of a mobile NRT service configured according to one embodiment of the present invention.

In FIG. 18, an IP datagram containing signaling information may be transmitted without using an MPEG-2 TS format, by inserting an adaption layer between an IP layer and a physical layer.

In FIG. 18, an NRT service for a mobile service is packetized according to a User Datagram Protocol (UDP) scheme in the IP layer, and a UDP packet is packetized again according to an IP scheme, thereby obtaining UDP/IP packet data. In the present specification, the packetized UDP/IP packet data is referred to as an IP datagram for simplicity. In addition, a signaling information channel containing an SMT is also packetized according to a UDP scheme and a UDP packet is packetized again according to an IP scheme, thereby obtaining UDP/IP packet data.

In FIG. 18, an OMA BCAST SG and NRT content items/files are transmitted according to a FLUTE scheme and are packetized again according to an Asynchronous Layered Coding/Layered Coding Transport (ALC/LCT) scheme. An ALC/LCT packet is packetized again according to an IP scheme, thereby obtaining ALC/LCT/UDP/IP packet data.

Moreover, an RS frame including the packetized IP datagram is generated. The generated RS frame is transmitted to a receiving system modulated by pre-defined transmission method (e.g. VSB).

A Receiving System for Processing a Mobile NRT Service

Figure 19:
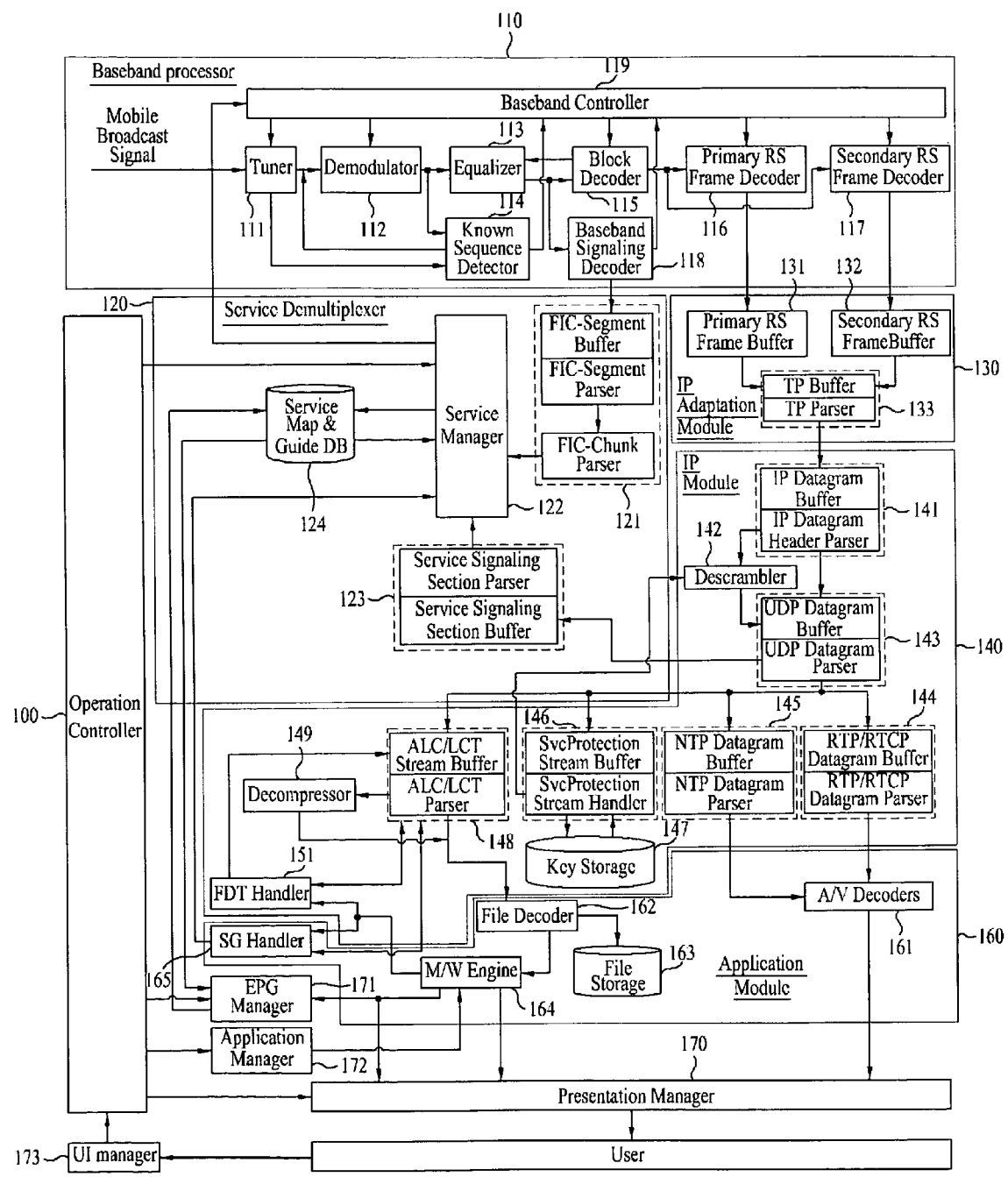
FIG. 19 is an exemplary block diagram showing the configuration of a reception system according to an embodiment of the present invention.

FIG. 19 is an exemplary block diagram of a receiving system according to one embodiment of the present invention.

Referring to FIG. 19, the receiving system according to the present invention may include an operation controller 100, a tuner 111, a demodulator 112, an equalizer 113, a known sequence detector (or known data detector) 114, a block decoder 115, a primary Reed-Solomon (RS) frame decoder 116, a secondary RS frame decoder 117, a signaling decoder 118, and a baseband controller 119. The receiving system according to the present invention may further include an FIC handler 121, a service manager 122, a service signaling handler 123, and a first storage unit 124. The receiving system according to the present invention may further include a primary RS frame buffer 131, a secondary RS frame buffer 132, and a transport packet (TS) handler 133. The receiving system according to the present invention may further include an Internet Protocol (IP) datagram handler 141, a descrambler 142, an User Datagram Protocol (UDP) datagram handler 143, a Real-time Transport Protocol/Real-time Transport Control Protocol (RTP/RTCP) datagram handler 144, a Network Time Protocol (NTP) datagram handler 145, a service protection stream handler 146, a second storage unit 147, an Asynchronous Layered Coding/Layered Coding Transport (ALC/LCT) stream handler 148, a decompressor 149, an Extensible Mark-up Language (XML) parser 150, and a Field Device Tool (FDT) handler 151. The receiving system according to the present invention may further include an Audio/Video (A/V) decoder 161, a file decoder 162, a third storage unit 163, a middle ware (M/W) engine 164, and a Service Guide (SG) handler 165. The receiving system according to the present invention may further include an Electronic Program Guide (EPG) manager 171, an application manager 172, and a User Interface (UI) manager 173.

Herein, for simplicity of the description of the present invention, the operation controller 100, the tuner 111, the demodulator 112, the equalizer 113, the known sequence detector (or known data detector) 114, the block decoder 115, the primary RS frame decoder 116, the secondary RS frame decoder 117, the signaling decoder 118, and the baseband controller 119 will be collectively referred to as a baseband processor 110. The FIC handler 121, the service manager 122, the service signaling handler 123, and the first storage unit 124 will be collectively referred to as a service multiplexer 120. The primary RS frame buffer 131, the secondary RS frame buffer 132, and the TS handler 133 will be collectively referred to as an IP adaptation module 130. The IP datagram handler 141, the descrambler 142, the UDP datagram handler 143, the RTP/RTCP datagram handler 144, the NTP datagram handler 145, the service protection stream handler 146, the second storage unit 147, the ALC/LCT stream handler 148, the XML parser 150, and the FDT handler 151 will be collectively referred to as a common IP module 140. The A/V decoder 161, the file decoder 162, the third storage unit 163, the M/W engine 164, and the SG handler 165 will be collectively referred to as an application module 160.

In addition, although the terms used in FIG. 19 are selected from generally known and used terms, some of the terms mentioned in the description of FIG. 19 have been selected by the applicant at his or her discretion, the detailed meanings of which are described in relevant parts of the description herein. Furthermore, it is required that the present invention is understood, not simply by the actual terms used but by the meaning of each term lying within.

Referring to FIG. 19, the operation controller 100 controls the operation of each block included in the baseband processor 110.

By tuning the receiving system to a specific physical channel frequency (or physical transmission channel frequency, PTC), the tuner 111 enables the receiving system to receive main service data, which correspond to broadcast signals for fixed-type broadcast receiving systems, and mobile service data, which correspond to broadcast signals for mobile broadcast receiving systems. At this point, the tuned frequency of the specific physical channel is down-converted to an intermediate frequency (IF) signal, thereby being outputted to the demodulator 112 and the known sequence detector 114. The passband digital IF signal being outputted from the tuner 111 may only include main service data, or only include mobile service data, or include both main service data and mobile service data.

The demodulator 112 performs self-gain control, carrier recovery, and timing recovery processes on the passband digital IF signal inputted from the tuner 111, thereby modifying the IF signal to a baseband signal. Then, the demodulator 112 outputs the baseband signal to the equalizer 113 and the known sequence detector 114. The demodulator 112 uses the known data symbol sequence inputted from the known sequence detector 114 during the timing and/or carrier recovery, thereby enhancing the demodulating performance.

The equalizer 113 compensates channel-associated distortion included in the signal demodulated by the demodulator 112. Then, the equalizer 113 outputs the distortion-compensated signal to the block decoder 115. By using a known data symbol sequence inputted from the known sequence detector 114, the equalizer 113 may enhance the equalizing performance. Furthermore, the equalizer 113 may receive feedback on the decoding result from the block decoder 115, thereby enhancing the equalizing performance.

The known sequence detector 114 detects known data place (or position) inserted by the transmitting system from the input/output data (i.e., data prior to being demodulated or data being processed with partial demodulation). Then, the known sequence detector 114 outputs the detected known data position information and known data sequence generated from the detected position information to the demodulator 112, the equalizer 113, and the baseband controller 119. Additionally, in order to allow the block decoder 115 identifying the mobile service data that have been processed with additional encoding by the transmitting system and the main service data that have not been processed with any additional encoding, the known sequence detector 114 outputs such corresponding information to the block decoder 115.

If the data channel-equalized by the equalizer 113 and inputted to the block decoder 115 correspond to data processed with both block-encoding of serial concatenated convolution code (SCCC) method and trellis-encoding by the transmitting system (i.e., data within the RS frame, signaling data), the block decoder 115 may perform trellis-decoding and block-decoding as inverse processes of the transmitting system. On the other hand, if the data channel-equalized by the equalizer 113 and inputted to the block decoder 115 correspond to data processed only with trellis-encoding and not block-encoding by the transmitting system (i.e., main service data), the block decoder 115 may perform only trellis-decoding.

The signaling decoder 118 decodes signaling data that have been channel-equalized and inputted from the equalizer 113. It is assumed that the signaling data (or signaling information) inputted to the signaling decoder 118 correspond to data processed with both block-encoding and trellis-encoding by the transmitting system. Examples of such signaling data may include transmission parameter channel (TPC) data and fast information channel (FIC) data. For example, among the data that are being inputted, the signaling decoder 118 performs regressive turbo decoding of a parallel concatenated convolution code (PCCC) method on data corresponding to the signaling information region. Subsequently, the signaling decoder 118 separates FIC data and TPC data from the regressive-turbo-decoded signaling data. Additionally, the signaling decoder 118 performs RS-decoding as inverse processes of the transmitting system on the separated TPC data, thereby outputting the processed data to the baseband controller 119. Also, the signaling decoder 118 performs deinterleaving in sub-frame units on the separated FIC data, so as to perform RS-decoding as inverse processes of the transmitting system on the deinterleaved FIC data, thereby outputting the processed data to the FIC handler 121. The FIC data being deinterleaved and RS-decoded from the signaling decoder 118 and outputted to the FIC handler 121 are transmitted in units of FIC segments.

The FIC handler 121 receives FIC data from the signaling decoder 118, so as to extract signaling information for service acquisition (i.e., mapping information between an ensemble and a mobile service). In order to do so, the FIC handler 121 may include an FIC segment buffer, an FIC segment parser, and an FIC chunk parser.

The FIC segment buffer buffers FIC segment groups being inputted in M/H frame units from the signaling decoder 118, thereby outputting the buffered FIC segment groups to the FIC segment parser. Thereafter, the FIC segment parser extracts the header of each FIC segment stored in the FIC segment buffer so as to analyze the extracted headers. Then, based upon the analyzed result, the FIC segment parser outputs the payload of the respective FIC segments to the FIC chunk parser. The FIC chunk parser uses the analyzed result outputted from the FIC segment parser so as to recover the FIC chunk data structure from the FIC segment payloads, thereby analyzing the received FIC chunk data structure. Subsequently, the FIC chunk parser extracts the signaling information for service acquisition. The signaling information acquired from the FIC chunk parser is outputted to the service manager 122.

Meanwhile, the service signaling handler 123 consists of a service signaling buffer and a service signaling parser. Herein, the service signaling handler 123 buffers table sections of a service signaling channel being transmitted from the UDP datagram handler 143, thereby analyzing and processing the buffered table sections. Similarly, the signaling information processed by the service signaling handler 123 is also outputted to the service manager 122.

The service signaling channel transferring a service map table (SMT) section is received via the RS frame according to one embodiment of the present invention. The RS frame is a type of UDP/IP packet having a well-known IP destination address and well-known destination UDP port number. Accordingly, a receiver can process the SMT section and therein the descriptor without separate information.

In this case, the SMT section provides signaling information related to all services in the Ensemble including the corresponding SMT section. Accordingly, the receiver can access an IP stream component in wanted service using the SMT section data and provide corresponding service to user.

The SMT section data is stored the first storage unit 124 collected by the service manager 122. In this case, the stored SMT section data is changed a service map format by the service manager 122.

The service manager 122 uses the signaling information collected from each of the FIC handler 121 and the service signaling handler 123, so as to configure a service map. Thereafter, the service manager 122 uses a service guide (SG) collected from the service guide (SG) handler 165 so as to draw up a program guide. Then, the service manager 122 controls the baseband controller 119 so that a user can receive (or be provided with) a user-requested mobile service by referring to the service map and service guide. Furthermore, the service manager 122 may also control the receiving system so that the program guide can be displayed on at least a portion of the display screen based upon the user's input.

The first storage unit 124 stores the service map and service guide drawn up by the service manager 122. Also, based upon the requests from the service manager 122 and the EPG manager 171, the first storage unit 124 extracts the required data, which are then transferred to the service manager 122 and/or the EPG manager 171.

The operation controller 100 stores a service map and a service guide provided by the service manager 122. Moreover, the operation controller 100 extracts required data according to a request of the service manager 122 or the EPG manager 171 and transfers the extracted data to the service manager 122 or the EPG manager 171.

The operation controller 100 receives the known data place information and TPC data, thereby transferring M/H frame time information, information indicating whether or not a data group exists in a selected parade, place information of known data within a corresponding data group, power control information, and so on to each block within the baseband processor 110. The TPC data will be described in detail in a later process.

Meanwhile, according to the present invention, the transmitting system uses RS frames by encoding units. Herein, the RS frame may be divided into a primary RS frame and a secondary RS frame. However, according to the embodiment of the present invention, the primary RS frame and the secondary RS frame will be divided based upon the level of importance of the corresponding data.

The primary RS frame decoder 116 receives the data outputted from the block decoder 115. At this point, according to the embodiment of the present invention, the primary RS frame decoder 116 receives only the mobile service data that have been Reed-Solomon (RS)-encoded and/or cyclic redundancy check (CRC)-encoded from the block decoder 115.

Herein, the primary RS frame decoder 116 receives at least one of the mobile service data, the NRT service data, the SMT section data, OMA BCAST SG data, and not the main service data. The primary RS frame decoder 116 performs inverse processes of an RS frame encoder (not shown) included in the digital broadcast transmitting system, thereby correcting errors existing within the primary RS frame. More specifically, the primary RS frame decoder 116 forms a primary RS frame by grouping a plurality of data groups and, then, corrects errors in primary RS frame units. In other words, the primary RS frame decoder 116 decodes primary RS frames, which are being transmitted for actual broadcast services. The primary RS frame decoded by the primary RS frame decoder 116 outputs to the primary RS frame buffer 131. The primary RS frame buffer 131 buffers the primary RS frame, and then configures an M/H TP in each row unit. The M/H TPs of the primary RS frame outputs to the TP handler 133.

Additionally, the secondary RS frame decoder 117 receives the data outputted from the block decoder 115. At this point, according to the embodiment of the present invention, the secondary RS frame decoder 117 receives only the mobile service data that have been RS-encoded and/or CRC-encoded from the block decoder 115. Herein, the secondary RS frame decoder 117 receives only the mobile service data and not the main service data. The secondary RS frame decoder 117 performs inverse processes of an RS frame encoder (not shown) included in the digital broadcast transmitting system, thereby correcting errors existing within the secondary RS frame. More specifically, the secondary RS frame decoder 117 forms a secondary RS frame by grouping a plurality of data groups and, then, corrects errors in secondary RS frame units. In other words, the secondary RS frame decoder 117 decodes secondary RS frames, which are being transmitted for mobile audio service data, mobile video service data, guide data, and so on. The secondary RS frame decoded by the secondary RS frame decoder 117 outputs to the secondary RS frame buffer 132. The secondary RS frame buffer 132 buffers the secondary RS frame, and then configures an M/H TP in each row unit. The M/H TPs of the secondary RS frame outputs to the TP handler 133.

The TP handler 133 consists of a TP buffer and a TP parser. The TP handler 133 buffers the M/H TPs inputted from the primary RS frame buffer 131 and the secondary RS frame buffer 132, and then extracts and analyzes each header of the buffered M/H TPs, thereby recovering IP datagram from each payload of the corresponding M/H TPs. The recovered IP datagram is outputted to the IP datagram handler 141.

The IP datagram handler 141 consists of an IP datagram buffer and an IP datagram parser. The IP datagram handler 141 buffers the IP datagram delivered from the TP handler 133, and then extracts and analyzes a header of the buffered IP datagram, thereby recovering UDP datagram from a payload of the corresponding IP datagram. The recovered UDP datagram is outputted to the UDP datagram handler 143.

If the UDP datagram is scrambled, the scrambled UDP datagram is descrambled by the descrambler 142, and the descrambled UDP datagram is outputted to the UDP datagram handler 143. For example, when the UDP datagram among the received IP datagram is scrambled, the descrambler 142 descrambles the UDP datagram by inputting an encryption key and so on from the service protection stream handler 146, and outputs the descrambled UDP datagram to the UDP datagram handler 143.

The UDP datagram handler 143 consists of an UDP datagram buffer and an UDP datagram parser. The UDP datagram handler 143 buffers the UDP datagram delivered from the IP datagram handler 141 or the descrambler 142, and then extracts and analyzes a header of the buffered UDP datagram, thereby recovering data transmitted through a payload of the corresponding UDP datagram. If the recovered data is an RTP/RTCP datagram, the recovered data is outputted to the RTP/RTCP datagram handler 144. If the recovered data is also an NTP datagram, the recovered data is outputted to the NTP datagram handler 145. Furthermore, if the recovered data is a service protection stream, the recovered data is outputted to the service protection stream handler 146. And, if the recovered data is an ALC/LCT stream, the recovered data is outputted to the ALC/LCT steam handler 148.

The IP datagram handler 141 and UDP datagram handler 143 can output data including the SMT section data to the service signaling section handler 123.

The RTP/RTCP datagram handler 144 consists of an RTP/RTCP datagram buffer and an RTP/RTCP datagram parser. The RTP/RTCP datagram handler 144 buffers the data of RTP/RTCP structure outputted from the UDP datagram handler 143, and then extracts A/V stream from the buffered data, thereby outputting the extracted A/V stream to the A/V decoder 161.

The A/V decoder 161 decodes the audio and video streams outputted from the RTP/RTCP datagram handler 144 using audio and video decoding algorithms, respectively. The decoded audio and video data is outputted to the presentation manager 170. Herein, at least one of an AC-3 decoding algorithm, an MPEG 2 audio decoding algorithm, an MPEG 4 audio decoding algorithm, an AAC decoding algorithm, an AAC+ decoding algorithm, an HE AAC decoding algorithm, an AAC SBR decoding algorithm, an MPEG surround decoding algorithm, and a BSAC decoding algorithm can be used as the audio decoding algorithm and at least one of an MPEG 2 video decoding algorithm, an MPEG 4 video decoding algorithm, an H.264 decoding algorithm, an SVC decoding algorithm, and a VC-1 decoding algorithm can be used as the audio decoding algorithm.

The NTP datagram handler 145 consists of an NTP datagram buffer and an NTP datagram parser. The NTP datagram handler 145 buffers data having an NTP structure, the data being outputted from the UDP datagram handler 143. Then, the NTP datagram handler 145 extracts an NTP stream from the buffered data. Thereafter, the extracted NTP stream is outputted to the A/V decoder 161 so as to be decoded.

The service protection stream handler 146 may further include a service protection stream buffer. Herein, the service protection stream handler 146 buffers data designated (or required) for service protection, the data being outputted from the UDP datagram handler 143. Subsequently, the service protection stream handler 146 extracts required information for descrambling from the extracted data. The information required for descrambling includes a key value, such as STKM and LTKM. The information for descrambling is stored in the second storage unit 147, and, when required, the information for descrambling is outputted to the descrambler 142.

The ALC/LCT stream handler 148 consists of an ALC/LCT stream buffer and an ALC/LCT stream parser. And, the ALC/LCT stream handler 148 buffers data having an ALC/LCT structure, the data being outputted from the UDP datagram handler 143. Then, the ALC/LCT stream handler 148 analyzes a header and a header expansion of an ALC/LCT session from the buffered data. Based upon the analysis result of the header and header expansion of the ALC/LCT session, when the data being transmitted to the ALC/LCT session correspond to an XML structure, the corresponding data are outputted to an XML parser 150. Alternatively, when the data being transmitted to the ALC/LCT session correspond to a file structure, the corresponding data are outputted to a file decoder 162. At this point, when the data that are being transmitted to the ALC/LCT session are compressed, the compressed data are decompressed by a decompressor 149, thereby being outputted to the XML parser 150 or the file decoder 162.

If the data transferred through the ALC/LCT session is compressed, the decompressor 149 decompresses the transferred data and outputs the decompressed data to the file decoder 162.

The FDT handler 151 analyzes and processes a file description table of a FLUTE protocol, which is transmitted in an XML structure through the ALC/LCT session.

The SG handler 165 collects and analyzes the data designated for a service guide, the data being transmitted in an XML structure, thereby outputting the analyzed data to the service manager 122.

The file decoder 162 decodes the data having a file structure and being transmitted through the ALC/LCT session, thereby outputting the decoded data to the middleware engine 164 or storing the decoded data in a third storage unit 163. Herein, the middleware engine 164 translates the file structure data (i.e., the application) and executes the translated application. Thereafter, the application may be outputted to an output device, such as a display screen or speakers, through the application presentation manager 170. According to an embodiment of the present invention, the middleware engine 164 corresponds to a JAVA-based middleware engine.

Based upon a user-input, the EPG manager 171 receives EPG data either through the service manager 122 or through the SG handler 165, so as to convert the received EPG data to a display format, thereby outputting the converted data to the presentation manager 170.

The application manager 172 performs overall management associated with the processing of application data, which are being transmitted in object formats, file formats, and so on. Furthermore, based upon a user-command inputted through the UI manager 173, the operation controller 100 controls at least one of the service manager 122, the EPG manager 171, the application manager 172, and the presentation manager 170, so as to enable the user-requested function to be executed. The UI manager 173 transfers the user-input to the operation controller 100 through the UI.

Finally, the presentation manager 170 provides at least one of the audio and video data being outputted from the A/V decoder 161 and the EPG data being outputted from the EPG manager 171 to the user through the speaker and/or display screen.

Regarding the present invention, the NRT service is included the mobile broadcast service. The NRT service is signaled by the SMT section. In this case, the SMT section, for example, is extracted from the primary RS frame decoder 116 or the second RS frame decoder 117. The extracted SMT section data is processed by IP module through the IP adaptation module. At this time, the IP datagram including the extracted SMT section is processed by IP datagram handler 141. And the UDP datagram is processed by the UDP datagram handler 143. The UDP datagram handler 143 extracts the SMT section data from the processed UDP datagram. The extracted SMT section data is processed by service signaling section handler 123. Moreover, the FDT data and the NRT service data except the SMT section data may provide an NRT service processed by the mobile broadcast receiver through ALC/LCT processor.

A Structure of Data Format for the Mobile NRT Service

Meanwhile, the data structure used in the mobile broadcasting technology according to the embodiment of the present invention may include a data group structure and an RS frame structure, which will now be described in detail.

Figure 20:
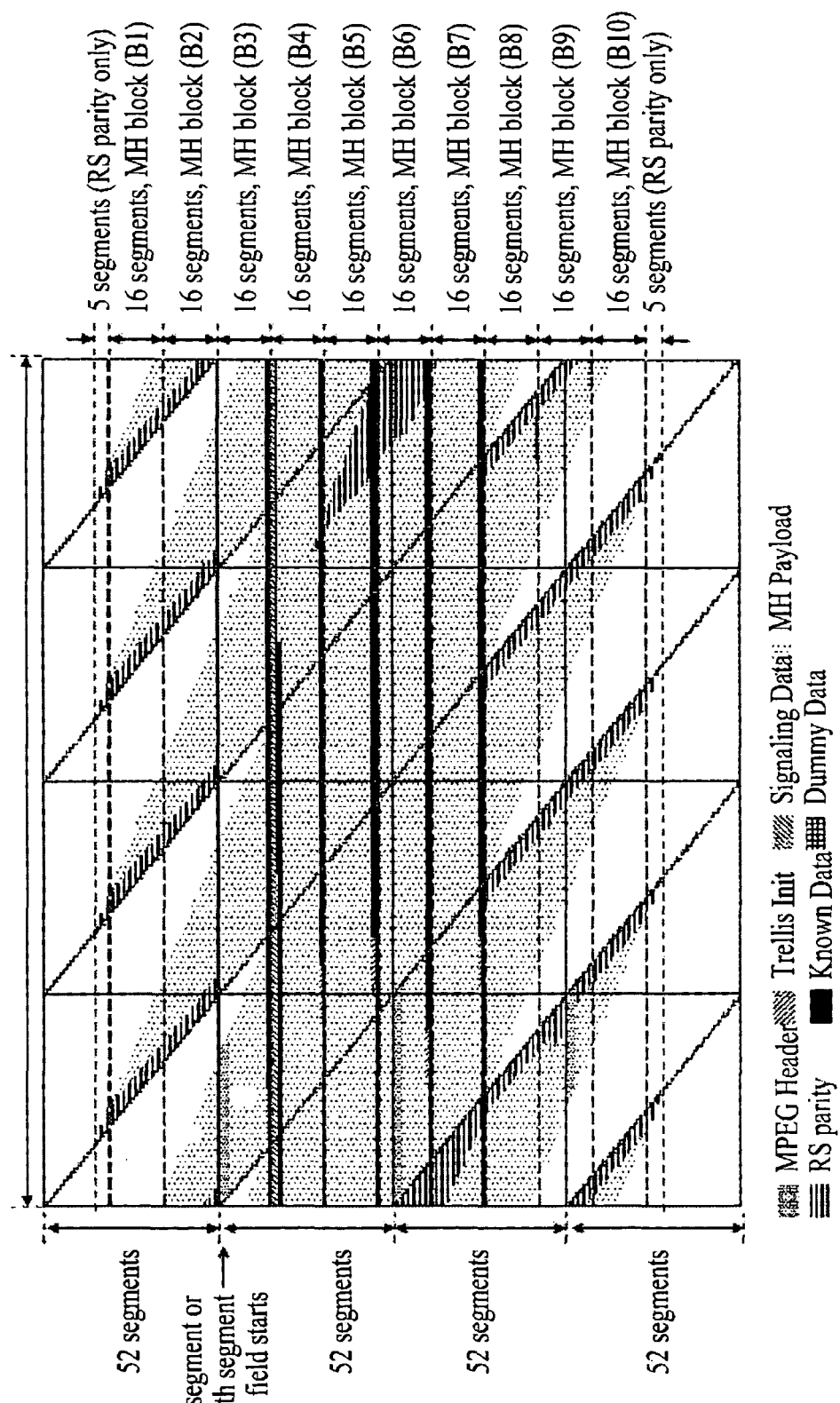
FIG. 20 is a view showing an embodiment of the structure of a data group according to the present invention.

FIG. 20 illustrates an exemplary structure of a data group according to the present invention. FIG. 20 shows an example of dividing a data group according to the data structure of the present invention into 10 M/H blocks (i.e., M/H block 1 (B1) to M/H block 10 (B10)). In this example, each M/H block has the length of 16 segments. Referring to FIG. 20, only the RS parity data are allocated to portions of the 5 segments before the M/H block 1 (B1) and the 5 segments following the M/H block 10 (B10). The RS parity data are excluded in regions A to D of the data group. More specifically, when it is assumed that one data group is divided into regions A, B, C, and D, each M/H block may be included in any one of region A to region D depending upon the characteristics of each M/H block within the data group.

Herein, the data group is divided into a plurality of regions to be used for different purposes. More specifically, a region of the main service data having no interference or a very low interference level may be considered to have a more resistant (or stronger) receiving performance as compared to regions having higher interference levels. Additionally, when using a system inserting and transmitting known data in the data group, wherein the known data are known based upon an agreement between the transmitting system and the receiving system, and when consecutively long known data are to be periodically inserted in the mobile service data, the known data having a predetermined length may be periodically inserted in the region having no interference from the main service data (i.e., a region wherein the main service data are not mixed). However, due to interference from the main service data, it is difficult to periodically insert known data and also to insert consecutively long known data to a region having interference from the main service data.

Referring to FIG. 20, M/H block 4 (B4) to M/H block 7 (B7) correspond to regions without interference of the main service data. M/H block 4 (B4) to M/H block 7 (B7) within the data group shown in FIG. 20 correspond to a region where no interference from the main service data occurs. In this example, a long known data sequence is inserted at both the beginning and end of each M/H block. In the description of the present invention, the region including M/H block 4 (B4) to M/H block 7 (B7) will be referred to as "region A (=B4+B5+B6+B7)". As described above, when the data group includes region A having a long known data sequence inserted at both the beginning and end of each M/H block, the receiving system is capable of performing equalization by using the channel information that can be obtained from the known data. Therefore, the strongest equalizing performance may be yielded (or obtained) from one of region A to region D.

In the example of the data group shown in FIG. 20, M/H block 3 (B3) and M/H block 8 (B8) correspond to a region having little interference from the main service data. Herein, a long known data sequence is inserted in only one side of each M/H block B3 and B8. More specifically, due to the interference from the main service data, a long known data sequence is inserted at the end of M/H block 3 (B3), and another long known data sequence is inserted at the beginning of M/H block 8 (B8). In the present invention, the region including M/H block 3 (B3) and M/H block 8 (B8) will be referred to as "region B (=B3+B8)". As described above, when the data group includes region B having a long known data sequence inserted at only one side (beginning or end) of each M/H block, the receiving system is capable of performing equalization by using the channel information that can be obtained from the known data. Therefore, a stronger equalizing performance as compared to region C/D may be yielded (or obtained).

Referring to FIG. 20, M/H block 2 (B2) and M/H block 9 (B9) correspond to a region having more interference from the main service data as compared to region B. A long known data sequence cannot be inserted in any side of M/H block 2 (B2) and M/H block 9 (B9). Herein, the region including M/H block 2 (B2) and M/H block 9 (B9) will be referred to as "region C (=B2+B9)". Finally, in the example shown in FIG. 20, M/H block 1 (B1) and M/H block 10 (B10) correspond to a region having more interference from the main service data as compared to region C. Similarly, a long known data sequence cannot be inserted in any side of M/H block 1 (B1) and M/H block 10 (B10). Herein, the region including M/H block 1 (B1) and M/H block 10 (B10) will be referred to as "region D (=B1+B10)". Since region C/D is spaced further apart from the known data sequence, when the channel environment undergoes frequent and abrupt changes, the receiving performance of region C/D may be deteriorated.

Additionally, the data group includes a signaling information area wherein signaling information is assigned (or allocated). In the present invention, the signaling information area may start from the $1^{st}$ segment of the $4^{th}$ M/H block (B4) to a portion of the $2^{nd}$ segment. According to an embodiment of the present invention, the signaling information area for inserting signaling information may start from the $1^{st}$ segment of the $4^{th}$ M/H block (B4) to a portion of the $2^{nd}$ segment. More specifically, 276(=207+69) bytes of the $4^{th}$ M/H block (B4) in each data group are assigned as the signaling information area. In other words, the signaling information area consists of 207 bytes of the $1^{st}$ segment and the first 69 bytes of the $2^{nd}$ segment of the $4^{th}$ M/H block (B4). The $1^{st}$ segment of the $4^{th}$ M/H block (B4) corresponds to the $17^{th}$ or $173^{rd}$ segment of a VSB field.

Herein, the signaling data transmitted through the signaling information area may be identified by two different types of signaling channel data: a transmission parameter channel (TPC) data and a fast information channel (FIC) data.

Also, the TPC data includes parameters that are mostly used in a physical layer module. And, since the TPC data are transmitted without being interleaved, the TPC data may be accessed by slot unit in the receiving system. The FIC data are provided in order to enable the receiving system to perform fast service acquisition. Herein, the FIC data include cross layer information between a physical layer and an upper layer. The FIC data are interleaved in sub-frame units and then transmitted.

For example, when the data group includes 6 known data sequences, as shown in FIG. 20, the signaling information area is located between the first known data sequence and the second known data sequence. More specifically, the first known data sequence is inserted in the last 2 segments of the $3^{rd}$ M/H block (B3), and the second known data sequence in inserted in the $2^{nd}$ and $3^{rd}$ segments of the $4^{th}$ M/H block (B4). Furthermore, the $3^{rd}$ to $6^{th}$ known data sequences are respectively inserted in the last 2 segments of each of the $4^{th}$, $5^{th}$, $6^{th}$, and $7^{th}$ M/H blocks (B4, B5, B6, and B7). The $1^{st}$ and $3^{rd}$ to $6^{th}$ known data sequences are spaced apart by 16 segments.

A RS Frame Including the Mobile NRT Service

FIG. 21 is a view showing the structure of an RS frame containing a mobile NRT service configured according to an embodiment of the present invention.

The RS frame is received for each M/H frame in a condition where the receiving system is switched to a time-slicing mode. Each RS frame includes IP streams of each mobile service data or signaling data, and service map table (SMT) section data may exist in all RS frames. The SMT section data may be an IP stream type, or a different data type. The RS frame data is allocated to region corresponding to a plurality of data groups, and transmitted to a receiving system.

The RS frame according to the embodiment of the present invention consists of at least one M/H transport packet (TP). Herein, the M/H TP includes an M/H header and an M/H payload.

The M/H payload may include mobile service data as well as signaling data. More specifically, an M/H payload may include only mobile service data, or may include only signaling data, or may include both mobile service data and signaling data. In this case, the mobile service data can include an NRT service according to the present invention.

Also, when the M/H TP includes a second M/H header, this indicates that the M/H payload includes both the signaling data and the mobile service data. Finally, when M/H TP includes a third M/H header, this indicates that the M/H payload includes only the mobile service data. In the example shown in FIG. 21, the RS frame is assigned with an IP datagram (IP datagram 1) for a SMT and IP datagrams (IP datagram 2 and IP datagram 3) for two service types.

A Structure of Transmission Data

Figure 22:
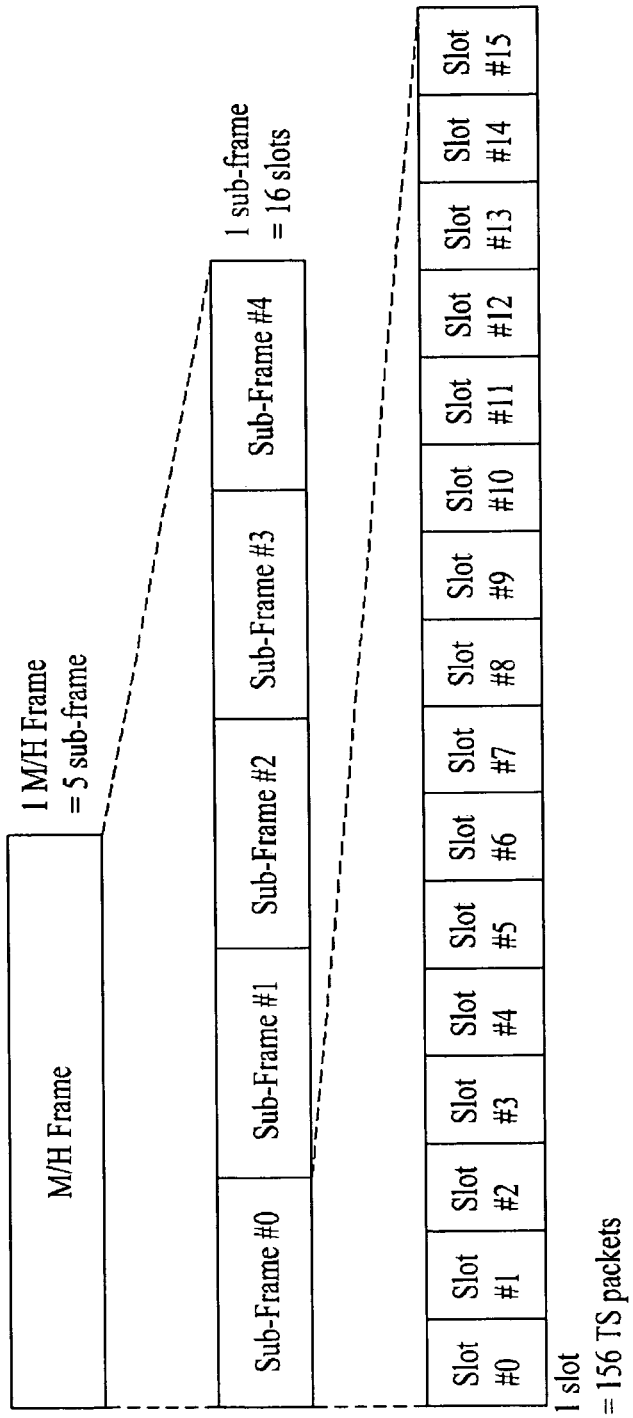
FIG. 22 is a view showing an example of an M/H frame structure for transmission or reception of mobile service data according to the present invention.

FIG. 22 is a view showing an example of a structure of an M/H frame for transmitting and receiving mobile service data according to the present invention.

In the example shown in FIG. 22, one M/H frame consists of 5 sub-frames, wherein each sub-frame includes 16 slots. In this case, the M/H frame according to the present invention includes 5 sub-frames and 80 slots. Also, in a packet level, one slot is configured of 156 data packets (i.e., transport stream packets), and in a symbol level, one slot is configured of 156 data segments. Herein, the size of one slot corresponds to one half (½) of a VSB field. More specifically, since one 207-byte data packet has the same amount of data as a data segment, a data packet prior to being interleaved may also be used as a data segment. At this point, two VSB fields are grouped to form a VSB frame.

Meanwhile, the mobile service data within one RS frame may be assigned either to all of regions A/B/C/D within the corresponding data group, or to at least one of regions A/B/C/D. In the embodiment of the present invention, the mobile service data within one RS frame may be assigned either to all of regions A/B/C/D, or to at least one of regions A/B and regions C/D. If the mobile service data are assigned to the latter case (i.e., one of regions A/B and regions C/D), the RS frame being assigned to regions A/B and the RS frame being assigned to regions C/D within the corresponding data group are different from one another.

According to the embodiment of the present invention, the RS frame being assigned to regions A/B within the corresponding data group will be referred to as a "primary RS frame", and the RS frame being assigned to regions C/D within the corresponding data group will be referred to as a "secondary RS frame", for simplicity. Also, the primary RS frame and the secondary RS frame form (or configure) one parade. More specifically, when the mobile service data within one RS frame are assigned either to all of regions A/B/C/D within the corresponding data group, one parade transmits one RS frame. Conversely, when the mobile service data within one RS frame are assigned either to at least one of regions A/B and regions C/D, one parade may transmit up to 2 RS frames. More specifically, the RS frame mode indicates whether a parade transmits one RS frame, or whether the parade transmits two RS frames. Such RS frame mode is transmitted as the TPC data. Table 4 below shows an example of the RS frame mode. The following Table 4 is an exemplary diagram for the RS frame mode.

TABLE 4

| RS frame mode (2 bits) | Description |
| --- | --- |
| 00 | There is only one primary RS frame for all group regions |
| 01 | There are two separate RS frames. Primary RS frame for group regions A and B Secondary RS frame for group regions C and D |
| 10 | Reserved |
| 11 | Reserved |

Table 4 illustrates an example of allocating 2 bits in order to indicate the RS frame mode. For example, referring to Table 1, when the RS frame mode value is equal to '00', this indicates that one parade transmits one RS frame. And, when the RS frame mode value is equal to '01', this indicates that one parade transmits two RS frames, i.e., the primary RS frame and the secondary RS frame. More specifically, when the RS frame mode value is equal to '01', data of the primary RS frame for regions A/B are assigned and transmitted to regions A/B of the corresponding data group. Similarly, data of the secondary RS frame for regions C/D are assigned and transmitted to regions C/D of the corresponding data group.

As described in the assignment of data groups, the parades are also assigned to be spaced as far apart from one another as possible within the sub-frame. Thus, the receiving system can be capable of responding promptly and effectively to any burst error that may occur within a sub-frame. Furthermore, the method of assigning parades may be identically applied to all M/H frames or differently applied to each M/H frame. According to the embodiment of the present invention, the parades may be assigned differently for each M/H frame and identically for all sub-frames within an M/H frame. More specifically, the M/H frame structure may vary by M/H frame units. Thus, an ensemble rate may be adjusted on a more frequent and flexible basis.

That is, the concept of an M/H ensemble is applied in the embodiment of the present invention, thereby defining a collection (or group) of services. Each M/H ensemble carries the same QoS and is coded with the same FEC code. Also, each M/H ensemble has the same unique identifier (i.e., ensemble ID) and corresponds to consecutive RS frames.

Figure 23:
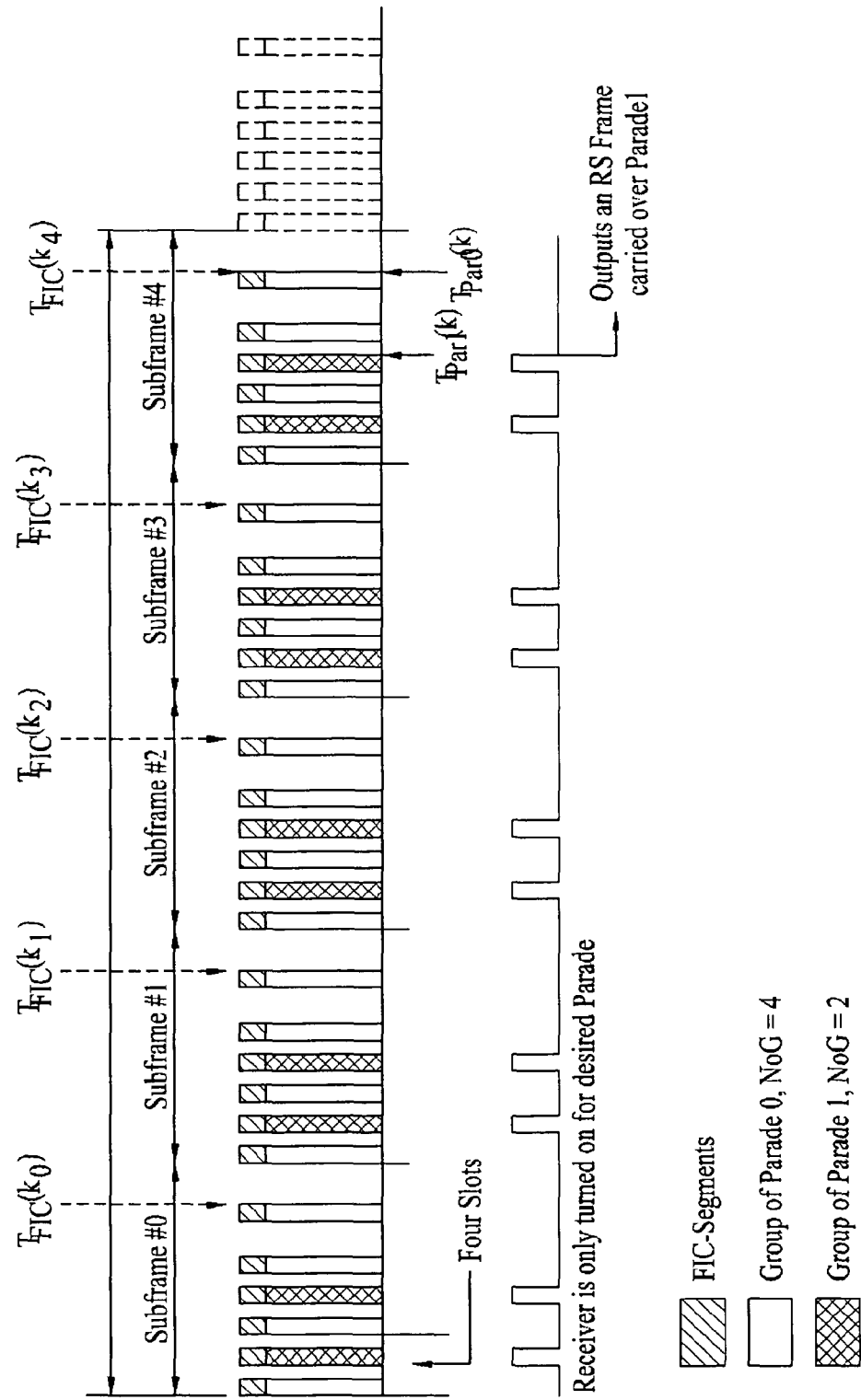
FIG. 23 is a view showing a data transmission structure in a physical layer according to an embodiment of the present invention.

FIG. 23 illustrates a data transmission structure in a physical layer according to an embodiment of the present invention. More specifically, FIG. 23 shows an example of FIC data being included in each data group and transmitted. As described above, an M/H frame for approximately 0.968 seconds is divided into 5 sub-frames, wherein data groups corresponding to multiple ensembles exist in combination within each sub-frame. Also, the data groups corresponding to each ensemble are interleaved in M/H frame units, so as to configure an RS frame belonging to one ensemble. In FIG. 23, 2 ensembles (wherein NoG=4 and NoG=3) exist in each sub-frame. Furthermore, a predetermined portion (e.g., 37 bytes/data group) of each data group is used for the purpose of separately delivering encoded FIC data apart from the RS frame data channel. The FIC region assigned to each data group consists of one FIC segment. Herein, each of the FIC segments is interleaved in sub-frame units. For example, RS-encoding and SCCC encoding processes are applied to the RS frame data, and RS encoding and PCCC encoding processes are applied to the FIC data. Also, as well as the FIC data, the RS encoding and PCCC encoding processes are applied to the TPC data. More specifically, (187+P,187)-RS encoding process is applied to the RS frame data, (51,37)-RS encoding process is applied to the FIC data, and (18,10)-RS encoding process is applied to the TPC. Herein, P is the number of parity bytes.

A Service Map Table (SMT)

Next, signaling information of NRT services transmitted through the IP datagram in the RS frame of FIG. 21 will be described. Hereinafter, the SMT, which is one type of signaling information, will be described.

FIGS. 24 and 25 is views showing the bitstream syntax of an SMT configured according to an embodiment of the present invention.

In FIGS. 24 and 25, shown an example that the SMT is written in an MPEG format, by which the present invention is non-limited. Alternatively, the SMT can be defined in a different format.

The SMT describes service information and IP access information in an ensemble in which the SMT is transmitted, and also provides broadcast stream information of a service using Transport_Stream_ID which is an identifier of a broadcast stream to which each service belongs. The SMT according to the present embodiment contains description information of each mobile service in a single MH ensemble, and other supplementary information may be contained in a descriptor section.

Referring to FIGS. 24 and 25, an SMT section may be transmitted in a state of being included in an RS frame in an IP stream format. In this case, the RS frame decoders of the below-described receiver decode an input RS frame and output the decoded RS frame to RS frame handlers. Each of the RS frame handlers divides the input RS frame into rows, configures an MH TP, and outputs the MH TP to an MH TP handler.

An example of the fields that may be transmitted through the SMT will now be described.

A table_id file is an 8-bit unsigned integer number that indicates the type of table section being defined in Service Map Table (SMT).

A section_syntax_indicator field (1-bit) shall be set to '0' to always indicate that this table is derived from the short form of the MPEG-2 private section table.

A private_indicator field (1-bit) shall be set to '1'.

A section_length field (12-bit) specifies the number of remaining bytes this table section immediately following this field. The value in this field shall not exceed 4093 ('0xFFD').

A table_id_extension field (16-bit) is table-dependent. It shall be considered to be logically part of the table_id field providing the scope for the remaining fields. Herein, the table_id_extension field may include a SMT_protocol_version field.

A SMT_protocol_version field is an 8-bit unsigned integer field whose function is to allow, in the future, this SMT to carry parameters that may be structured differently than those defined in the current protocol. At present, the value for the SMT_protocol_version shall be zero. Non-zero values of SMT_protocol_version may be used by a future version of this standard to indicate structurally different tables.

An ensemble_id field is an 8-bit unsigned integer field in the range 0x00 to 0x3F shall be the Ensemble ID associated with this MH Ensemble. The value of this field shall be derived from the parade_id carried from the baseband processor of MH physical layer subsystem, by using the parade_id of the associated MH Parade for the least significant 7 bits, and using '0' for the most significant bit when the MH Ensemble is carried over the Primary RS frame, and using '1' for the most significant bit when the MH Ensemble is carried over the Secondary RS frame.

A version_number field (5 bits) represents version number of the SMT.

A current_next_indicator field is a one-bit indicator, which when set to '1' shall indicate that the Service Map Table sent is currently applicable. When the bit is set to '0', it shall indicate that the table sent is not yet applicable and will be the next table to become valid. This standard imposes no requirement that next tables (those with current_next_indicator set to '0') must be sent. An update to the currently applicable table shall be signaled by incrementing the version_number field.

A section_number field (8-bit) shall give the section number of this NRT Service Signaling table section. The section_number of the first section in an NRT Service Signaling table shall be '0x00'. The section_number shall be incremented by 1 with each additional section in the NRT Service Signaling table.

A last_section_number field (8-bit) shall give the number of the last section (i.e., the section with the highest section_number) of the Service Signaling table of which this section is a part.

A num_services field (8 bit) specifies the number of services in this SMT section.

According to one embodiment of the present invention, the NST provides information for a plurality of components using 'for' loop. Field information related to each service is provided as follows.

A service_id is a 16-bit unsigned integer number that shall uniquely identify this M/H Service within the scope of this MH Broadcast. The MH_service_id of a service shall not change throughout the life of the service. To avoid confusion, it is recommended that if a service is terminated, then the MH_service_id for the service should not be used for another service until after a suitable interval of time has elapsed.

A multi_ensemble_service field is a two-bit enumerated field that shall identify whether the M/H Service is carried across more than one M/H Ensemble. Also, this field shall identify whether or not the M/H Service can be rendered only with the portion of M/H Service carried through this M/H Ensemble.

A MH_service_status field is a 2-bit enumerated field that shall identify the status of this M/H Service. The most significant bit shall indicate whether this M/H Service is active (when set to '1') or inactive (when set to '0') and the least significant bit shall indicate whether this M/H Service is hidden (when set to '1') or not (when set to '0'). Hidden services are normally used for proprietary applications, and ordinary receiving devices should ignore them.

A SP_indicator field (1-bit) indicate, when set, that service protection is applied to at least one of the components needed to provide a meaningful presentation of this M/H Service.

A short_service_name_length field is a three-bit unsigned integer that shall indicate the number of byte pairs in the short_service_name field. This value is shown as m in the No. of Bits column for the short_service_name field. When there is no short name of this M/H service, the value of this field shall be '0'.

A short_service_name field is the short name of the M/H Service, each character of which shall be encoded. When there is an odd number of bytes in the short name, the second byte of the last of the byte pair per the pair count indicated by the short_service_name_length field shall contain '0x00'.

A MH_service_category field is a 6-bit enumerated type field that shall identify the type category of service carried in this M/H Service as defined in Table 5. When the value of this field is set to the value which is indicated Informative only, the value of this field shall be treated as an informative description to the category of service, and the receiver is required to examine the component_level_descriptors( ) of the SMT-MH to identify the actual category of service carried through this M/H Service. For services that have a video and/or audio component, they shall have an NTP timebase component.

TABLE 5

| MH_service_category | Meaning |
| --- | --- |
| 0x00 | The service category is not specified by the MH_service_category field. Look in the component_level_descriptors( ) to identify the category of service. |
| 0x01 | Basic TV (Informative only) - Look in the component_level_descriptors( ) to identify the specific category of service. |
| 0x02 | Basic Radio (Informative only) - Look in the component_level_descriptors( ) to identify the specific category of service. |
| 0x03 | RI service - Rights Issuer service as defined in Part #6 [34] of this standard. |
| 0x04 | Not specified by the current version of this standard. |
| 0x05 | Not specified by the current version of this standard. |
| 0x06 | Not specified by the current version of this standard. |
| 0x07 | Not specified by the current version of this standard. |
| 0x08 | Service Guide - Service Guide (Announcement) as defined in Part #4 [x] of this standard. |
| 0x09 | Not specified by the current version of this standard. |
| 0x0A | Not specified by the current version of this standard. |
| 0x0B~0x0D | Not specified by the current version of this standard. |
| 0x0E | NRT service |
| 0x0F~0XFF | Reserved for future use. |

If the value of the field is, for example, '0x0E', it can be seen that the mobile service is a mobile NRT service. Accordingly, the receiver determines that the mobile service is an NRT service if the value of the MH_service_category field is '0x0E' and, as a result, should check the component_descriptor of a component level containing information about a FLUTE session in which the identified NRT service is transmitted. In the checking of component_descriptor, if the value of the component_type field in the descriptor is '38', information about the FLUTE session received by component data is extracted.

A num_components field (5-bit) specifies the number of IP stream components in this M/H Service.

An IP_version_flag field is a 1-bit indicator, which when set to 0 shall indicate that source_IP_address, MH_service_destination_IP_address, and component_destination_IP_address fields are IPv4 addresses. The value of 1 for this field is reserved for possible future indication that source_I-

P_address, MH_service_destination_IP_address, and component_destination_IP_address fields are for IPv6. Use of IPv6 addressing is not currently defined.

A source_IP_address_flag field is a 1-bit Boolean flag that shall indicate, when set, that a source IP address value for this M/H Service is present to indicate a source specific multicast.

An MH_service_destination_IP_address_flag field is a 1-bit Boolean flag that indicates, when set to 1, that a MH_service_destination_IP_address value is present, to serve as the default IP address for the components of this M/H Service.

A source_IP_address field shall be present if the source_IP_address_flag is set to 1 and shall not be present if the source_IP_address_flag is set to 0. If present, this field shall contain the source IP address of all the IP datagrams carrying the components of this M/H Service. The conditional use of the 128 bit-long address version of this field is to facilitate possible use of IPv6 in the future, although use of IPv6 is not currently defined.

An MH_service_destination_IP_address field shall be present if the MH_service_destination_IP_address_flag is set to 1 and shall not be present if the MH_service_destination_IP_address_flag is set to 0. If this MH_service_destination_IP_address is not present, then the component_destination_IP_address field shall be present for each component in the num_components loop. The conditional use of the 128 bit-long address version of this field is to facilitate possible use of IPv6 in the future, although use of IPv6 is not currently defined.

According to one embodiment of the present invention, the SMT provides information for a plurality of components using 'for' loop.

An essential_component_indicator field is a one-bit indicator which, when set to 1, shall indicate that this component is an essential component for the M/H Service. Otherwise, this field indicates that this component is an optional component.

A component_destination_IP_address_flag field is a 1-bit Boolean flag that shall indicate, when set to 1, that the component_destination_IP_address is present for this component.

A port_num_count field shall indicate the number of destination UDP ports associated with this UDP/IP stream component. The values of the destination UDP port numbers shall start from the component_destination_UDP_port_num field and shall be incremented by one, except in the case of RTP streams, when the destination UDP port numbers shall start from the component_estination_UPD_port_num field and shall be incremented by two, to allow for the RTCP streams associated with the RTP streams.

A component_destination_UDP_port_num field (16-bit unsigned integer) represents the destination UDP port number for this UDP/IP stream component. For RTP streams, the value of component_estination_UDP_port_num shall be even, and the next higher value shall represent the destination UDP port number of the associated RTCP stream.

A component_destination_IP_address field shall be present if the component_destination_IP_address_flag is set to 1 and shall not be present if the component_destination_IP_address_flag is set to 0. When this field is present, the destination address of the IP datagrams carrying this component of the MH Service shall match the address in this field. When this field is not present, the destination address of the IP datagrams carrying this component shall match the address in the MH_service_destination_IP_address field. The conditional use of the 128 bit-long address version of this field is to facilitate possible use of IPv6 in the future, although use of IPv6 is not currently defined.

A num_component_level_descriptors field (4 bit) specifies the number of component level descriptors for this component.

A component_level_descriptor( ) field may have one or more descriptors providing additional information for this IP stream component, may be included.

A num_MH_service_level_descriptors field (4 bit) specifies the number of service level descriptors for this service.

An MH_service_level_descriptor( ) has Zero or more descriptors providing additional information for this M/H Service, may be included.

A num_ensemble_level_descriptors field (4 bit) specifies the number of ensemble level descriptors for this ensemble.

An ensemble_level_descriptor( ) is zero or more descriptors providing additional information for the M/H Ensemble which this SMT-MH describes, may be included.

The Source_IP_address becomes a source IP address of the same server for transmitting all the channels of the FLUTE session if the service is an NRT service.

The MH_service_destination_IP_Adress is signaled if a destination IP address having the session level of this FLUTE session is present.

The component may be mapped to a channel in the FLUTE session, and a separate destination IP address (different from an IP address signaled in the session units) may be signaled through component_destination_IP_address according to channels. In addition, a destination port number may be signaled through component_destination_UDP_port_num, and the destination port number started from component_destination_UDP_port_num may be further specified through port_num_count.

A Mobile NRT Service Signaling Architecture

The signaling of information about individual M/H NRT content items is done at two levels: First, the File Delivery Table (FDT) of the FLUTE sessions used to deliver the items lists all the content items and gives their sizes, data types, and other information relevant to the acquisition of the items. Second, the OMA BCAST Service Guide (SG) gives more detailed descriptive information about the items and their delivery schedules).

An NRT Component Descriptor( )

The contents included the NRT service is transmitted via FLUTE session. In this case, information related to the FLUTE session is signaled as follows by access information in the SMT.

Yet, NRT_component_descriptor( ) in a mobile service environment has the structure similar to NRT_component_descriptor in a fixed service environment. The above-mentioned descriptions will be cited for the descriptions of the same parts and differences will be mainly described in the following description.

The FDT of the FLUTE sessions used to deliver the items lists all the content items and gives their sizes, data types, and other information relevant to the acquisition of the items.

For example, the receiver may configure and display a service guide using an OMA BCAST SG. The receiver acquires information for accessing a FLUTE session in which content selected from the displayed service guide is transmitted. In addition, the receiver receives a file by mapping information about the transmitted file through the file information (FDT) in the accessed FLUTE session based on the access information acquired from the SMT and content identifier of the OMA BCAST SG. The content identifier of the OMA BCAST SG may contain globalContentID for globally and uniquely identifying a content item using XML or NRT_content_id which is separately defined in association with an NRT service, and conversion thereof is necessary for mapping with the file information in the FLUTE session, which is the value of a binary type. The conversion process will be described in detail later and will be omitted herein.

In order to signal the FLUTE session, parameters are necessary. Such parameters include necessary parameters and parameters which are selectively necessary in association with the FLUTE session. First, the necessary parameters include a "source IP address" parameter, a "number of channels in the session" parameter, a "destination IP address and port number for each channel in the session" parameter, a "Transport Session Identifier (TSI) of the session" parameter and a "start time and end time of the session" parameter, and the parameters which are selectively necessary in association with the FLUTE session include an "FEC object transmission information" parameter, a "some information that tells receiver in the first place, that the session contains files that are of interest", and a "bandwidth specification" parameter.

The "number of channels in the session" parameter may be explicitly provided or may be obtained by summing the number of streams configuring the session. Among the parameters, the "start time and end time of the session" parameter may be signaled through the SMT suggested by the present invention, and the "source IP address" parameter, the "destination IP address and port number for each channel in the session" parameter, the "Transport Session Identifier (TSI) of the session" parameter and the "number of channels in the session" parameter may be signaled through session_description_descriptor.

An NRT Component Data Descriptor for the Mobile NRT Service

If the value of the component_type field in the descriptor is '38', information about the FLUTE session received by component data is extracted. Yet, NRT_component_descriptor( ) in a mobile service environment has the structure similar to NRT_component_descriptor in a fixed service environment. The above-mentioned descriptions will be cited for the descriptions of the same parts and differences will be mainly described in the following description.

The parameters are signaled by the FLUTE component data bytes. Accordingly, required information is provided to receive the FLUTE session. In this case, the FDT is received through the received FLUTE session. Moreover, information related to all files transferred through the FLUTE session is acquired the received FDT. Therefore, the file can be received based on the acquired information.

In this case, the NRT component descriptor may be transferred through component level descriptor loop in the SMT. Although there are a plurality of the FLUTE channel is, the TSI, the session_start_time, session_end_time and the like as parameters of the session level can be signaled by one time. At this time, NRT component descriptor can be transmitted through the component_level_descriptor loop in one component among a plurality of a channel component.

A Relationship Among M/H Service, FLUTE Session and NRT Service

Figure 26:
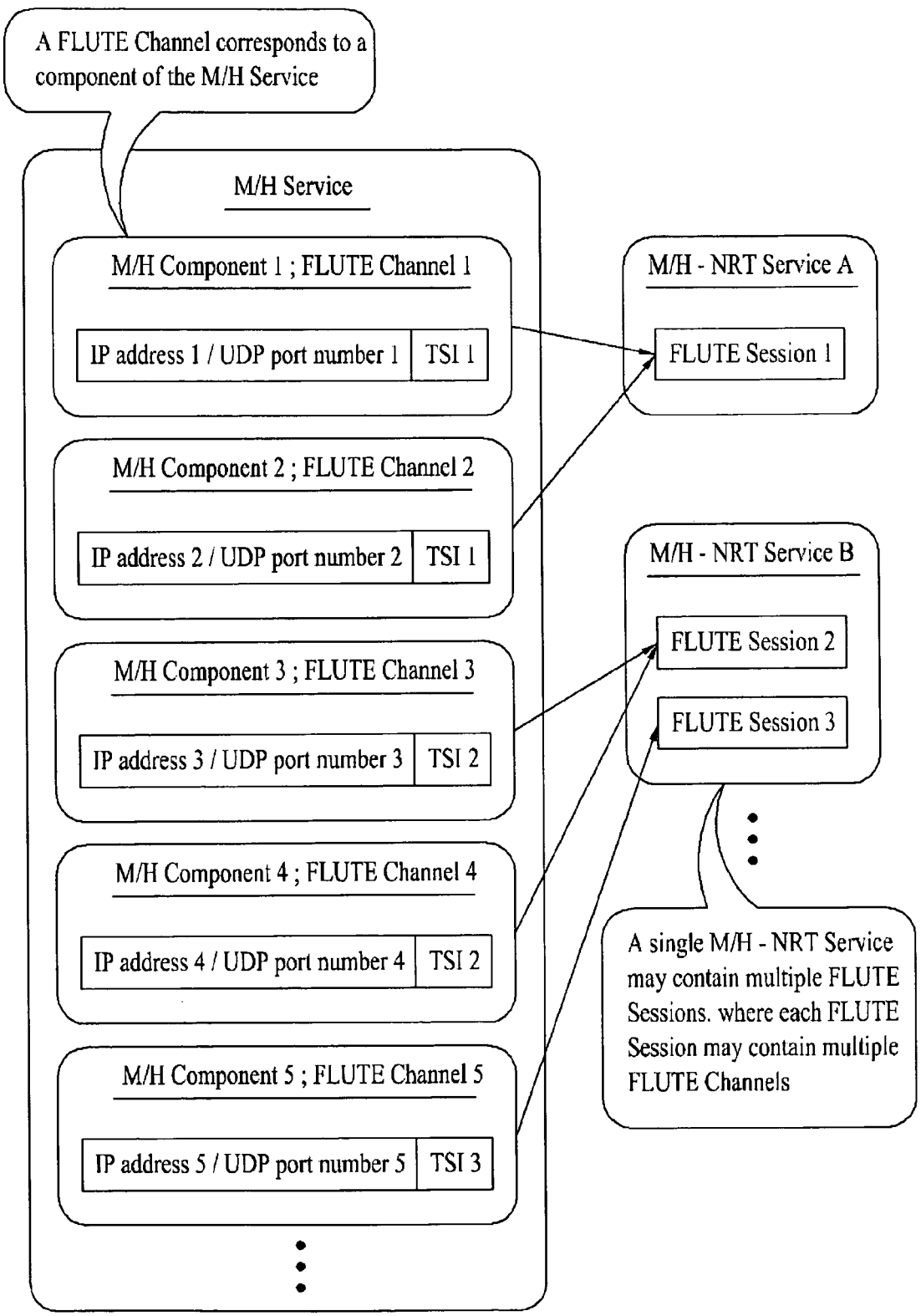
FIG. 26 is a view explaining a relationship among an M/H service, a FLUTE session and an NRT service according to the present invention.

FIG. 26 is a view explaining a relationship among an M/H service, a FLUTE session and an NRT service according to the present invention.

The M/H services include one or more M/H components. The FLUTE session corresponds to an MH service component. And a relationship between the FLUTE session and the MH service component is defined through MH_component_descriptor. In addition, a single M/H NRT service contains multiple FLUTE sessions and each of the FLUTE sessions contains multiple FLUTE channels. The MH component may be defined by a single destination IP address and a single UDP port number. For example, an MH NRT service A includes a FLUTE session 1, the FLUTE session 1 is indicated by TSI 1 information of an MH component 1 and an MH component 2 of the MH services. In addition, an MH NRT service B contains FLUTE sessions 2 and 3. The FLUTE session 2 is indicated by TSI 2 information of an MH component 3 and an MH component 4 of the MH services, and the FLUTE session 3 is indicated by TSI 3 information of an MH component 5.

A Method for Processing a Web Service in the NRT Service

Embodiments for a method of processing an NRT service in a receiver according to the present invention are explained in the following description. In this case, the NRT service may include a data casting service. Moreover, with the exception of specially defined cases, the NRT service according to the present invention may be transceived (or transmitted and received) by the above-mentioned fixed NRT service method and mobile NRT service method.

Regarding the present invention, data for a data casting service provided from the NRT service may be transceived using a variety of methods. However, in the description of the present invention, two methods will be given as examples of such methods for simplicity. In this case, the data for the data casting service provided from the NRT service includes signaling information only, or may be used in the sense of including raw data along with the signaling information.

First of all, the data for the data casting service provided from the NRT service is transceived by being defined as a new separate program Non-Real Time information table (NRT-IT).

Secondly, the data for the data casting service provided from the NRT service may be transceived by being included in a pre-defined program information table. In this case, if the data is included in the pre-defined program information table, the corresponding data may be defined in a descriptor format transmitted along with the corresponding program information table.

In the description of the present invention, a receiver should first recognize whether a received service corresponds to an NRT service. As mentioned in the foregoing description, the receiver is able to determine whether a received service corresponds to an NRT service by using signaling information that is transmitted through a service signaling channel. Herein, the signaling information includes an NRT Service Table (NST) or a Service Map Table (SMT). More specifically, in case of the fixed NRT service, the receiver is able to determine whether or not a received service is an NRT service based on the NST received based on a packet identifier (PID). In case of a mobile NRT service, the receiver is able to determine whether or not a received service is an NRT service based on the SMT received through a service signaling channel.

In the following description, methods of transceiving data for a data casting service provided from an NRT service according to the present invention will be sequentially described in detail.

First Embodiment

An example of transceiving data for a data casting service provided from an NRT service by defining a separate information table will now be described in detail.

DDT Section

FIG. 27 is an exemplary diagram for a bit-stream syntax of a separate program information table for data of a data casting provided from an NRT service according to the present invention. In the following description, the program information table will be referred to as data_casting_description_table (DDT) for simplicity. Yet, the present invention will not be limited to this term.

Fields for configuring the DDT will now be described as follows. Although FIG. 27 shows an example of the DDT being written in an MPEG format, the present invention will not be limited to the given example, and the DDT may therefore be defined in a different format.

A table_id field is an identifier identifying a table included this section.

A section_syntax_indicator field indicates a format of this section. The format of this section, for example, may follow a long-form syntax of the MPEG.

A private_indicator field indicates whether this section follows a private section format.

A section_length field represents a length of this section.

A transport_stream_id field represents an identifier of a transport stream (TSID) transmitted through this section.

A version_number field represents a version number of this section.

A current_next_indicator field represents whether section data included this section are currently applicable.

A section_number field represents a section number of this section among sections which consists of the DDT.

A last_section_number field represents a section number of last section among sections which consists of the DDT.

A DDT_protocol_version field represents a protocol version of the DDT section.

An ensemble_id field includes an identifier of an ensemble which is identified based upon the DDT. In this case, one or more mobile NRT services are transmitted through the identified ensemble. Also, in the fixed NRT service environment (or condition), a TSID may replace the ensemble_id.

A num_services field represents a number of services transmitted through the identified ensemble or the identified TS. In this case, each service may include one or more NRT services. Hereinafter, information related to one or more NRT services transmitted through each service is specified as follows using a 'for' loop.

A service_id field includes a service identifier for each service. For instance, the service_id may be identical to the aforesaid NRT_service_id in the NST or the MH_serivce_id in the SMT. Accordingly, the receiver is able to uniquely identify the received NRT service based upon the service_id field. In the description of the present invention, the service_id is used to identify the NRT service. Although the service_id field is used to identify each NRT service in this description, it may be able to identify each of the received services by concatenating a major_channel_number field and a minor_channel_number field (not shown in FIG. 27).

Figures 28, 29, 30:
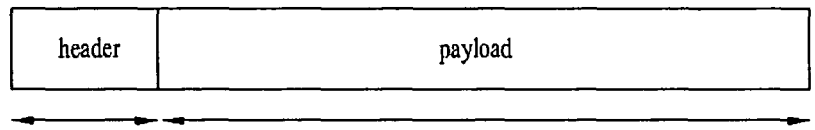
FIG. 28 is an exemplary diagram for the data_casting_service_type provided from the NRT service according to the prevention invention.
FIG. 29 shows an example of a chunk format exemplarily shown in FIG. 27.
FIG. 30 is an exemplary format of the header of the data_chunk according to the present invention.

A data_casting_service_type field defines a service type of data casting service provided from the NRT service. FIG. 28 is an exemplary diagram for the data_casting_service_type provided from the NRT service according to the present invention.

Referring to FIG. 28, service types of a data casting service provided from the NRT service include a dynamic sequential picture, a recorded web service and the like.

For instance, if a data_casting_service_type field is set to '0x00', it is able to indicate that a type of a data casting service provided from the NRT service is a dynamic sequential picture. Therefore, if a value of the data_casting_service_type field is '0x00', a receiver can be aware that a data casting service having several still pictures displayed (or appearing) at predetermined intervals is provided from the NRT service.

If a data_casting_service_type field is set to '0x01', it is able to indicate that a type of a data casting service provided from the NRT service is a recorded web service. Therefore, if a value of the data_casting_service_type field is '0x01', a receiver can be aware that a web-service-associated data casting service is provided from the NRT service.

Subsequently, a web_page_type field defines the type of a received web page/portal document. In this case, the type of the received web page/portal document includes, for example, at least one of a text [HTML] document and a web document based upon a CE-HTML specification.

Accordingly, a receiver identifies a compatible browser based upon the web_page_type field and the type of the received web page/portal document.

The web_page_version field represents a version number of a specification used for writing a corresponding web page document. For instance, if a web page document corresponds to a HTML document, which is written by using a HTML 4.01, the value of the HTML 4.01 is specified in the web_page_version field.

Accordingly, the receiver may identify whether the received web document is supported through a web browser in the receiver based upon the web_page_type field and the web_page_version field.

Yet, for instance, the web_page_type field or the web_page_version field is significant only if a service type of the data casting service provided from the NRT service is a recorded web service. Otherwise, the web_page_type field or the web_page_version field may become insignificant. Therefore, a transmitting side enables a receiver to ignore (or disregard) the web_page_type field or the web_page_version field in a manner of setting a value of the web_page_type field and the web_page_version field to '0'.

Alternatively, the web_page_type field or the web_page_version field can be delivered as a descriptor of the DDT or other program information tables by being defined into a descriptor form. For instance, it can be separately added in the form of an MH component descriptor (e.g., web page info descriptor). Hence, if a value based on a data_casting_service_type field indicates that a service type of a data casting service included in a corresponding NRT service is a recorded web service, a receiver can be aware of the information on a web page by parsing the web page info descriptor among MH component descriptors. Table 6 is an exemplary diagram of the M/H Component Descriptor including a web page info descriptor according to the present invention.

TABLE 6

| | A/153 Part 3 [5] Sec. 7.8.1. The following component types are applicable for NRT-IT use. | | |
|---|---|---|---|
| | component type | | Meaning |
| M/H Component Descriptor | 0xBC | 50 | Web page info descriptor |

A data_chunk_length field defines a length of the following data_chunk( ) field.

The data_chunk( ) field includes raw data related to data casting service provided from the NRT service.

The above described DDT includes data for the data casting service provided from the NRT service. Therefore, a receiver can process a recorded web service as a data casting service provided from the NRT service by receiving/parsing the DDT and is then capable of providing the DDT to a user.

A Method of Receiving Data for a Data Casting Service

Hereinafter, a method of receiving data for a data casting service provided from an NRT service according to the present invention will be described in detail.

There are broadly two types of receiving methods.

First of all, there is a method including the steps of accessing a FLUTE session that carries an NRT service based on information of another program information table and then receives the corresponding NRT service from the accessed FLUTE session. For instance, a receiver extracts access information on the FLUTE session carrying a corresponding NRT service from an NST, which is received based on a PID, or an SMT, which is received via a service signaling channel. Then, the receiver accesses the corresponding FLUTE session, thereby being able to receive data for a data casting service provided from the NRT service.

Secondly, there is a method of enabling the data for the data casting service to be directly included in a defined program information table.

A Data Chunk

FIG. 29 shows an example of a chunk format shown in FIG. 27.

Referring to FIGS. 27 and 29, the data_chunk field according to the present invention includes a header and a payload.

The header includes information on a format of the data_chunk and detailed information on the payload. In this case, a segmented part of the data chunk can be transmitted by being included in the DDT shown in FIG. 27.

The payload includes raw data referenced by the header.

A general format of the header and payload configuring data_chunk is specified as follows.

A Data Chunk Header Format

FIG. 30 is an exemplary format of the header of the data_chunk according to the present invention.

Referring to FIG. 30, the header of data_chunk includes a content_type field, a content_name field, a content_id field, a payload_length field and a NRT_data_info( ) field.

The content_type field defines a type of the transmitted content. FIG. 31 is an exemplary format for a type of a content defined in the content_type field. Referring to FIG. 31, if the content_type field is set to '0x00', it can indicate that a content type corresponds to a Joint Photographic Experts Group (JPEG). If the content_type field is set to '0x01', it can indicate that a content type corresponds to a portable network graphics (PNG). If the content_type field is set to '0x02', it can indicate that a content type corresponds to a Multiple-image Network Graphics (MNG). If the content_type field is set to '0x10', it can indicate that a content type corresponds to a Text [HTML]. If the content_type field is set to '0x20', it can indicate that a content type corresponds to a MPEG Audio Layer-3 (MP3) file. Herein, the text [HTML], for instance, may be a body document corresponding to an index file.

The content_name field represents a name of the transmitted content.

The content_id field includes an identifier for identifying the transmitted content.

The payload_length field represents a length of the payload of the data_chunk field.

The NRT_data_info( ) field includes detail information for a data casting service provided from the NRT service. In this case, the detailed information, for example, can include information that describes a content according to a content_type field.

A Data Chunk Payload Format

FIG. 32 is an exemplary format for the payload of the data_chunk according to the present invention.

Referring to FIG. 32, the payload of the data_chunk includes a raw_data_length field and a raw_data( ) field.

The raw_data_length field represents a length of the following raw_data( ) field.

The raw_data( ) field includes raw data related to the data casting service provided from the NRT service.

The above described contents related to a case in which the data of a data casting service provided from the NRT service correspond to a web service. In the following description, a case wherein the data correspond to a dynamic sequential picture will be described.

FIG. 33 is another exemplary format of the header of the data_chunk.

For instance, a series of images can be displayed according to a prescribed time interval using a data casting service. In particular, the data casting service can be provided in a manner that picture files are changed into a slide type or the like. In this case, a header of the data_chuck can include information on data that provides the data casting service, which are exemplarily shown.

In this case, for convenience, an image for providing this service is referred to as a dynamic sequential picture. And, a header of a data chunk carrying this data casting service is referred to as header_of_data_chuck_dynamic_sequential_picture.

The header_of_data_chuck_dynamic_sequential_picture may include a content_type field, a content_name field, a content_id field, a payload_length field, a trigger_time field and an animation_type field.

The content_type field represents a type of the content transmitted through a payload of the data_chunk.

The content_name field includes a name of the corresponding contents.

The content_id field includes an identifier of the corresponding contents.

The payload_length field represents a length of the payload.

The trigger_time field indicates a 'universal time coordinated (UTC)'; which indicates an image display time of the contents. For instance, if a value of this field is set to '0', it means 'NOW'. Hence, the contents are immediately displayed if and when received by a receiving system.

The animation_type field indicates a type for changing an image and will be explained with reference to another drawing.

FIG. 34 is an exemplary diagram for a value of the animation_type field.

If a value of an animation_type field is set to '0x00', it indicates that a content image transmitted to a sliding-left is slid from a left side. If a value of the animation_type field is set to '0x01', it indicates that a content image is displayed by sliding from a right side.

If a value of the animation_type field is set to '0x02', it indicates that a content image slides from a top side. If a value of the animation_type field is set to '0x03', it indicates that a content image slides from a bottom side.

If a value of the animation_type field is set to '0x04', it indicates that a content image is changed by a fade-in method. If a value of the animation_type field is set to '0x05', it indicates that a content image us changed by a fade-out method.

Therefore, various animation effects may be obtained by using values of the animation_type field.

Figure 35:
FIG. 35 is an exemplary diagram for an image displayed by a type of the dynamic sequence picture.

FIG. 35 is an exemplary diagram for an image displayed by a type of the dynamic sequence picture.

Referring to the FIG. 35, a current image displayed by a sliding method may be changed or displayed with a text. In this case, the current sliding-type image may be synchronized with the text.

The DDT may include a data_chunk including raw data of image data, the segmented part of the data_chunk and contents of data casting service.

Referring to the FIGS. 4 and 19, exemplary process steps of the data casting service being displayed in a receiving system are disclosed.

When the DDT is received, the SI handler 240 may parse the received DDT including data for the data casting service. In this case, for example, the SI handler 240 may include a DDT parser. The parsed DDT may include data for the data casting service and a data chunk, which includes a header of the data for the data casting service.

The storage 290 stores the parsed data chunk. The DDT transmitted in section units may include a data chunk and a segmented part of the data chunk.

The MH management processor 200 reads the stored data chunk from the storage 290 and transfers the read data chunk to an MH presentation processor 300.

A data decoder 360 of the MH presentation processor 300 decodes the read data chunk.

The data for the data casting service stored in the storage 290 may be provided as a type of the dynamic sequential picture or as the recorded web service. Herein, content data may be provided as the type of the dynamic sequential picture or as the recorded web service. And, the content data may be configured as an image, a text, an MP3 file and the like.

If a mark, which indicates that a data casting service from the NRT service is available, is displayed, a user selects the displayed mark to send a request to a receiving system, thereby enabling the data casting service from the NRT service to be displayed.

The presentation controller 330 of the MH presentation processor 300 drives (or operates) an application manager 350 providing a data casting service and processes the data casting service by using the content data.

The display module 320 may display an image for a data casting service. For instance, the presentation controller 330 may enable a dynamic sequential picture according to the animation_type to be displayed at a trigger time. The display module 320 displays an application driven (or operated) by the application manager 350 and may provide a data casting service based on the displayed application. In this case, the display module 320 may display a mark indicating that a data casting service is transmitted. Accordingly, the receiver may display the corresponding data casting service in accordance with a user's selection or a setting of a receiving system as the displayed data casting service. At this time, if a data of a data chunk included in the DDT is displayed by the presentation controller 330, the display unit 320 may display the data of the data chunk with A/V data outputted from the A/V decoder 310.

Therefore, a data casting service is processed based on the program table information including the data for the data casting service, and a descriptor of the program table information.

In the following embodiments, a receiver receives and processes data casting information.

Figure 36:
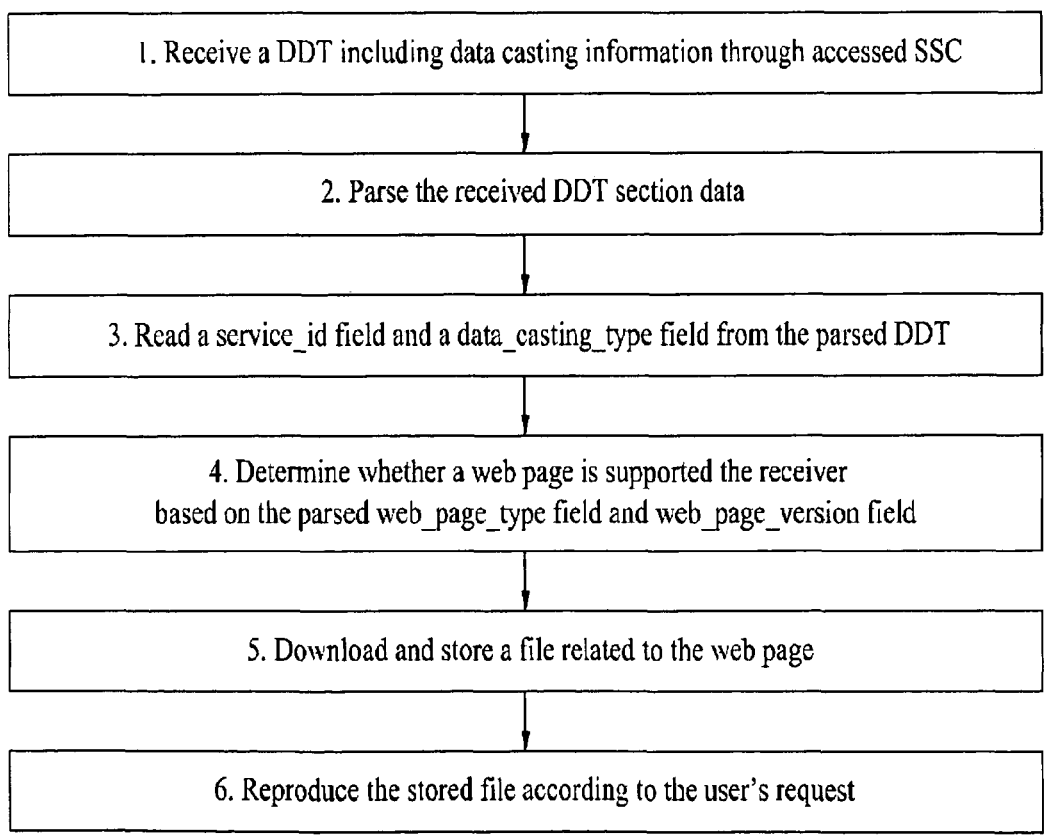
FIG. 36 is an exemplary flowchart for processing a separate program information table for the data of the data casting service provided from the NRT service according to the present invention.

FIG. 36 is an exemplary flowchart for processing a separate program information table for the data of the data casting service provided from the NRT service according to the present invention. In this case, the flowchart is specified refer to the FIGS. 4 and 19.

1. In order to receive information relevant to the data casting service, a receiver accesses a service signaling channel (SSC) via the stream component handler or the IP module and then receives a DDT section including the data casting information therein. In accessing the SSC, as mentioned in the foregoing description, the receiver is able to use a well-known IP address and a well-known UDP port number.

2. The receiver receives and parses DDT section data via the service signaling section buffer/parser 217/123. In this case, for example, the received DDT section can include description information on an NRT service according to the present invention only.

3. The receiver reads a service_id field and a data_casting_type field from the parsed DDT via the service manager 122/228 or the NRT service manager 229. This is to determine whether a corresponding service transmits a web page. For instance, if a value of the data_casting_type field is set to '0x01', the receiver can be aware that a web page is received via an NRT service having a corresponding service_id.

4. If the web page is carried on the corresponding service via the value of the data_casting_type field parsed in the above step 3 through the service manager 122/228 or the NRT service manager 229, the receiver determines whether it can support the corresponding web page (e.g., a web document, etc.). In this case, the receiver is able to determine whether to support the corresponding web page based on a web_page_type field and a web_page_version field.

5. If the corresponding web page is supportable as a result of the determination in the above step 4 through the service manager 122/228 or the NRT service manager 229, the receiver stores a corresponding file in a file storage unit 163/225. In this case, the corresponding file is received via a data_chunk field within the DDT section or the corresponding file can be received by being connected to a FLUTE session. Herein, the FLUTE session is described with respect to a service_id, which is identical to the service_id within the DDT section included in the SMT.

6. If an external request is made by a user or the like through the service manager 122/228 or the NRT service manager 229, the receiver reproduces (or plays-back) the file stored in the file storage unit 163/225. In doing so, if the corresponding service is a web page (portal) service, a browser application related to the corresponding service is executed to enable the user or the like to view the corresponding file.

Second Embodiment

In the following description, a case of defining data for a data casting service provided from an NRT service into a descriptor format of a pre-defined program information table and then of transceiving the defined descriptor by having the descriptor included in the program information table will be described in detail. In this case, the present embodiment is applicable to both a fixed NRT service and a mobile NRT service. Herein, the program information table includes a service map table (SMT) in a mobile environment for simplicity. And, also, the descriptor may use a descriptor on a service level of the SMT. Yet, it is understood that the same principle is also applicable to a fixed environment.

DCD in the SMT

FIG. 37 is an exemplary diagram for a bit-stream syntax of a descriptor included the SMT according to the present invention. In the following description, the descriptor will be referred to as data_casting_descriptor (hereinafter, 'DCD'), for simplicity. Yet, the present invention will not be limited to the example given herein. For instance, the DCD is included in a service level descriptor loop within the SMT.

Fields for configuring the DCD are explained as follows. FIG. 37 shows an example of the DCD being written in an MPEG format, the present invention will not be limited to the example given herein. And, therefore, the DCD can be defined in a different format.

A descriptor_tag field has a value of '0xTBD' to identify the data_casting_descriptor (DCD).

A descriptor_length field represents a length of this descriptor.

The DCD_protocol_version field represents a protocol version of the DDT section.

The data_casting_service_type field defines a service type of the data broadcasting service included in the NRT service.

The web_page_type field defines a type of a received web page/portal document. In this case, the type of the received web page/portal document includes, for example, at least one of a text [HTML] document and a web document based upon a CE-HTML specification.

Accordingly, a receiver identifies a compatible browser based upon the web_page_type field and the type of the received web page/portal document.

The web_page_version field represents a version number of a specification used to write a corresponding web page document. For instance, if a web page document is a HTML document, which is written by using a HTML 4.01, the value of the HTML 4.01 is specified in the web_page_version field.

Accordingly, the receiver may identify whether or not the received web document is supported through a web browser in the receiver, based upon the web_page_type field and the web_page_version field.

Yet, for instance, the web_page_type field or the web_page_version field is significant only if a service type of a data casting service provided by the NRT service is a recorded web service. Otherwise, the web_page_type field or the web_page_version field can become insignificant. Therefore, a transmitting side enables a receiver to ignore (or disregard) the web_page_type field or the web_page_version field in a manner of setting a value of the web_page_type field and the web_page_version field to '0'.

Alternatively, the web_page_type field or the web_page_version field can be delivered as a descriptor of the DDT or other program information tables by being defined into a descriptor form. For instance, it can be separately added in form of the MH component descriptor (e.g., web page info descriptor). Hence, if a value based on a data_casting_service_type field indicates that a service type of a data casting service included in a corresponding NRT service is a recorded web service, a receiver can be aware of the information on a web page by parsing the web page info descriptor among the MH component descriptors.

The data_chunk_length field defines a length of the data_chunk( ).

The data_chunk field includes raw data for data casting service supported from the NRT service.

Yet, the descriptions with reference to FIGS. 27 to 32 are cited for the detailed examples for a data_casting_service_type field and a data_chunk( ) field.

The above-described DCD includes data for a data casting service provided from the NRT service. Therefore, a receiver processes the recorded web service as the data casting service provided from the NRT service by receiving/parsing the DCD and is then capable of providing the processed DCD to the user.

In the following embodiments, for example, a receiver receives and processes data casting information.

Figure 38:
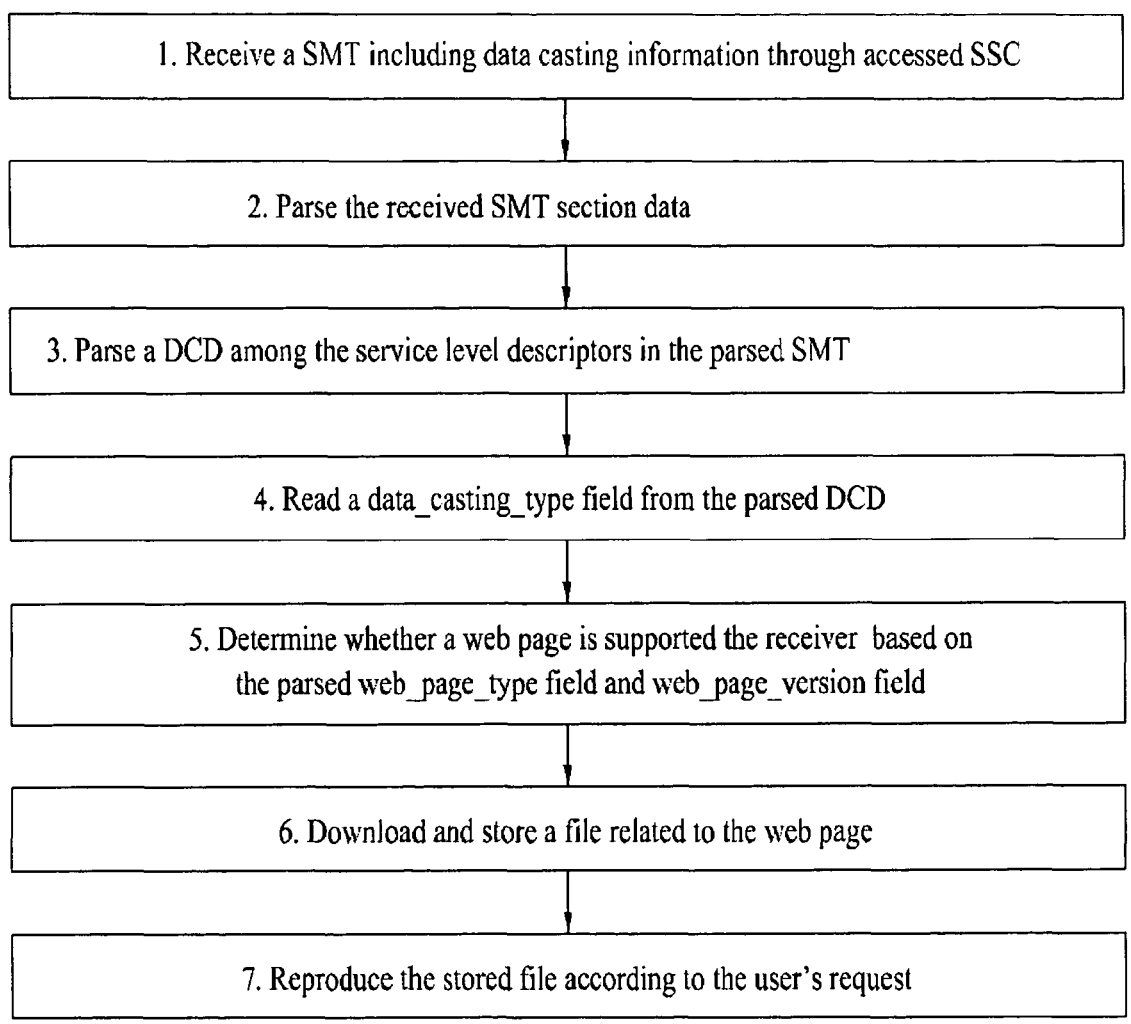
FIG. 38 is an exemplary flowchart for processing a received DCD defined data for the data casting service provided from the NRT service according to the present invention.

FIG. 38 is an exemplary flowchart for processing a received DCD defined data for the data casting service provided from the NRT service according to the present invention. In this case, the flowchart is specified with reference to FIGS. 4 and 19.

1. In order to receive information relevant to the data casting service, a receiver accesses a service signaling channel (SSC) via the stream component handler or the IP module and then receives a SMT section including the data casting information therein. In accessing the SSC, as mentioned in the foregoing description, the receiver is able to use a well-known IP address and a well-known UDP port number.

2. The receiver receives and parses SMT section data received via the service signaling section buffer/parser 217/ 123. First of all, the receiver identifies the received service based on the parsed SMT section data. At this time, the receiver is able to determine, for example, whether a received service is an NRT service based on the MH_service_category field in the parsed SMT via the service manager 122/228 or the NRT service manager 229.

3. If the corresponding service is an NRT service, as a result of the determination in the above step 2 through the service manager 122/228 or the NRT service manager 229, the receiver parses the DCD from the service level descriptor loop in the parsed SMT.

4. The receiver reads a service_id field and a data_casting_type field from the parsed DDT section via the service manager 122/228 or the NRT service manager 229. This is to determine whether a corresponding service transmits a web page. For instance, if a value of the data_casting_type field is set to '0x01', the receiver can be aware that a web page is received via the NRT service having a corresponding service_id.

5. If the web page is carried on the corresponding service via the value of the data_casting_type field parsed in the above step 4, through the service manager 122/228 or the NRT service manager 229, the receiver determines whether it can support the corresponding web page (e.g., a web document, etc.). In this case, the receiver is able to determine whether to support the corresponding web page based on a web_page_type field and a web_page_version field.

6. If the corresponding web page is supportable as a result of the determination in the above step 5 through the service manager 122/228 or the NRT service manager 229, the receiver stores a corresponding file in a file storage unit 163/ 225. In this case, the file is received via a data_chunk field within the DCD or the corresponding file can be received in a manner that a FLUTE session clearly stated for a service_id, which is identical to a service_id within the DCD in the SMT.

7. If an external request is made by a user or the like through the service manager 122/228 or the NRT service manager 229, the receiver reproduces (or plays-back) the file stored in the file storage unit 163/225. In doing so, if the corresponding service is a web page (portal) service, a browser application related to the corresponding service is executed, so as to enable the user or the like to view the corresponding file.

Third Embodiment

In the following description, explained is a case of defining data for a data casting service provided from an NRT service into a descriptor format of a pre-defined program information table and then transceiving the defined descriptor by having descriptor included in the program information table. Herein, the program information table includes an NRT Content Table (NCT) in a fixed environment for simplicity. And, the descriptor is defined as a descriptor on a content level of the NCT.

An AAD in the NCT

FIG. 39 is an exemplary diagram for a bit-stream syntax of a descriptor included the NCT according to the present invention. In the following description, the descriptor will be referred to as advanced_announcement_descriptor (hereinafter, 'AAD') for simplicity. Yet, the present invention will not be limited to the example given herein. In this case, the AAD is included in a content level descriptor loop within the NCT.

In this description of the present invention, the AAD includes information on a web page document including additional information related to an announced service or content. In this case, the additional information, for example, includes web information related to an advanced electronic program guide (EPG). The web information related to the advanced EPG is defined as additional information related to the corresponding announced service or content transceived via a web.

Fields for configuring the AAD are explained as follows. In the example shown in FIG. 39, the AAD is written in an MPEG format. However, the present invention will not be limited to the example given herein, Alternatively, the AAD can be defined in a different format.

The AAD includes an AAD_protocol_version field, a data_casting_service_type field and a data_chunk field.

A descriptor_tag field has a value of '0xTBD' to identify the advanced_announcement_descriptor (AAD).

A descriptor_length field represents a length of this descriptor.

The AAD_protocol_version field represents a protocol version of the AAD.

The data_casting_service_type field defines a service type of a data casting service included in an NRT service.

A data_chunk_length field defines a length of the following data_chunk( ).

The data_chunk( ) field includes raw data as data for the data casting service included in the NRT service.

Herein, a specific example of the data_casting_service_type field and a data_chunk( ) field will be specified.

In the following embodiments, a receiver receives and processes data casting information.

Figure 40:
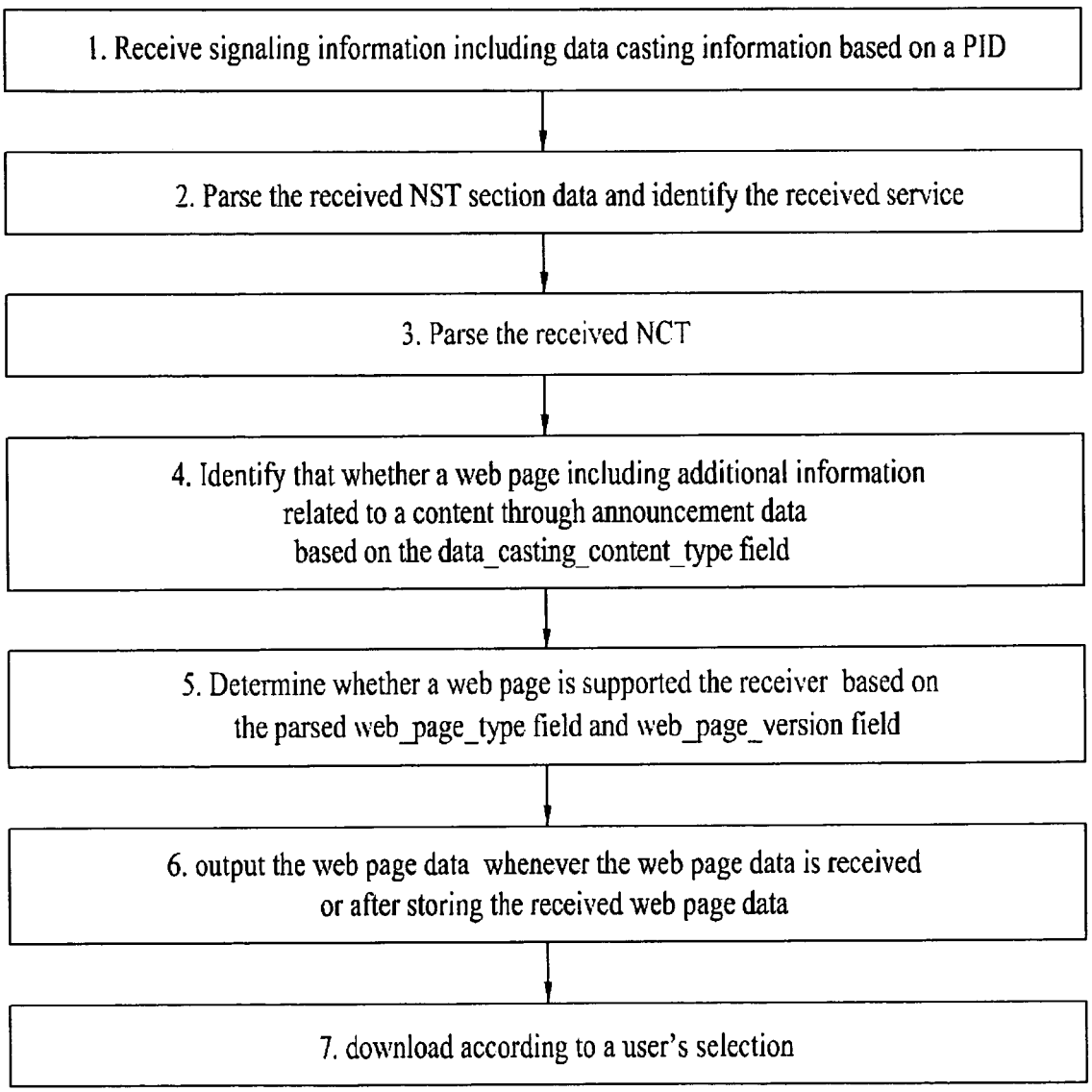
FIG. 40 is an exemplary flowchart for processing the AAD including data for the data casting provided from the NRT service according to the present invention.

FIG. 40 is an exemplary flowchart for processing the AAD including data for the data casting provided from the NRT service according to the present invention. In this case, the flowchart is specified with reference to the FIGS. 4 and 19.

1. For instance, referring to FIG. 9, in order to receive information relevant to data casting service, a receiver extracts PIDs and receives signaling data including the data casting information based on the extracted PIDs. In this case, the signaling information may be an NCT and/or an NST. And, the data casting information includes web information related to the advanced EPG.

2. The receiver receives and parses NST section data received via the service signaling section buffer/parser 217/123. First of all, the receiver identifies the received service based on the parsed NST section data. For instance, the receiver is able to determine whether a received service is an NRT service based on an NRT_service_category field in the parsed NST.

3. If the corresponding service is an NRT service as a result of the determination in the above step 2 through the service manager 122/228 or the NRT service manager 229, the receiver parses the NCT received via the service signaling section buffer/parser 217/123. In this case, the receiver parses the AAD from the content level descriptor loop in the parsed NCT through the service signaling section buffer/parser 217/123.

4. The receiver can be aware that additional information is received in a web page format or a picture data format related to a corresponding announced service or content, if the AAD is read among the content level descriptor loop in the parsed NCT. In this case, the receiver can be aware of whether or not the additional information is transmitted by the type of the web page based on a data_casting_content_type field in the read AAD. For instance, if a value of the data_casting_content_type field is set to '0x01', the receiver can be aware that a web page including additional information related to the corresponding content is received via the announcement data.

5. The receiver is able to determine whether to support the corresponding web document based on a web_page_type field and a web_page_version field.

6. The receiver may control to output the web page data received through a data_chunk of the AAD using a service manager 122/228 or an NRT service manager 229 whenever the web page data is received or after storing the received web page data in the file storage unit 163/225.

7. The corresponding content is downloaded to the receiver by a user's selection. In this case, the user can select whether the corresponding content is downloaded based on the displayed web page via AAD included the parsed NCT.

Accordingly, the present invention provides the following effects and/or advantages.

First of all, a transmitting end can have signaling data included to enable a receiver to appropriately recognize, receive and handle a provided NRT service.

Secondly, a receiver properly receives and handles a received NRT service using the transmitted signaling data and is then able to provide the handled service to a user.

Thirdly, a receiver is configured to provide a service guide to a user using the transmitted signaling data.

Fourthly, a receiver is able to accurately receive and handle a content selected from the configured service guide using the signaling information.

Finally, if a web service is included in a received NRT service, a receiver is able to properly handle the web service.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of transmitting a broadcast signal for a Non-Real Time (NRT) service, the method comprising:
generating the broadcast signal including the NRT service that is delivered in advance of its use and stored in a receiving device, and signaling data including an NRT Information Table (NRT-IT) describing one or more content items available for download to storage in the receiving device for signaling NRT service and signaling data further including a Service Map Table (SMT) containing service-level attributes for the NRT broadcasting, wherein the SMT includes information used as a linkage to the NRT-IT; and
transmitting the NRT service via a broadcast channel and the signaling data via a Service Signaling Channel (SSC) with a specific IP address and UDP port number, wherein, the NRT service is delivered within IP packets, the IP packets associated with a virtual channel are identified by references in a Virtual Channel Table (VCT) and an associated Program Map Table (PMT), wherein the IP packets are carried in MPEG-2 Transport Stream using Digital Storage Media Command and Control (DSM-CC) Addressable Section format,
wherein the NRT service includes at least one of a portal service and a push service, and
wherein the portal service is a type of the NRT service to browse an internet using a web browser.

2. The method of claim 1, wherein the NRT service includes at least one of a fixed NRT service and a mobile NRT service.

3. The method of claim 2, wherein the signaling information is a Data Casting Description Table (DCDT) if the NRT service is the fixed NRT service.

4. The method of claim 2, wherein the NRT service includes one or more content items, each of the one or more content items composed of one or more files delivered via File Delivery over Unidirectional Transport (FLUTE) file delivery sessions.

5. The method of claim 3, wherein the DDT includes a first field identifying the NRT service and a second field identifying a type of the NRT service.

6. The method of claim 1, wherein the portal service indicates that files needed to support text/graphics rendering are available in associated FLUTE session.

7. The method of claim 1, wherein the SSC is carried in a portion of the IP packets, wherein each of the FLUTE file delivery sessions includes one or more FLUTE channels, and wherein all of the FLUTE channels in each of the FLUTE file delivery sessions have a same IP address and consecutively numbered UDP ports signaled with a single component descriptor in the SMT.

8. The method of claim 7, wherein the SMT is linked to the NRT-IT and carried through the SSC, the SMT describing one or more NRT services, and the NRT-IT providing descriptive metadata about the content items that make up the NRT service.

9. An apparatus for receiving a broadcast signal for a Non-Real Time (NRT) service, the apparatus comprising:
a tuner configured to receive the broadcast signal including the NRT service that is delivered in advance of its use and stored in a receiving device, and signaling data including an NRT Information Table (NRT-IT) describing one or more content items available for download to storage in the receiving device for signaling NRT service and signaling data further including a Service Map Table (SMT) containing service-level attributes for the NRT broadcasting, wherein the SMT includes information used as a linkage to the NRT-IT; and
a receiving unit configured to receive the NRT service via a broadcast channel and the signaling data via a Service Signaling Channel (SSC) with a specific IP address and UDP port number,
wherein, the NRT service is delivered within IP packets, the IP packets associated with a virtual channel are identified by references in a Virtual Channel Table (VCT) and an associated Program Map Table (PMT), wherein the IP packets are carried in MPEG-2 Transport Stream using Digital Storage Media Command and Control (DSM-CC) Addressable Section format,
wherein the NRT service includes at least one of a portal service and a push service, and
wherein the portal service is a type of the NRT service to browse an internet using a web browser.

10. The apparatus of claim 9, wherein the NRT service includes at least one of a fixed NRT service and a mobile NRT service.

11. The apparatus of claim 10, wherein the signaling information is a Data Casting Description Table (DCDT) if the NRT service is the fixed NRT service.

12. The apparatus of claim 10, wherein the NRT service includes one or more content items, each of the one or more content items composed of one or more files delivered via File Delivery over Unidirectional Transport (FLUTE) file delivery sessions.

13. The apparatus of claim 11, wherein the DDT includes a first field identifying the NRT service and a second field identifying a type of the NRT service.

14. The apparatus of claim 9, wherein the portal service indicates that files needed to support text/graphics rendering are available in associated FLUTE session.

15. The apparatus of claim 9, wherein the SSC is carried in a portion of the IP packets, wherein each of the FLUTE file delivery sessions includes one or more FLUTE channels, and wherein all of the FLUTE channels in each of the FLUTE file delivery sessions have a same IP address and consecutively numbered UDP ports signaled with a single component descriptor in the SMT.

16. The apparatus of claim 15, wherein the SMT is linked to the NRT-IT and carried through the SSC, the SMT describing one or more NRT services, and the NRT-IT providing descriptive metadata about the content items that make up the NRT service.

* * * * *